United States Patent [19]
Hasegawa et al.

[11] Patent Number: 5,919,577
[45] Date of Patent: Jul. 6, 1999

[54] FE-BASED ALLOY FOIL FOR LIQUID-PHASE DIFFUSION BONDING OF FE-BASED MATERIALS BY ENABLING BONDING IN OXIDIZING ATMOSPHERES

[75] Inventors: Yasushi Hasegawa; Eiji Tsuru; Yuichi Sato; Shigekatsu Ozaki, all of Futtsu, Japan

[73] Assignee: Nippon Steel Corporation, Tokyo, Japan

[21] Appl. No.: 09/011,583

[22] PCT Filed: Jun. 4, 1997

[86] PCT No.: PCT/JP97/01900

§ 371 Date: Jan. 30, 1998

§ 102(e) Date: Jan. 30, 1998

[87] PCT Pub. No.: WO97/46347

PCT Pub. Date: Dec. 11, 1997

[30] Foreign Application Priority Data

Jun. 4, 1996 [JP] Japan .................................. 8-142038
Jun. 4, 1996 [JP] Japan .................................. 8-163810
Jun. 4, 1996 [JP] Japan .................................. 8-163811

[51] Int. Cl.$^6$ .......................... C22C 38/02; C22C 38/32; C22C 38/54
[52] U.S. Cl. .......................... 428/606; 148/403; 148/330; 148/325; 420/64; 420/42; 420/87; 420/121
[58] Field of Search ............................. 428/606; 148/403, 148/330, 325; 420/64, 42, 87, 121; 228/262.41, 262.42, 195, 194

[56] References Cited

U.S. PATENT DOCUMENTS 5,683,822  11/1997  Hasegawa et al. ...................... 148/403
5,759,300   6/1998  Hasegawa et al. ...................... 148/403

*Primary Examiner*—Deborah Yee
*Attorney, Agent, or Firm*—Kenyon & Kenyon

[57] ABSTRACT

The present invention provides an Fe-based alloy foil for liquid phase diffusion bonding of Fe-based material by enabling bonding in oxidizing atmospheres at relatively high bonding temperatures to minimize thermal influence on the base material (the material to be bonded) and, thereby, ensures production of a bonded joint having a uniform microstructure and a good bonded joint strength and enables reduction in the bonding time. The Fe-based alloy foil contains, as essential elements, one of 1.0 to 20.0% P and 1.0 to 20.0% B, 1.0 to 20.0% Si, and 0.1 to 20.0% V, in terms of atomic percentage, the balance substantially of Fe and unavoidable impurities, and has a thickness of 3.0 to 100 $\mu$m. Alternatively, the Fe-based alloy foil contains, as essential elements, 1.0 to 20.0% P, 1.0 to 20.0% Si, and 0.1 to 20.0% V, and 1.0 to 20.0% B, in terms of atomic percentage, the balance substantially of Fe and unavoidable impurities, and has a thickness of 3.0 to 200 $\mu$m. In accordance with need, one or more of Cr, Ni and Co and/or one or more of W, Nb and Ti are also contained in suitable amounts. The foil advantageously has a substantially amorphous crystallographic structure.

24 Claims, 15 Drawing Sheets

FE-BASED ALLOY FOIL FOR LIQUID-PHASE DIFFUSION BONDING OF FE-BASED MATERIALS BY ENABLING BONDING IN OXIDIZING ATMOSPHERES

TECHNICAL FIELD

The present invention relates to an Fe-based alloy foil for liquid phase diffusion bonding, of Fe-based materials including various grades of steel products such as steel plates, steel pipes, steel bars (including steel wires and steel reinforcements), in which the bonding can be performed in oxidizing atmospheres at low temperatures in a short time with no heat effect on the materials to be bonded (base materials).

The present invention also relates to an Fe-based alloy foil for liquid phase diffusion bonding of Fe-based materials, including various grades of steel products such as steel plates, steel pipes, steel bars (including steel wires and steel reinforcements), in which the bonding can be performed in oxidizing atmosphere in a short time to provide a bonded joint having good strength.

The present invention relates to an Fe-based alloy foil for liquid phase diffusion bonding of Fe-based materials, including various grades of steel products such as steel plates, steel pipes, steel bars (including steel wires and steel reinforcements), in which the bonding can be performed in oxidizing atmospheres at low temperatures in a short time with no heat effect to the materials to be bonded (base materials).

BACKGROUND ART

The liquid phase diffusion bonding process bonds base materials by inserting therebetween an alloy in the form of a foil, a powder, a plated layer, etc. of a eutectic composition having a melting point lower than that of the base materials, pressing the base materials together, and heating the bonding portion to a temperature immediately above the solidus line of the inserted alloy (hereinafter referred to as an "insert metal") to cause melting and isothermal solidification; the process is considered as one type of solid phase bonding process. The isothermal solidification occurs because a specific element diffuses from a liquid phase to a material to be bonded (a base material), and thereby, the chemical composition of the liquid phase is shifted so that the solidus line of the shifted composition reaches the heating temperature.

The liquid phase diffusion bonding can be effected at relatively low pressing forces and is therefore not only used to avoid occurrence of a residual stress and a deformation due to bonding but is also applied to the bonding of high alloy steels and heat resistant steels which are difficult to bond and to the bonding of these steels with carbon steels.

On the other hand, carbon steels or steels for general use are conventionally bonded by other various bonding methods and the liquid phase diffusion bonding is rarely used.

The liquid phase diffusion bonding is frequently used to bond materials containing 0.50% in atomic percentage of Cr as an alloying element.

The Cr-containing material is characterized by having a dense coating film of a Cr oxide (mostly $Cr_2O_3$) to provide high resistance to oxidation and corrosion.

Thus, it is naturally recognized that heating upon bonding also causes an oxide film to form on the bonding surfaces to impede leakage of a molten insert metal therethrough, and thereby, diffusion of atoms necessary for the bonding is significantly hampered to render it difficult to provide good bonded joints.

Thus, the conventional art such as Japanese Unexamined Patent Publications (Kokai) No. 53-81458, No. 62-34685, and No. 62-227595 necessarily use a vacuum or inert or reducing atmosphere during liquid phase diffusion bonding, which caused a significant increase in the bonding cost.

The present applicant has conducted various studies to achieve liquid phase diffusion bonding of stainless steels, high nickel-based alloys, and heat-resisting alloy steels and bonding between any of these materials and carbon steels in such a manner that the liquid phase diffusion bonding can be effected even in air, in which an oxide coating film is formed on the base material, to provide good bond joint quickly with a reduced cost and found that the use of an insert metal containing 0.1 to 20.0 at % V and an increased amount of Si enables liquid phase diffusion bonding in oxidizing atmospheres such as air.

Namely, the applicant found that, although V increases the melting point of the insert metal, an insert metal having good bondability can be obtained by adjusting the contents of other elements (Si alone in the present invention) and previously proposed a Ni-based, V- and Si-containing alloy foil for liquid phase diffusion bonding by enabling bonding in oxidizing atmospheres, mainly used for liquid phase diffusion bonding of stainless steels, high nickel-based alloys, and heat resistant alloy steels and bonding between any of these materials and carbon steels.

However, the above-proposed Ni-based alloy foil for liquid phase diffusion bonding is mainly used for bonding of stainless steels, high Ni-based alloys and heat resistant alloy steels and contains Ni as a main component.

Recently, there is increasing need to bond Fe-based materials represented by steel products such as steel pipes, steel reinforcements, steel plates or the like made of carbon steel in a narrow space in a reduced time to provide good joint strength with a low cost. The present inventors recognized that none of the conventional bonding methods can satisfy this need and studies feasibility of liquid phase diffusion bonding of Fe-base materials in air.

The inventors finally concluded that liquid phase diffusion bonding of Fe-based materials cannot be satisfactorily carried out with the use of the above-proposed Ni-based alloy foil for liquid phase diffusion bonding as an insert metal because the inclusion of a Ni-phase between base materials causes an inhomogeneous bond joint microstructure, requiring an elongated bonding time which affects the joint strength and toughness.

DISCLOSURE OF THE INVENTION

The first object of the present invention is to provide an Fe-based alloy foil for liquid phase diffusion bonding of Fe-based materials (or various grades of steel products containing 50% or more Fe) represented by steel products such as steel pipes, steel reinforcements, steel plates or the like made of carbon steels, in which the bonding can be satisfactorily performed in oxidizing atmospheres, at low temperatures, in a short time without significant thermal influence on the materials to be bonded (base materials).

The second object of the present invention is to provide an Fe-based alloy foil for liquid phase diffusion bonding of steel plates, steel pipes, steel bars (including steel wires and steel reinforcements) or the like made of carbon steels, in which the bonding can be satisfactorily performed in oxidizing atmospheres, in a short time, ensuring a bond joint having a homogenous microstructure and good joint strength.

The third object of the present invention is to provide an Fe-based alloy foil for liquid phase diffusion bonding of Fe-based materials represented by steel products such as steel pipes, steel reinforcements, steel plates and the like made of carbon steels, in which the bonding can be performed in oxidizing atmospheres, at low temperatures, in a short time without significant thermal influence on the materials to be bonded (base materials).

To achieve the first object according to the first aspect of the first invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si and 0.1 to 20.0% V and the balance composed of substantially Fe and unavoidable impurities; and a foil thickness of 3.0 to 100 µm.

According to the second aspect of the first invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si and 0.1 to 20.0% V, and also, one or more of 0.1 to 20.0% Cr, 0.1 to 15.0% Ni and 0.1 to 15.0% Co, the balance composed of Fe and unavoidable impurities; and a foil thickness of 3.0 to 100 µm.

According to the third aspect of the first invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si and 0.1 to 20.0% V, and also, one or more of 0.1 to 10.0% W, 0.1 to 10.0% Nb and 0.1 to 10.0% Ti, the balance composed of Fe and unavoidable impurities; and a foil thickness of 3.0 to 100 µm.

According to the fourth aspect of the first invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si and 0.1 to 20.0% V, and also, one or more of 0.1 to 20.0% Cr, 0.1 to 15.0% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 µm.

According to the fifth aspect of the first invention, there is provided an Fe-based alloy foil for liquid phase diffusion bonding of Fe-based materials, and for enabling bonding in oxidizing atmospheres according to any one of the first to fourth aspects, characterized by having a substantially amorphous structure.

To achieve the second object according to the first aspect of the second invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% B, 1.0 to 20.0% Si and 0.1 to 20.0% V and the balance composed of substantially Fe and unavoidable impurities; and a foil thickness of 3.0 to 100 µm.

According to the second aspect of the second invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 20.0% Cr, 0.1 to 15.0% Ni and 0.1 to 15.0% Co, the balance composed of Fe and unavoidable impurities; and a foil thickness of 3.0 to 100 µm.

According to the third aspect of the second invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 10.0% W, 0.1 to 10.0% Nb and 0.1 to 10.0% Ti, the balance composed of Fe and unavoidable impurities; and a foil thickness of 3.0 to 100 µm.

According to the fourth aspect of the second invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 20.0% Cr, 0.1 to 15.0% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 µm.

According to the fifth aspect of the second invention, there is provided an Fe-based alloy foil for liquid phase diffusion bonding of Fe-based materials, and for enabling bonding in oxidizing atmospheres according to any one of the first to fourth aspects, characterized by having a substantially amorphous structure.

To achieve the third aspect according to the first aspect of the third invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si and 0.1 to 20.0% V and 1.0 to 20.0% B and the balance composed of substantially Fe and unavoidable impurities; and a foil thickness of 3.0 to 100 µm.

According to the second aspect of the third invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si, 0.1 to 20.0% V and 1.0 to 20.0% B, and also, one or more of 0.1 to 20.0% Cr, 0.1 to 15.0% Ni and 0.1 to 15.0% Co, the balance composed of Fe and unavoidable impurities; and a foil thickness of 3.0 to 100 µm.

According to the third aspect of the third invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si, 0.1 to 20.0% V and 1.0 to 20.0% B, and also, one or more of 0.1 to 10.0% W, 0.1 to 10.0% Nb and 0.1 to 10.0% Ti, the balance composed of Fe and unavoidable impurities; and a foil thickness of 3.0 to 100 μm.

According to the fourth aspect of the third invention, there is provided an Fe-based alloy foil for liquid phase diffusion bonding of Fe-based materials, and for enabling bonding in oxidizing atmospheres, characterized by having:

a chemical composition including, in atomic percentage, 1.0 to 20.0% P, 1.0 to 20.0% Si, 0.1 to 20.0% V and 1.0 to 20.0% B, and also, one or more of 0.1 to 20.0% Cr, 0.1 to 15.0% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 μm.

According to the fifth aspect of the third invention, there is provided an Fe-based alloy foil for liquid phase diffusion bonding of Fe-based materials, and for enabling bonding in oxidizing atmospheres according to any one of the first to fourth aspects, characterized by having a substantially amorphous structure.

The following terminology is herein used.

"Fe-based materials" means various grades of steel products made of carbon steels containing Fe in an amount of 50% or more in atomic percentage.

"substantially amorphous" means that 50% or more of the crystallographic structure is amorphous.

"liquid diffusion bonding" includes diffusion brazing and means a bonding method in which materials are bonded together by inserting an alloy, having a eutectic composition and a melting point lower than that of the materials to be bonded, between the materials to be bonded in a foil or powder form or by plating, pressing the materials, heating the joint portion to a temperature immediately above the liquids line of the inserted alloy (hereinafter referred to as an "insert metal") to cause melting and isothermal solidification, in which the melting is not limited to complete melting but includes 50% or more melting. The isothermal solidification is caused by the fact that a specific element diffuses from a liquid phase to the material to be bonded (base material), and thereby, the chemical composition of the liquid phase is shifted so that a solidus line reaches the temperature of the liquid phase.

"oxidizing atmosphere" means an atmosphere which contains 0.1% or more of oxygen in volume percentage and has an oxygen partial pressure of $10^{-3}$ atm or more, including those containing $H_2$, $H_2S$, water vapor, or other reducing gases and nevertheless having an oxidizing power equivalent to that provided by an oxygen concentration of 0.1% or more.

"melting point" means, in alloys of two or more elements, a solidus line on a phase diagram, if not otherwise stated.

BEST MODE FOR CARRYING OUT THE INVENTION

Figure 1:
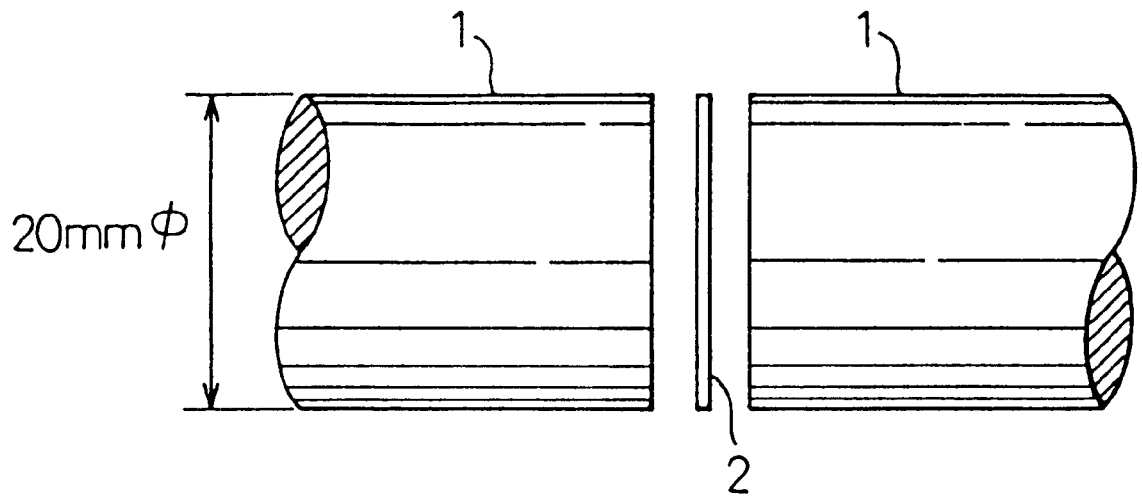
FIG. 1 is a plan view showing an example of liquid phase diffusion bonding of round steel bars as a bonding test piece using a alloy foil (insert metal) for liquid phase diffusion bonding.

The present invention paid attention to the effect obtained by the Ni-based, V- and Si-containing alloy foils for liquid phase diffusion bonding as disclosed in Japanese Unexamined Patent Publication (Kokai) Nos. 2-151377, 2-151378, 2-185940, 7-268521, and 7-276066, conducted various studies for an alloy foil for liquid phase diffusion bonding of Fe-based materials causing neither inhomogeneous microstructure due to the presence of an Ni-phase nor degradation of the properties of the bonded material (base material) due to thermal influence of bonding, and finally arrived at the present invention.

In the first to third inventions, according to the first aspect, an Fe-based alloy foil is kept to be Fe-based in the same sense as the Fe-based base material, by controlling the Ni content, if present, to a limited amount of from 0.1 to 15% to prevent occurrence of the problem of inhomogeneous microstructure, and the Fe-based alloy foil contains, as essential elements, P and/or B which diffuse and also lower the melting point, Si which lowers the melting point, and V which minimizes the influence of oxide films.

According to the second aspect, an Fe-based foil further selectively contains one or more of Cr, Ni and Co for primarily improving the corrosion resistance of a bonded joint, in addition to the elements of the first aspect.

According to the third aspect, an Fe-base alloy foil further selectively contains one or more of W, Nb and Ti for primarily improving the bonded joint strength, in addition to the elements of the first aspect.

According to the fourth aspect, an Fe-based alloy foil further selectively contains both the elements of the second and third aspect, i.e., one or more of Cr, Ni and Co for improving the corrosion resistance of a bonded joint, and simultaneously, one or more of W, Nb and Ti for improving the bonded joint strength.

The selective elements are combinedly used in suitable amounts in accordance with the chemical composition of the base material, the required properties of a bonded joint, etc.

B and P are known as diffusion elements.

According to the first invention, P is selectively used as a diffusion element, because it enables immediate realization of bonding at low temperatures (1000° C. or less), minimizes the thermal influence on the base material (material to be bonded), and prevents degradation of the properties due to coarsening of crystal grains of the base material.

The first invention is particularly advantageously used when a base material, or an Fe-based material, has a chemical composition in which crystal grains coarsen, due to a thermal influence, to degrade the material properties, such as in Mo-containing steels.

It is difficult to provide a good bonded joint when these grades of steels are liquid phase diffusion-bonded by using single B addition as a diffusion element.

The second invention selectively uses B as a diffusion element, which, in comparison with P, has a greater diffusion coefficient, a significantly reduced bonding time, and a significantly improved bonded joint strength, although the bonding temperature is 1050 to 1300° C., which is higher by 200° C. or more than that for P.

The third invention uses both B and P as diffusion elements to complement each other so that elevated bonding temperatures exert no significant thermal influence on the base material (material to be bonded) to prevent degradation of the properties of the base material due to coarsening of crystal grains and to reduce the bonding time.

The third invention combinedly uses B and P as diffusion elements and can be advantageously applied to materials to be bonded, or an Fe-based material having a chemical composition in which crystal grains are likely to coarsen due to thermal influence to degrade the material properties, such as steels having a ferritic structure, a bainitic structure, or a martensitic structure.

When P alone is used as a diffusion element, bonding requires a longer time than that required when only B is applied, but the combined use with B faclitages formation of the amorphous phase and production of the foil while allowing significant reduction of the bonding time with respect to that required when only P is applied.

Thus, the third invention facilitates production of the alloy foil, which can be advantageously applied to liquid phase diffusion bonding of Fe-based materials including a wide variation of steel grades to provide a bonded joint having an improved fracture strength.

The present invention uses alloying elements for the reasons and in the amounts as described below. The following explanation commonly applies to the first to third inventions, if not otherwise stated.

(1) Fe-based (The Fe content is 50% or more in atomic percentage)

For bonding Fe-based materials (steel products made of carbon steels containing 50% or more of Fe in atomic percentage), the use of an Fe-based alloy foil avoids the occurrence of inhomogeneous microstructures due to the inclusion of a Ni phase as encountered with a Ni-based insert metal, the bonding time is reduced, and good bonded joint strength is readily ensured.

(2) The P content is 1.0 to 20.0%. (The first and third inventions)

P has an essential role as a diffusing atom to realize the isothermal solidification required to achieve liquid phase diffusion bonding and as an element to lower the melting point to less than that of the base material. To these ends, P must be contained in an amount of 1.0% or more. However, according to the detailed study by the present inventors, if P is present in an amount of more than 20.0% and the base material contains Mo and Cr, 5 $\mu$m or coarse phosphides are formed in the base material, particularly along the crystal grain boundaries thereof, to degrade the bonded joint strength. Therefore, the P content must be from 1.0 to 20.0%.

Note, in the third invention, that the P content is considered with respect to the B content in accordance with parameters such as the base material, the chemical composition of the alloy foil of the present invention, and the properties required for the bonded joint.

(3) The B content must be from 1.0 to 20.0%. (The second and third invention)

B has an essential role as a diffusion element to realize isothermal solidification required to achieve liquid phase diffusion bonding and as an element to lower the melting point to less than that of the base material (In the third invention, B is combinedly used with P to facilitate formation of an amorphous phase). To these ends, B must be contained in an amount of 1.0% or more. However, if the base material contains Mo and Cr, coarse sulfides are formed in the base material, particularly near the bonded joint, and significantly degrade the bonded joint strength.

(4) The Si content must be 1.0 to 20.0%. (The first and second inventions)

Si effectively lowers the melting point and is used to prevent the necessary bonding time from being elongated by a rise of the melting point which would otherwise occur in the presence of a relatively large amount of V. The effect is insignificant when the Si content is less than 1.0%. Si contents of more than 20.0% occasionally cause coarse oxides containing Si to be formed in the insert metal during liquid phase diffusion bonding in an oxidizing atmosphere to degrade the strength and toughness of a bonded joint.

In the third invention, the Si content must be from 1.0 to 10.0%. The Si provides the same effect as in the first or second inventions. Si contents of more than 10.0% occasionally cause coarse oxides containing Si to be formed in the insert metal during liquid phase diffusion bonding in an oxidizing atmosphere to degrade the strength and toughness of a bonded joint.

(5) The V content must be from 0.1 to 20.0%.

When V is present, a low melting point complex oxide $V_2O_5$-$Fe_2O_3$ (with a melting point of around 800° C.) is formed as a coating on the surface of a base material instead of an oxide coating of $Fe_2O_3$. The complex oxide coating is melted at the bonding temperature (900 to 1200° C.) and is spheroidized in a liquid phase due to the difference in the surface tension to provide good wetting between the Fe-based material and the molten insert metal. The diffusion elements P and/or B are then not subject to the influence of a surface oxide film but freely diffuse between the spheroidized oxides. Thus, V is an essential element of primary importance to realize liquid phase diffusion bonding in oxidizing atmospheres.

An amount of less than 0.1% is insufficient to melt the oxide film and provides no substantial effect, whereas an amount of more than 20.0% causes an insert metal to have a melting point of higher than 1300° C., at which liquid phase diffusion bonding is actually impossible.

(6) The Cr content must be from 0.1 to 20.0%.

Cr has a primary effect of improving the corrosion resistance and the oxidation resistance. An amount of less than 0.1% provides no substantial effect, whereas an amount of more than 20.0% extremely raises the melting point of an alloy foil causing degradation of the productivity and rendering the liquid phase diffusion bonding temperature, extremely high and far distant from a practically applicable range, such as 1400° C. or more.

(7) The Ni content must be from 0.1 to 15.0%.

Ni has a primary effect of improving the corrosion resistance and the oxidation resistance. An amount of less than 0.1% provides no substantial effect, whereas an amount of more than 15% prevents provision of a homogeneous microstructure because of inclusion of a Ni phase, also causing elongation of the required bonding time and degradation of the bonded joint strength.

(8) The Co content must be from 0.1 to 15.0%.

Co has a primary effect of improving the corrosion resistance and the oxidation resistance and imparting the strength. An amount of less than 0.1% provides no substantial effect, whereas an amount of more 15% causes formation of coarse intermetallic compounds in an insert metal to degrade the bonded joint toughness.

(9) The W, Nb and Ti contents must be from 0.1 to 10.0%, respectively.

W improves the bonded joint strength. An amount of less than 0.10% provides no substantial effect, whereas an amount of more than 10.0% causes precipitation of a coarse Laves phase, due to interdendritic segregation, and undesirablly lowers the strength.

Nb advantageously improves the toughness when dispersed in a matrix as a carbide, a nitride or a carbonitride. An amount of less than 0.1% provides no substantial effect, whereas an amount of more than 10.0% causes formation of coarse Fe-Nb intermetallic compounds to occasionally significantly degrade the bonded joint toughness.

Ti improves the bonded joint strength and, when uniformly dispersed as a carbide or a nitride, improves the toughness. An amount of less than 0.1% provides no substantial effect, whereas an amount of more than 10.0% causes formation of coarse intermetallic compounds to significantly degrade the bonded joint toughness.

To provide a good bonded joint, the alloy foil for liquid phase diffusion bonding of the present invention having the above-specified chemical composition must form a uniform melt during liquid phase diffusion bonding.

If an insert metal is inhomogeneous in chemical composition and includes segregates allowing elements, the melting point varies between portions of the insert metal to fail in providing a homogeneous bonded interface or a sound bonded joint.

Considering that actual foils contain inhomogeneous chemical composition and include segregation of alloying elements, the foil preferably has an amorphous structure.

However, it is not essential that the structure is amorphous when an alloy foil having a homogeneous chemical composition can be readily obtained.

The alloy foil for liquid phase diffusion bonding can be provided as an insert metal in various forms.

An alloy having a chemical composition according to any one of the first to fourth aspects of the first to third inventions can be readily produced as an amorphous alloy foil by a melt quenching method, for example.

To this end, a simple single roll method using a single cooling roll as a cooling substrate is suitably used as a basic production process, which is one of the melt quenching methods, in which an alloy melt is sprayed through a nozzle onto a cooling substrate, cooled and solidified via thermal contact.

Other suitable methods include a centrifugal quenching method utilizing an inner wall of a drum, a method using an endless belt, and modifications of these methods, such as a method using a subsidiary roll and a device for controlling the roll surface temperature, or casting under evacuation, in vacuum, or in an inert gas. A twin roll method, in which a pair of rolls between which a molten metal is poured to be quenched to solidify, can be also used.

It is also possible that an alloy is vacuum-melted and cast to an ingot, which is then rolled and annealed in a usual manner to form an alloy foil.

An alloy foil thus produced must have a thickness of from 3.0 to 100 μm because a foil having a thickness of less than 3.0 μm fails to provide an absolute amount of V sufficient to render harmless an oxide film on the surface of a base material, although the thinner the foil, the smaller the variation in the mechanical properties of the material in the portion near the bonded joint and shorter the time required for the bonding, and more advantageous to liquid phase diffusion bonding. In the first and second inventions, a thickness of more than 100 μm requires an elongated time (10 hours or more, for example) to complete liquid phase diffusion bonding, which is not practically acceptable.

In the third invention, the upper limit of the foil thickness can be increased to 200 μm for the following reasons.

Figure 19:
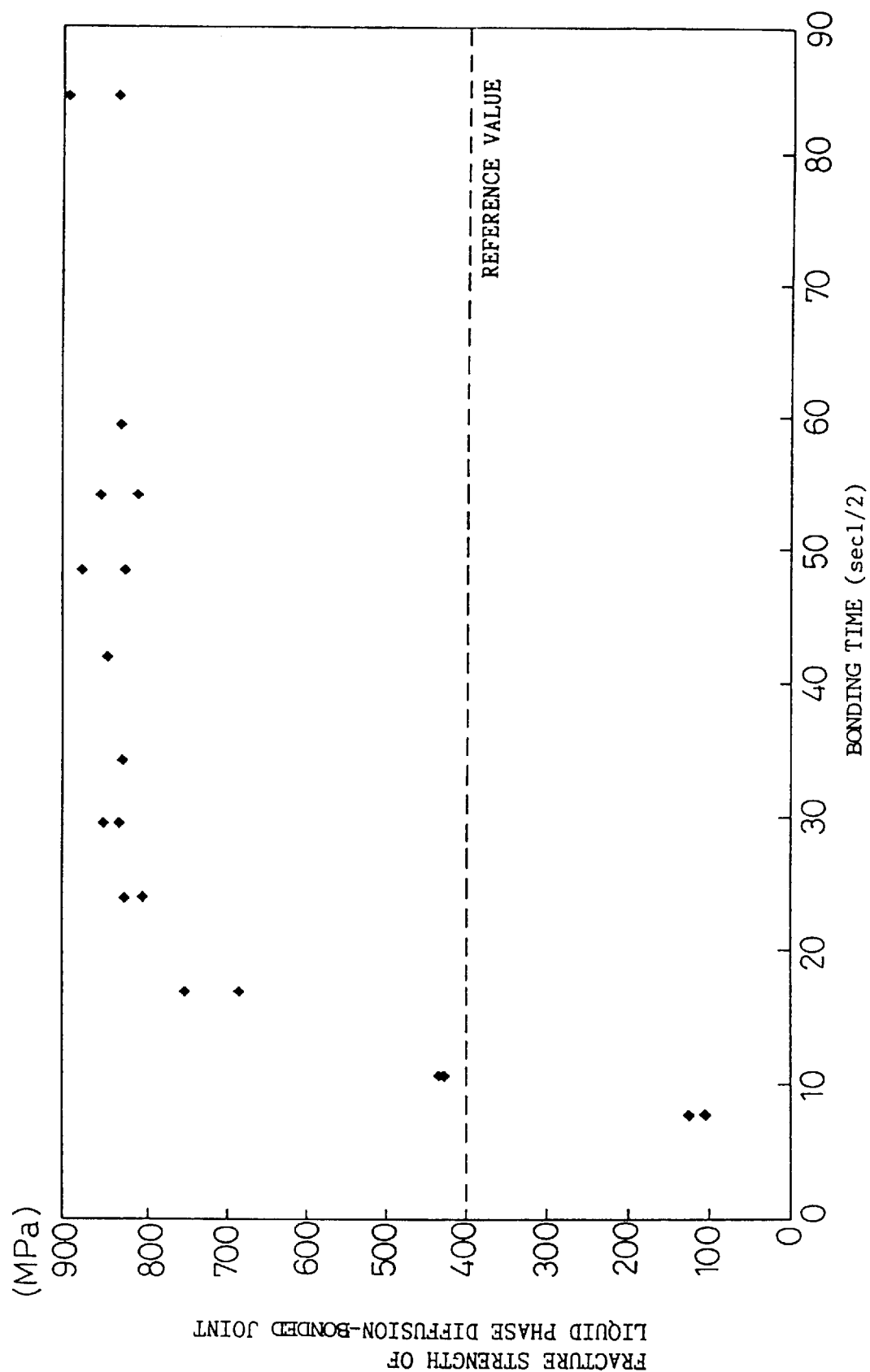
FIG. 19 is a graph relating to the third invention and showing the relationship between the bonding time and the fracture strength of the bonded joint of a liquid phase diffusion-bonded Fe-based material using an Fe-based insert metal containing P and B.

P also effectively lowers the melting point of a foil and B is a rapidly diffusion element. The combined presence of these elements provides a foil having a lower melting than that of a foil in which single B addition is applied. In this case, a reaction occurring between the bonding alloy foil and the base material (the base material is dissolved in the foil) results in an increased degree of dilution of the bonding foil. Of course, the same occurs in a foil of only a P addition. If the degree of dilution is great, the amount to be diffused (a diffused amount necessary to complete isothermal solidification) is relatively reduced. Therefore, although the bonded metal region has a greater width, isothermal solidification is actually completed much more rapidly in the wider region than in the case of only a P addition. In bonding at 1150° C., because the actual bonding time is related to the bonded joint strength as shown in FIG. 19, the combined P and B addition mitigates the upper limit of the bonding foil thickness by about two times greater from the viewpoint of the bonded joint strength.

To simplify the above explanation, the reaction phase diagram expected to prevail during bonding significantly varies between only a P addition, only a B addition, and a combined P and B addition.

Although the present invention relates to an alloy foil for liquid phase diffusion bonding, it enables bonding in air and is also applied to diffusion brazing.

EXAMPLE 1

Alloys for liquid phase diffusion bonding according to the first invention were used to carry out liquid phase diffusion bonding of an Fe-based material. The conditions of use and the obtained results will be described together with those of comparative samples with reference to the following Tables and the attached drawings.

About 100 g of alloys having a chemical composition of any one of the first to fourth aspects of the first invention were quenched by a single roll method (a 300 mm dia. copper cooling roll) to form 2 to 215 mm wide, 3.0 to 100 μm thick alloy foils having a substantially amorphous crystallographic structure.

The peripheral speed of the cooling roll was kept at 5.0 to 15.0 m/s.

As shown in Table 1 (Tables 1-1 to 1-8), all of the alloy foils of the present invention had Fe-based chemical compositions (atomic percentage), in which the difference between 100% and the total amounts of the listed components means the sum of the amounts of Fe and unavoidable impurities.

Table 2 shows the chemical compositions of comparative alloys (atomic percentage), which are also Fe-based and the difference between 100% and the total amounts of the listed components means the sum of the amounts of Fe and unavoidable impurities. The comparative alloy foils of Table 2 were produced in the same manner as the present inventive alloy foils of Table 1.

Liquid phase diffusion bonding was carried out by using the alloy foils No. 1 to No. 199 of Table 1 (hereinafter referred to as "inventive insert metal") satisfying any one of the first to fifth aspects of the first invention and the comparative alloy foils No. 200 to No. 212 of Table 2 (which are hereinafter referred to as "comparative insert metal") and include conventional insert metals).

The inventive insert metals were 3 to 100 μm thick and 20 mm in diameter, the comparative insert metals were 5.16 to 133.74 μm thick and 20 mm in diameter, the base material was an Fe-based material (JIS STK400), and the insert metals were inserted between two round steel bars (20 mm in dia.) of the base material as shown in FIG. 1.

FIG. 1 shows round steel bars 1, 1 of the material to be bonded and an insert metal 2 or an alloy for liquid phase diffusion bonding.

The liquid phase diffusion bonding was carried out in air with a bonding temperature of from immediately above the melting point of the alloy foil to the melting point plus 50° C. in a large scale heating furnace with a target temperature of effectively 950 to 1000° C.

The base material 1 and the insert metal 2 were pressed together at a pressure of 2 megapascal (MPa) to ensure good contact therebetween.

The bonding time was 10 min in all cases, the following heat treatments were conducted alone or in combination to ensure the strength, corrosion resistance, and toughness of the bonded material, and the heat treatments including tempering, tempering plus annealing, annealing plus tempering, quench-hardening plus annealing plus tempering.

During any of these heat treatments, the mutual diffusion of elements between the materials to be bonded proceeded to homogenize the bonded joint but no substantial formation, increase, or growth of precipitates was observed in the inventive insert metal.

Then, a JIS No. 2 subsize round bar tensile test was conducted to determine the soundness of the bonded joint with the result that the non-bonded area percentage was 0% for all test pieces bonded with the present inventive insert metals.

Figure 2:
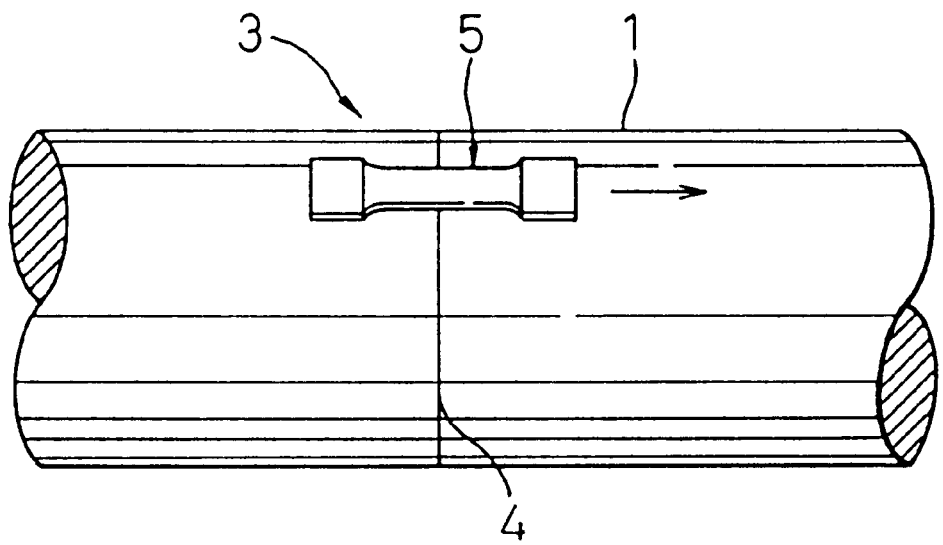
FIG. 2 is a plan view showing a liquid phase diffusion-bonded round steel bar test piece and a tensile test piece sampled therefrom.
Figure 3:
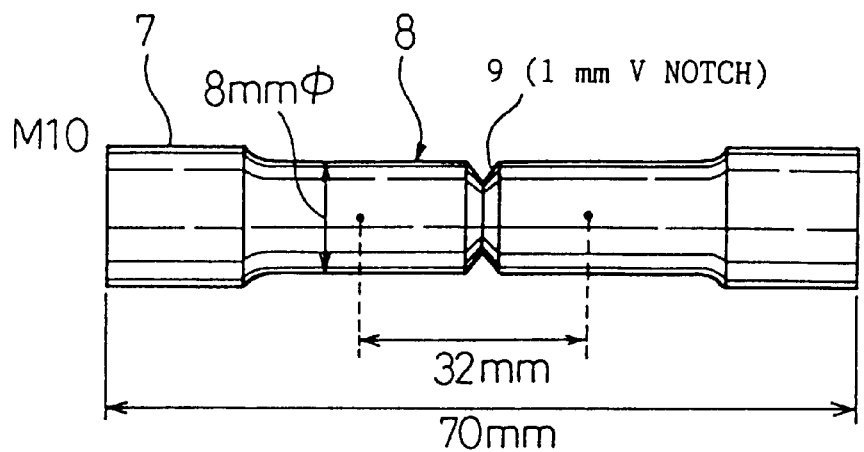
FIG. 3 is a plan view showing a tensile test piece sampled by a tensile test piece sampler.

In the manner as shown in FIG. 2, JIS No. A2 test pieces having a shape shown in FIG. 3 were machined from a round steel bar in the direction of the bar axis and then were subjected to a tensile test at room temperature to determine the bonded joint fracture strength.

The tensile fracture strength of the bonded joint is determined by the base material, the thickness, the service environment, etc., and, in this Example, a required minimum strength was provisionally set as 400 MPa from the practical limit and a bonded joint was judged to be sound when a fracture strength was more than that value. The experimental results are also shown in Tables 1 and 2.

It can be seen from Table 1 that the bonded joints obtained by the liquid phase diffusion bonding using the alloy foils according to the present invention all exhibited an extremely good bonded joint strength including a strength greater than the target level of 400 MPa.

In contrast, the bonded joints obtained by the liquid phase diffusion bonding using the comparative alloy foils not satisfying the present inventive scope all exhibited a bonded joint strength lower than the target level of 400 MPa, in which none was practically acceptable. Individual results will be described later.

Figure 6:
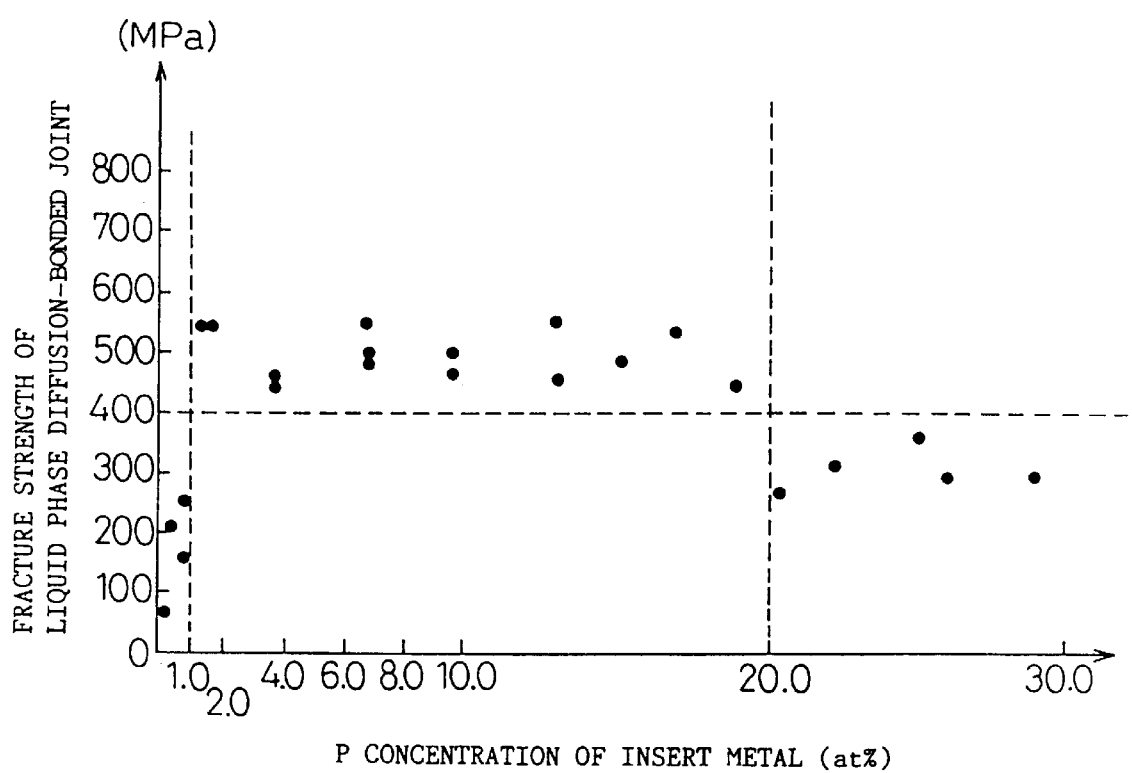
FIG. 6 is a graph relating to the first invention and showing the relationship between the P content of an Fe-based insert metal and the fracture strength of the bonded joint of a liquid phase diffusion-bonded Fe-based material.
Figure 7:
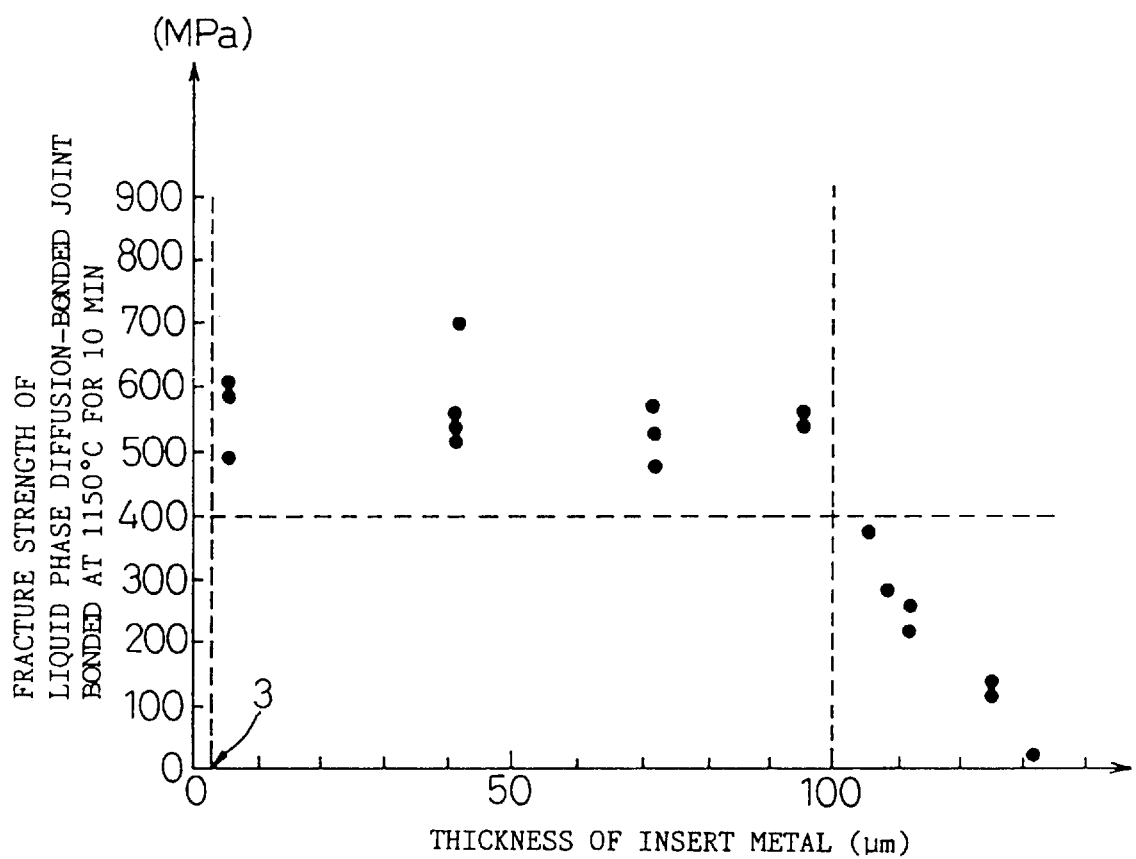
FIG. 7 is a graph relating to the first invention and showing the relationship between the thickness of an Fe-based insert metal and the fracture strength of the bonded joint of a liquid phase diffusion-bonded Fe-based material.
Figure 8:
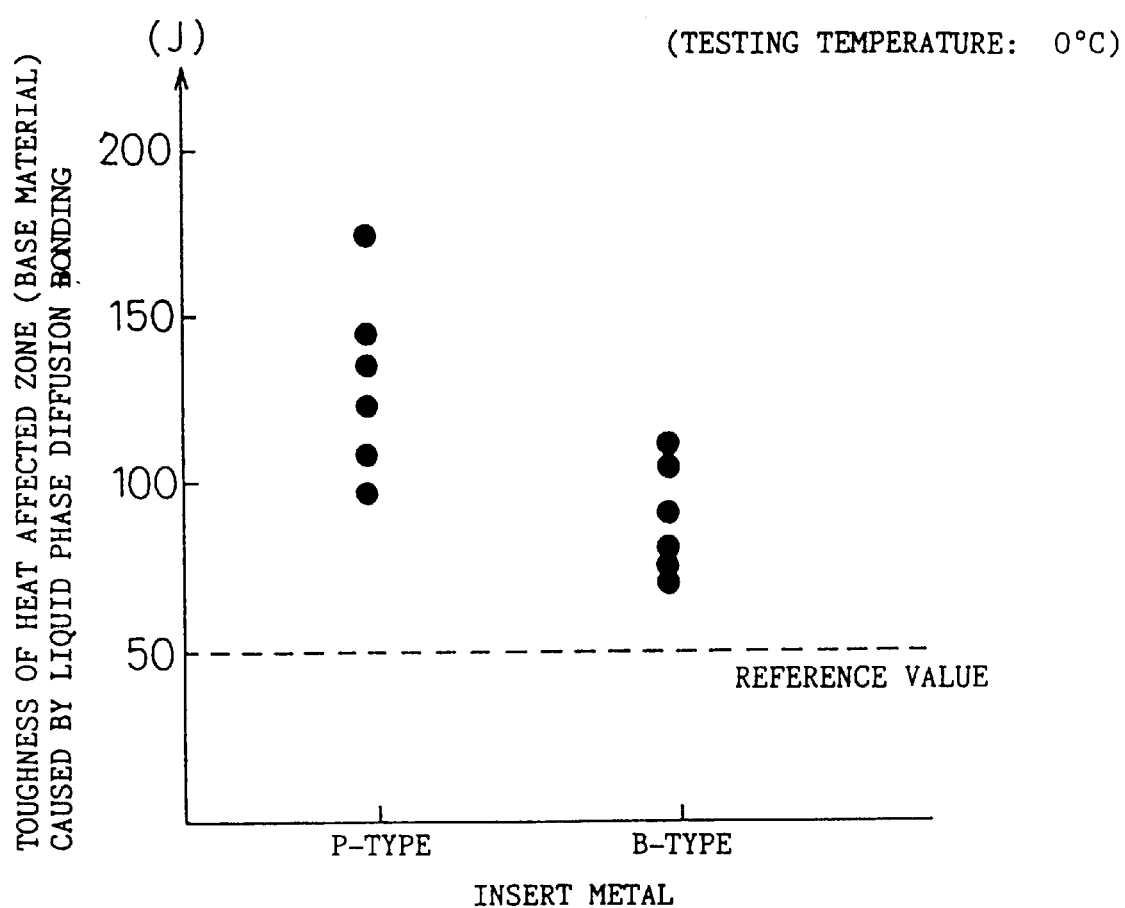
FIG. 8 is a graph relating to the first and second inventions and showing the toughness at 0° C. of the heat-affected zone (base material) of a liquid phase diffusion-bonded Fe-based material using an Fe-based insert metal, in which B-type and P-type insert metals are compared.

FIGS. 4 to 7 show the relationship between the specified component elements or the thickness of the alloy foil for liquid phase diffusion bonding according to the present invention and the bonded joint fracture strength (expressed in MPa) and FIG. 8 shows the toughness of the heat affected zone (base material).

Figure 4:
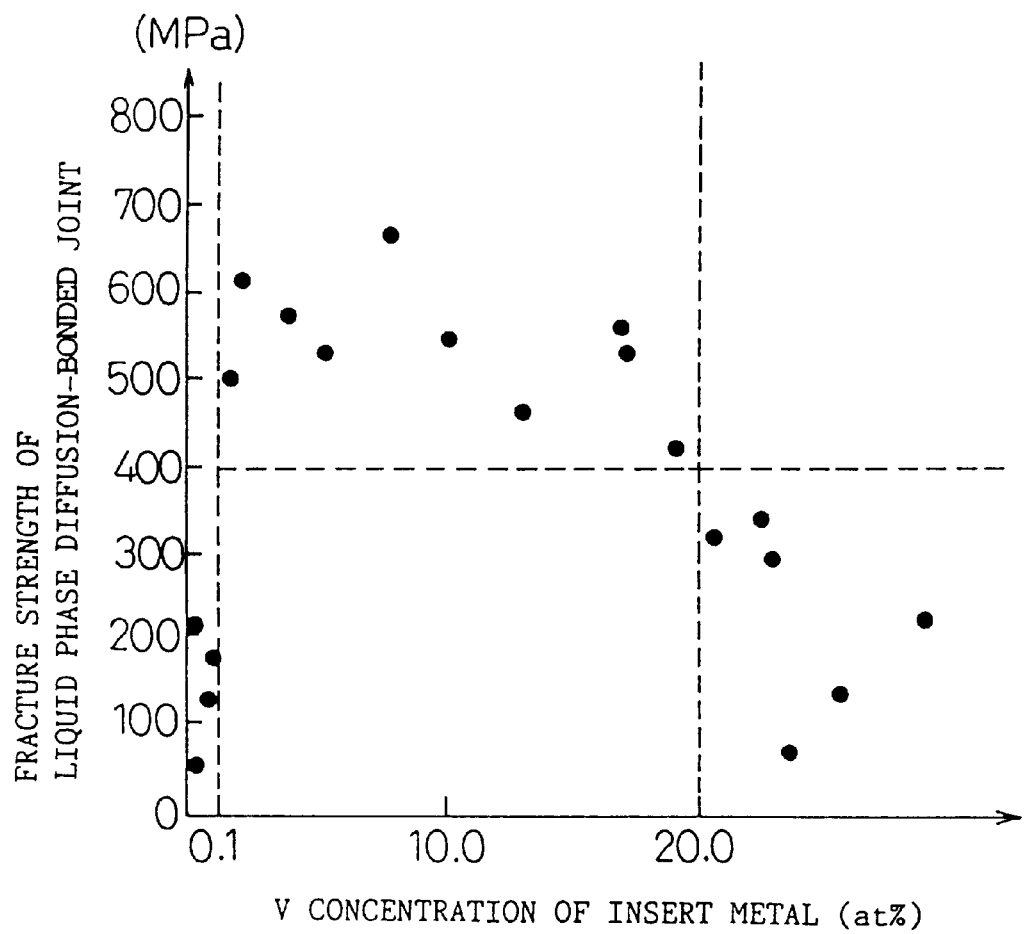
FIG. 4 is a graph relating to the first invention and showing the relationship between the V content of an Fe-based insert metal and the fracture strength of the bonded joint of a liquid phase diffusion-bonded Fe-base material.

FIG. 4 shows the influence of the V concentration of the insert metal on the bonded joint fracture strength. When the V concentration is less than 0.1% in terms of atomic percentage, the oxide film on the base material cannot completely be rendered harmless and the bonded joint strength is low, whereas in the range of from 0.1 to 20.0% in terms of atomic percentage, the bonded joint fracture strength is comparable with, or greater than, that of the base material (the material to be bonded), which means that V effectively operates to render the oxide film harmless. However, when the V concentration is more than 20% in terms of atomic percentage, the insert metal has a higher melting point causing shortage of the bonding time and degradation of the bonded joint fracture strength.

Figure 5:
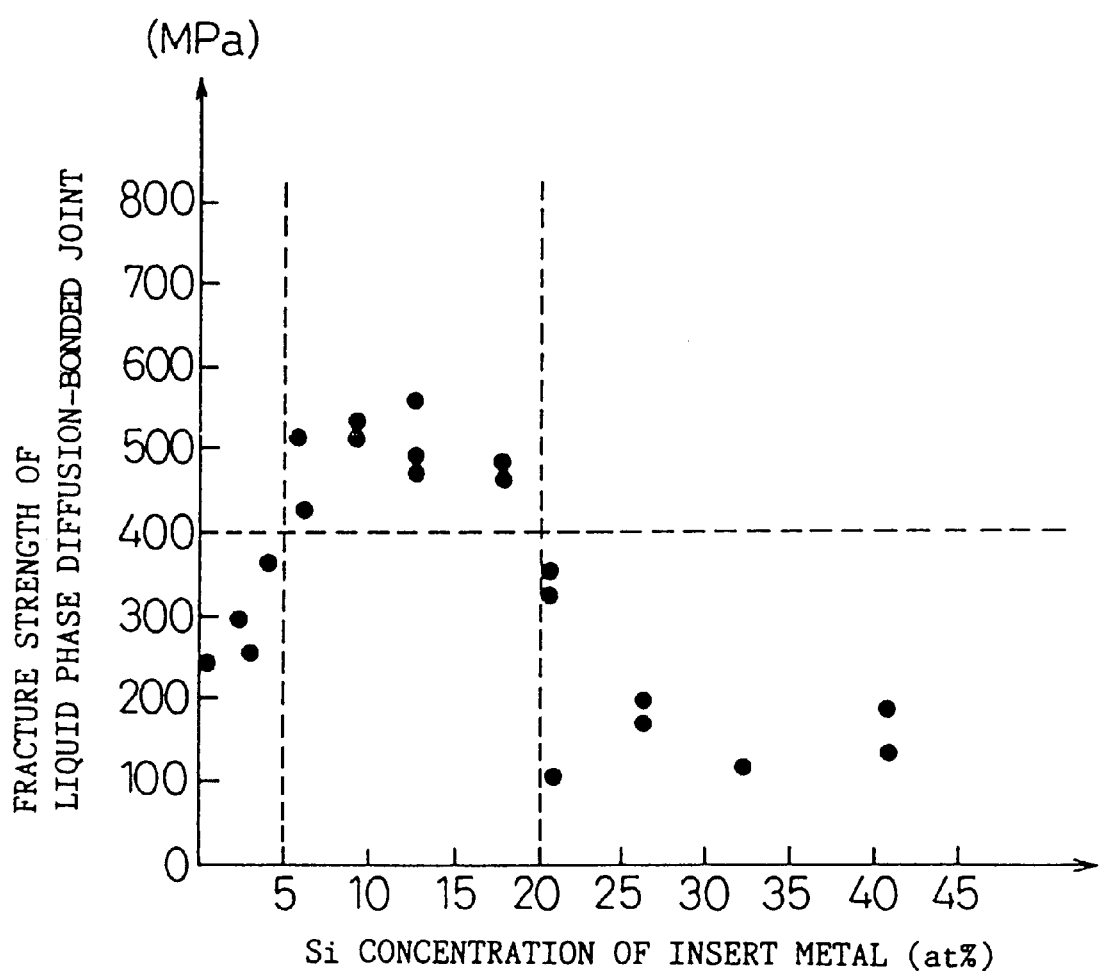
FIG. 5 is a graph relating to the first invention and showing the relationship between the Si content of an Fe-based insert metal and the fracture strength of the bonded joint of a liquid phase diffusion-bonded Fe-base material.

FIG. 5 likewise shows the relationship between the Si content and the bonded joint fracture strength. The bonded joint fracture strength is reduced either when the Si content is less than 5.0%, particularly less than 1.0%, or when the Si content is more than 20.0%, whereas Si contents of from 1.0 to 20.0% ensure a high fracture strength of the bonded joint.

FIG. 6 shows the relationship between the P content and the bonded joint fracture strength. The bonded joint fracture strength is reduced either when the P content is less than 1.0%, whereby the insert metal has a high melting point, or when the P content is more than 20.0%, whereby intermetallic compounds are formed near the bonded interface. P contents of from 1.0 to 20.0% ensures a high fracture strength of the bonded joint.

FIG. 7 shows the relationship between the insert metal thickness and the bonded joint fracture strength, in which it can be seen that foils having a thickness more than 100 μm fail to provide good fracture strength at the bonded joint.

FIG. 8 shows the toughness at 0° C. of the base material in the vicinity of the bonded joint when P is used as a diffusion element in comparison with that when B is used as a diffusion element. The experimental conditions are summarized in Tables 3 and 4.

It can be seen from FIG. 8 and Tables 3 and 4 that, when P is used as a diffusion element, the bonding time is significantly longer than that required when B is used as a diffusion element, but the bonding temperature can be lower than 1000° C. to minimize thermal influence on the base material (material to be bonded) thereby improving the toughness of the base material in the vicinity of the bonded joint.

The toughness herein referred to was determined by a impact test using a JIS No. 4 Charpy impact test piece machined from a bonded round steel bar sample as an estimate of coarsening of the crystal grains in the heat affected zone of the base material (STK400), in which a threshold toughness was determined as 50J, which is frequently used as an estimation reference for general structural materials.

Table 2 shows the chemical compositions and the determined tensile fracture strength of the bonded joint for comparative examples to be compared with those of the present inventive alloy foils.

It can be seen from Table 2 that Comparative Sample No. 200 contains P in an insufficient amount whereby the melting point is higher than 1300° C. to result in a significantly small fracture strength and that Comparative Sample No. 201 contains P in an excessive amount whereby coarse intermetallic compounds are formed near the bonded joint to reduce the bonded joint fracture strength.

Comparative Sample No. 202 contains Si in an insufficient amount whereby the melting point is higher than 1300° C. with the result that the bonded joint fracture strength is significantly reduced, and Comparative Sample No. 203 contains Si in an excessive amount whereby coarse $SiO_2$-based oxides are formed in the insert metal during bonding to reduce the bonded point fracture strength.

Comparative Sample No. 204 contains V in an insufficient amount whereby an oxide film formed on the base material surface was not completely rendered harmless and the bonded joint fracture strength is small, and Comparative Sample No. 205 contains V in an excessive amount whereby the melting point of the insert metal is extremely high and liquid phase diffusion bonding is not completely effected to cause reduction in the bonded joint fracture strength.

Comparative Sample No. 206 contains a large amount of Cr whereby the melting point is extremely high and liquid phase diffusion bonding is not completely effected to cause significant reduction in the bonded joint fracture strength, and Comparative Sample No. 207 contains a large amount Ni whereby a Ni phase forms inclusions in an Fe phase to cause the microstructure to be inhomogeneous, the toughness to be lowered, and the bonded joint fracture strength to be reduced.

Comparative Sample No. 208 contains an excessive amount of Co whereby coarse intermetallic compounds are formed to reduce the toughness and the bonded joint fracture strength is reduced, and Comparative Sample No. 209 contains an excessive amount of W whereby coarse intermetallic compounds are formed to reduce the toughness and the bonded joint fracture strength is thereby reduced, and Comparative Sample No. 210 contains an excessive amount of Nb whereby coarse Fe-Nb-based intermetallic compounds are precipitated to cause embrittlement and reduction in the bonded joint fracture strength.

Comparative Sample No. 211 contains an excessive amount of Ti whereby coarse intermetallic compounds are formed in a large amount to cause reduction in the toughness and the bonded joint fracture strength, and Comparative Sample No. 212 has too large a foil thickness to cause reduction in the bonded joint fracture strength.

As described above, the target fracture strength of the bonded joint of 400 MPa cannot be achieved by liquid phase diffusion bonding using the comparative insert metals, which partially satisfy, but do not completely satisfy, the specified requirement of the present invention.

TABLE 1

| | Chemical Composition of Alloy Foil (at %) | | | | | | | | Foil Thickness | Bonding | Fracture Strength |
| --- | --- | --- | --- | --- | --- | --- | --- | --- | --- | --- | --- |
| No. | P | Si | V | Cr | Ni | Co | W | Nb | Ti | (μm) | Atmosphere | (MPa) |
| 1 | 6.45 | 11.31 | 9.32 | | | | | | | 46 | Air | 496.61 |
| 2 | 6.70 | 18.37 | 3.40 | | | | | | | 71 | Air | 467.01 |

TABLE 1-continued

| | Chemical Composition of Alloy Foil (at %) | | | | | | | | Foil Thickness | Bonding | Fracture Strength |
| --- | --- | --- | --- | --- | --- | --- | --- | --- | --- | --- | --- |
| No. | P | Si | V | Cr | Ni | Co | W | Nb | Ti | (μm) | Atmosphere | (MPa) |
| 3 | 16.83 | 5.07 | 7.24 | | | | | | | 12 | Air | 486.19 |
| 4 | 8.66 | 1.11 | 17.92 | | | | | | | 12 | Air | 539.61 |
| 5 | 11.12 | 3.47 | 6.58 | | | | | | | 78 | Air | 482.89 |
| 6 | 9.73 | 14.83 | 11.35 | | | | | | | 42 | Air | 506.76 |
| 7 | 16.10 | 2.60 | 19.50 | | | | | | | 8 | Air | 547.50 |
| 8 | 10.87 | 19.21 | 8.13 | | | | | | | 44 | Air | 490.66 |
| 9 | 11.42 | 8.96 | 19.84 | | | | | | | 7 | Air | 549.22 |
| 10 | 2.14 | 6.31 | 15.03 | | | | | | | 29 | Air | 525.16 |
| 11 | 11.59 | 9.53 | 13.04 | 10.15 | | | | | | 36 | Air | 515.18 |
| 12 | 15.31 | 16.79 | 14.24 | 10.85 | | | | | | 45 | Air | 521.22 |
| 13 | 15.02 | 1.20 | 18.54 | 4.46 | | | | | | 32 | Air | 542.68 |
| 14 | 13.26 | 3.07 | 16.56 | | 5.57 | | | | | 89 | Air | 532.80 |
| 15 | 13.94 | 4.39 | 2.03 | | 0.86 | | | | | 18 | Air | 460.15 |
| 16 | 1.48 | 18.82 | 7.65 | | 9.99 | | | | | 98 | Air | 488.25 |
| 17 | 1.45 | 12.69 | 5.67 | | | 1.57 | | | | 88 | Air | 478.36 |
| 18 | 10.52 | 9.20 | 14.76 | | | 14.51 | | | | 62 | Air | 523.82 |
| 19 | 1.38 | 9.12 | 12.78 | | | 2.28 | | | | 50 | Air | 513.92 |
| 20 | 11.40 | 10.12 | 3.03 | 15.06 | 2.14 | | | | | 20 | Air | 465.13 |
| 21 | 18.41 | 15.89 | 6.92 | 3.41 | 5.44 | | | | | 94 | Air | 484.62 |
| 22 | 16.28 | 13.34 | 17.93 | 18.13 | 10.99 | | | | | 64 | Air | 539.67 |
| 23 | 4.58 | 9.21 | 0.28 | | 11.20 | 3.09 | | | | 60 | Air | 451.41 |
| 24 | 7.14 | 2.06 | 7.42 | | 2.49 | 13.85 | | | | 92 | Air | 487.08 |
| 25 | 8.75 | 5.29 | 16.12 | | 13.85 | 10.54 | | | | 59 | Air | 530.62 |
| 26 | 11.11 | 7.96 | 17.15 | 4.78 | | 0.20 | | | | 43 | Air | 535.77 |
| 27 | 2.64 | 15.83 | 12.99 | 5.27 | | 4.52 | | | | 42 | Air | 514.97 |
| 28 | 1.71 | 13.02 | 7.31 | 15.57 | | 6.41 | | | | 11 | Air | 486.53 |
| 29 | 4.15 | 12.15 | 7.05 | 10.67 | 12.48 | 14.79 | | | | 70 | Air | 485.23 |
| 30 | 4.08 | 5.76 | 2.90 | 10.59 | 2.10 | 5.82 | | | | 45 | Air | 464.49 |
| 31 | 13.13 | 3.94 | 11.11 | 17.26 | 5.18 | 2.68 | | | | 76 | Air | 505.53 |
| 32 | 18.33 | 18.46 | 4.33 | | | | 6.49 | | | 42 | Air | 536.61 |
| 33 | 8.58 | 12.66 | 18.98 | | | | 2.83 | | | 52 | Air | 573.14 |
| 34 | 4.14 | 3.27 | 1.58 | | | | 7.92 | | | 37 | Air | 537.08 |
| 35 | 8.54 | 3.97 | 6.76 | | | | | 8.04 | | 75 | Air | 540.07 |
| 36 | 13.96 | 2.59 | 11.28 | | | | | 3.95 | | 66 | Air | 534.02 |
| 37 | 3.64 | 3.13 | 14.70 | | | | | 2.54 | | 84 | Air | 541.27 |
| 38 | 8.42 | 11.98 | 3.23 | | | | | | 7.68 | 34 | Air | 527.57 |
| 39 | 17.78 | 15.85 | 6.47 | | | | | | 9.06 | 34 | Air | 554.85 |
| 40 | 3.78 | 4.85 | 10.26 | | | | | | 8.18 | 77 | Air | 566.76 |
| 41 | 1.64 | 12.39 | 9.17 | | | | 5.83 | 1.14 | | 39 | Air | 562.09 |
| 42 | 10.50 | 5.61 | 1.31 | | | | 3.64 | 1.49 | | 16 | Air | 503.37 |
| 43 | 5.89 | 18.61 | 10.74 | | | | 1.93 | 7.38 | | 93 | Air | 574.64 |
| 44 | 14.76 | 16.80 | 17.36 | | | | | 0.30 | 7.98 | 39 | Air | 602.71 |
| 45 | 3.12 | 13.17 | 13.21 | | | | | 6.51 | 9.50 | 64 | Air | 637.66 |
| 46 | 14.99 | 12.07 | 12.22 | | | | | 4.57 | 0.40 | 11 | Air | 546.26 |
| 47 | 17.74 | 13.98 | 4.47 | | | | 5.31 | | 3.44 | 85 | Air | 552.97 |
| 48 | 15.48 | 16.75 | 13.19 | | | | 3.91 | | 1.52 | 69 | Air | 567.28 |
| 49 | 6.48 | 14.56 | 18.35 | | | | 1.04 | | 4.05 | 36 | Air | 584.57 |
| 50 | 9.96 | 12.11 | 15.39 | | | | 7.62 | 9.20 | 3.73 | 75 | Air | 697.45 |
| 51 | 10.75 | 11.00 | 19.76 | | | | 4.47 | 2.04 | 6.51 | 9 | Air | 659.83 |
| 52 | 7.24 | 17.86 | 3.65 | | | | 6.78 | 8.59 | 2.69 | 19 | Air | 617.79 |
| 53 | 8.59 | 5.81 | 4.39 | 12.28 | | | 7.68 | | | 84 | Air | 548.82 |
| 54 | 11.34 | 10.92 | 17.78 | 10.31 | | | 3.73 | | | 88 | Air | 576.02 |
| 55 | 9.73 | 17.71 | 9.66 | 13.60 | | | 4.87 | | | 100 | Air | 547.02 |
| 56 | 1.93 | 2.53 | 12.22 | 15.83 | | | | 9.60 | | 4 | Air | 578.28 |
| 57 | 8.39 | 7.06 | 16.64 | 5.35 | | | | 7.71 | | 36 | Air | 587.17 |
| 58 | 12.47 | 1.29 | 8.49 | 13.00 | | | | 4.29 | | 49 | Air | 522.49 |
| 59 | 15.72 | 16.35 | 10.45 | 1.07 | | | | | 8.27 | 62 | Air | 568.46 |
| 60 | 5.64 | 11.09 | 14.93 | 0.71 | | | | | 4.78 | 92 | Air | 562.87 |
| 61 | 17.70 | 8.58 | 0.93 | 12.59 | | | | | 6.18 | 15 | Air | 504.05 |
| 62 | 15.75 | 15.61 | 16.11 | 8.31 | | | 2.78 | 6.95 | | 36 | Air | 606.90 |
| 63 | 11.52 | 10.34 | 15.68 | 3.41 | | | 4.57 | 4.39 | | 69 | Air | 604.89 |
| 64 | 6.12 | 11.09 | 15.54 | 17.31 | | | 0.99 | 8.49 | | 43 | Air | 597.05 |
| 65 | 18.70 | 6.62 | 18.67 | 2.99 | | | | 9.65 | 7.86 | 24 | Air | 673.76 |
| 66 | 14.90 | 18.10 | 12.66 | 2.94 | | | | 6.23 | 9.53 | 5 | Air | 633.11 |
| 67 | 6.94 | 18.73 | 12.48 | 16.74 | | | | 7.35 | 5.64 | 96 | Air | 608.91 |
| 68 | 5.21 | 6.35 | 3.34 | 18.21 | | | 2.71 | | 4.67 | 12 | Air | 531.20 |
| 69 | 8.99 | 18.98 | 15.59 | 8.75 | | | 4.92 | | 6.26 | 59 | Air | 627.20 |
| 70 | 14.09 | 2.33 | 16.37 | 17.92 | | | 8.59 | | 9.97 | 92 | Air | 697.53 |
| 71 | 15.20 | 18.74 | 0.85 | 7.72 | | | 2.56 | 8.83 | 3.91 | 93 | Air | 572.89 |
| 72 | 10.31 | 14.41 | 10.84 | 3.42 | | | 5.77 | 8.79 | 0.79 | 20 | Air | 629.66 |
| 73 | 18.39 | 6.89 | 7.87 | 5.14 | | | 7.33 | 1.54 | 5.16 | 4 | Air | 614.76 |
| 74 | 3.53 | 3.89 | 11.80 | | 10.86 | | 7.96 | | | 75 | Air | 588.64 |
| 75 | 6.55 | 17.16 | 13.02 | | 5.55 | | 6.54 | | | 88 | Air | 580.44 |
| 76 | 13.44 | 10.48 | 7.19 | | 5.82 | | 7.69 | | | 42 | Air | 562.83 |

TABLE 1-continued

| | Chemical Composition of Alloy Foil (at %) | | | | | | | | Foil Thickness | Bonding | Fracture Strength |
|---|---|---|---|---|---|---|---|---|---|---|---|
| No. | P | Si | V | Cr | Ni | Co | W | Nb | Ti | (μm) | Atmosphere | (MPa) |
| 77 | 1.51 | 15.84 | 4.76 | | 13.55 | | | 2.86 | | 72 | Air | 493.79 |
| 78 | 4.88 | 9.39 | 3.63 | | 11.68 | | | 4.49 | | 88 | Air | 499.57 |
| 79 | 12.56 | 9.21 | 0.73 | | 4.61 | | | 5.29 | | 41 | Air | 490.72 |
| 80 | 10.33 | 8.21 | 2.16 | | 1.70 | | | | 4.96 | 49 | Air | 500.47 |
| 81 | 6.83 | 7.17 | 3.69 | | 4.12 | | | | 2.00 | 70 | Air | 484.45 |
| 82 | 16.73 | 13.44 | 6.40 | | 5.55 | | | | 5.64 | 15 | Air | 527.15 |
| 83 | 2.59 | 9.72 | 7.34 | | 0.30 | | 4.60 | 2.44 | | 27 | Air | 549.79 |
| 84 | 2.98 | 4.80 | 3.73 | | 12.48 | | 7.93 | 0.62 | | 18 | Air | 552.34 |
| 85 | 11.74 | 17.14 | 0.31 | | 8.82 | | 1.98 | 4.71 | | 9 | Air | 504.33 |
| 86 | 3.57 | 11.17 | 15.91 | | 8.35 | | | 2.36 | 7.75 | 48 | Air | 608.05 |
| 87 | 10.44 | 4.63 | 18.55 | | 14.48 | | | 5.36 | 0.73 | 38 | Air | 586.18 |
| 88 | 17.69 | 13.60 | 4.01 | | 10.07 | | | 9.77 | 1.95 | 10 | Air | 554.00 |
| 89 | 11.60 | 2.55 | 3.48 | | 8.57 | | 5.88 | | 3.14 | 34 | Air | 551.36 |
| 90 | 14.37 | 4.67 | 7.94 | | 2.29 | | 3.75 | | 0.85 | 48 | Air | 534.01 |
| 91 | 9.76 | 2.74 | 4.03 | | 2.75 | | 5.00 | | 6.13 | 49 | Air | 569.14 |
| 92 | 13.73 | 4.33 | 15.40 | | 7.86 | | 2.84 | 4.90 | 4.11 | 83 | Air | 622.53 |
| 93 | 16.82 | 16.18 | 9.08 | | 13.76 | | 0.89 | 1.33 | 0.88 | 36 | Air | 520.59 |
| 94 | 8.40 | 15.81 | 18.61 | | 12.44 | | 6.78 | 8.40 | 0.71 | 38 | Air | 675.28 |
| 95 | 5.34 | 19.58 | 8.07 | | | 5.86 | 6.83 | | | 54 | Air | 558.62 |
| 96 | 14.01 | 6.53 | 9.63 | | | 10.37 | 8.48 | | | 50 | Air | 582.95 |
| 97 | 17.80 | 16.69 | 9.99 | | | 5.16 | 2.97 | | | 11 | Air | 529.69 |
| 98 | 6.06 | 7.90 | 10.90 | | | 13.90 | | 5.26 | | 96 | Air | 541.31 |
| 99 | 15.79 | 13.26 | 8.65 | | | 14.09 | | 5.32 | | 34 | Air | 530.43 |
| 100 | 19.95 | 1.47 | 14.47 | | | 3.14 | | 3.55 | | 42 | Air | 547.25 |
| 101 | 4.09 | 6.88 | 8.01 | | | 9.18 | | | 1.25 | 73 | Air | 500.06 |
| 102 | 7.55 | 12.68 | 5.18 | | | 3.50 | | | 3.71 | 8 | Air | 505.60 |
| 103 | 16.47 | 13.03 | 12.84 | | | 11.69 | | | 8.53 | 49 | Air | 582.40 |
| 104 | 12.83 | 1.70 | 12.04 | | | 1.83 | 7.60 | 5.85 | | 58 | Air | 627.19 |
| 105 | 8.54 | 1.72 | 6.91 | | | 0.41 | 7.06 | 5.25 | | 55 | Air | 591.89 |
| 106 | 15.52 | 6.94 | 5.75 | | | 11.21 | 4.36 | 1.62 | | 55 | Air | 533.67 |
| 107 | 15.00 | 8.97 | 7.41 | | | 8.26 | | 7.19 | 0.64 | 17 | Air | 542.44 |
| 108 | 12.20 | 1.60 | 15.71 | | | 4.31 | | 4.08 | 7.06 | 10 | Air | 613.61 |
| 109 | 14.60 | 10.36 | 7.22 | | | 9.90 | | 2.82 | 5.52 | 88 | Air | 550.03 |
| 110 | 2.06 | 11.24 | 9.67 | | | 4.82 | 1.55 | | 3.40 | 87 | Air | 541.03 |
| 111 | 11.51 | 10.60 | 11.33 | | | 6.84 | 0.32 | | 0.71 | 34 | Air | 515.50 |
| 112 | 13.25 | 7.16 | 12.79 | | | 13.78 | 6.05 | | 2.92 | 91 | Air | 597.80 |
| 113 | 3.00 | 4.21 | 19.57 | | | 13.02 | 0.65 | 3.05 | 7.62 | 96 | Air | 636.64 |
| 114 | 13.38 | 19.92 | 7.21 | | | 11.56 | 0.77 | 7.26 | 5.39 | 42 | Air | 587.71 |
| 115 | 13.16 | 19.50 | 4.48 | | | 13.77 | 2.85 | 2.95 | 8.43 | 36 | Air | 588.97 |
| 116 | 1.33 | 2.51 | 10.01 | 18.87 | 1.34 | | 0.76 | | | 52 | Air | 507.59 |
| 117 | 13.49 | 3.32 | 8.69 | 13.38 | 11.03 | | 9.43 | | | 29 | Air | 587.69 |
| 118 | 4.21 | 9.14 | 18.48 | 11.25 | 11.72 | | 0.15 | | | 16 | Air | 543.89 |
| 119 | 12.23 | 2.54 | 5.92 | 8.09 | 7.66 | | | 4.25 | | 40 | Air | 509.36 |
| 120 | 4.03 | 12.19 | 16.07 | 18.18 | 11.81 | | | 9.14 | | 72 | Air | 594.33 |
| 121 | 13.18 | 14.64 | 11.71 | 7.46 | 10.34 | | | 5.37 | | 57 | Air | 546.12 |
| 122 | 17.43 | 13.73 | 16.10 | 18.52 | 13.48 | | | | 5.97 | 30 | Air | 578.25 |
| 123 | 19.33 | 1.43 | 1.03 | 6.22 | 14.01 | | | | 8.89 | 91 | Air | 526.29 |
| 124 | 7.86 | 15.75 | 17.13 | 5.78 | 14.07 | | | | 3.39 | 36 | Air | 562.78 |
| 125 | 7.46 | 3.39 | 7.95 | 18.02 | 6.38 | | 5.94 | 7.47 | | 38 | Air | 601.48 |
| 126 | 13.26 | 8.04 | 7.64 | 19.45 | 9.10 | | 9.44 | 7.70 | | 73 | Air | 636.50 |
| 127 | 15.78 | 8.83 | 4.82 | 10.11 | 14.65 | | 3.10 | 0.94 | | 44 | Air | 511.64 |
| 128 | 1.33 | 5.12 | 15.17 | 11.54 | 13.53 | | | 8.13 | 5.68 | 36 | Air | 628.22 |
| 129 | 17.17 | 17.46 | 19.85 | 10.20 | 8.08 | | | 9.03 | 9.48 | 22 | Air | 688.23 |
| 130 | 17.73 | 6.74 | 13.43 | 12.96 | 6.24 | | | 5.23 | 6.08 | 54 | Air | 602.34 |
| 131 | 5.38 | 9.74 | 17.44 | 11.44 | 2.22 | | 2.74 | | 1.23 | 39 | Air | 574.40 |
| 132 | 7.24 | 19.32 | 4.51 | 4.28 | 12.90 | | 2.22 | | 7.52 | 98 | Air | 554.95 |
| 133 | 3.19 | 7.87 | 6.70 | 9.42 | 12.03 | | 7.06 | | 8.42 | 97 | Air | 621.46 |
| 134 | 5.78 | 10.02 | 5.12 | 4.67 | 9.43 | | 1.72 | 0.43 | 3.79 | 63 | Air | 526.24 |
| 135 | 7.28 | 14.37 | 8.84 | 9.14 | 1.81 | | 8.41 | 6.63 | 3.95 | 49 | Air | 656.26 |
| 136 | 13.31 | 11.97 | 9.49 | 17.53 | 0.30 | | 6.51 | 6.46 | 7.41 | 30 | Air | 667.02 |
| 137 | 5.45 | 11.22 | 8.52 | | 5.81 | 2.63 | 2.61 | | | 46 | Air | 518.67 |
| 138 | 8.17 | 10.96 | 11.65 | | 2.92 | 8.78 | 6.27 | | | 6 | Air | 570.89 |
| 139 | 17.52 | 2.11 | 9.37 | | 2.41 | 12.35 | 6.13 | | | 43 | Air | 558.15 |
| 140 | 13.17 | 8.95 | 16.05 | | 6.34 | 3.63 | | 9.88 | | 80 | Air | 599.39 |
| 141 | 18.61 | 4.71 | 4.63 | | 2.67 | 7.13 | | 0.33 | | 30 | Air | 475.45 |
| 142 | 13.02 | 7.81 | 3.01 | | 5.75 | 13.39 | | 5.41 | | 61 | Air | 502.93 |
| 143 | 3.99 | 4.49 | 2.60 | | 6.72 | 10.07 | | | 3.74 | 17 | Air | 492.97 |
| 144 | 19.34 | 15.06 | 7.40 | | 8.23 | 14.03 | | | 2.57 | 17 | Air | 507.55 |
| 145 | 14.96 | 16.51 | 5.69 | | 10.49 | 9.72 | | | 1.25 | 40 | Air | 488.43 |
| 146 | 2.87 | 19.69 | 4.03 | | 7.23 | 1.43 | 8.52 | 6.38 | | 84 | Air | 599.98 |
| 147 | 10.39 | 10.90 | 11.25 | | 9.47 | 9.16 | 8.57 | 1.45 | | 11 | Air | 602.14 |
| 148 | 10.74 | 16.91 | 8.58 | | 2.81 | 0.26 | 9.75 | 1.36 | | 42 | Air | 599.91 |
| 149 | 1.98 | 17.40 | 12.19 | | 5.61 | 12.81 | | 9.77 | 2.35 | 18 | Air | 598.13 |
| 150 | 13.52 | 2.74 | 6.96 | | 6.58 | 7.59 | | 6.64 | 0.43 | 55 | Air | 534.78 |

TABLE 1-continued

| | Chemical Composition of Alloy Foil (at %) | | | | | | | | Foil Thickness | Bonding | Fracture Strength |
|---|---|---|---|---|---|---|---|---|---|---|---|
| No. | P | Si | V | Cr | Ni | Co | W | Nb | Ti | (μm) | Atmosphere | (MPa) |
| 151 | 9.05 | 18.42 | 14.45 | | 7.43 | 9.38 | | 9.72 | 2.19 | 61 | Air | 607.80 |
| 152 | 17.53 | 13.61 | 8.44 | | 1.36 | 7.62 | 9.90 | | 2.78 | 43 | Air | 613.40 |
| 153 | 11.09 | 19.48 | 11.90 | | 14.55 | 13.55 | 1.00 | | 4.86 | 13 | Air | 558.35 |
| 154 | 11.81 | 13.80 | 18.39 | | 11.67 | 11.77 | 8.32 | | 7.30 | 13 | Air | 683.58 |
| 155 | 4.23 | 5.41 | 12.96 | | 6.21 | 1.69 | 8.53 | 6.26 | 2.34 | 92 | Air | 662.61 |
| 156 | 6.07 | 2.19 | 16.64 | | 7.83 | 7.18 | 6.97 | 1.62 | 6.02 | 32 | Air | 662.42 |
| 157 | 15.37 | 10.39 | 17.69 | | 6.44 | 7.73 | 8.08 | 7.79 | 1.84 | 11 | Air | 688.54 |
| 158 | 4.68 | 16.62 | 12.50 | 1.44 | | 6.33 | 7.84 | | | 86 | Air | 590.93 |
| 159 | 18.95 | 7.37 | 1.09 | 4.63 | | 10.50 | 2.69 | | | 72 | Air | 482.30 |
| 160 | 16.54 | 3.87 | 18.32 | 9.21 | | 11.55 | 4.70 | | | 72 | Air | 588.62 |
| 161 | 1.20 | 8.43 | 13.41 | 16.22 | | 2.87 | | 2.18 | | 23 | Air | 532.34 |
| 162 | 11.60 | 3.37 | 2.03 | 13.67 | | 11.98 | | 6.18 | | 52 | Air | 503.46 |
| 163 | 2.97 | 4.49 | 11.16 | 18.15 | | 8.00 | | 5.59 | | 57 | Air | 544.92 |
| 164 | 1.13 | 8.43 | 15.17 | 1.35 | | 5.20 | | | 5.17 | 10 | Air | 567.25 |
| 165 | 15.49 | 18.46 | 0.63 | 1.19 | | 7.02 | | | 8.75 | 53 | Air | 523.17 |
| 166 | 19.71 | 4.24 | 4.43 | 8.78 | | 2.20 | | | 2.32 | 56 | Air | 490.74 |
| 167 | 7.02 | 17.66 | 15.77 | 8.95 | | 1.95 | 8.17 | 6.59 | | 80 | Air | 656.63 |
| 168 | 8.05 | 4.28 | 2.61 | 11.28 | | 14.44 | 5.51 | 6.61 | | 94 | Air | 564.37 |
| 169 | 10.16 | 1.91 | 8.28 | 8.32 | | 13.43 | 1.62 | 3.23 | | 78 | Air | 530.24 |
| 170 | 5.06 | 11.41 | 19.83 | 9.29 | | 7.12 | | 3.54 | 7.24 | 88 | Air | 631.90 |
| 171 | 11.69 | 17.39 | 14.58 | 13.78 | | 7.15 | | 2.66 | 1.58 | 46 | Air | 554.17 |
| 172 | 19.48 | 18.72 | 8.98 | 3.06 | | 10.70 | | 1.67 | 6.99 | 80 | Air | 562.51 |
| 173 | 15.83 | 9.08 | 13.17 | 7.39 | | 14.89 | 0.52 | | 2.40 | 48 | Air | 540.19 |
| 174 | 14.73 | 7.83 | 14.99 | 5.31 | | 4.70 | 9.10 | | 8.84 | 50 | Air | 686.73 |
| 175 | 10.11 | 11.04 | 13.99 | 12.00 | | 5.63 | 2.95 | | 9.33 | 61 | Air | 624.04 |
| 176 | 7.78 | 1.12 | 0.12 | 16.10 | | 13.78 | 0.86 | 4.29 | 4.66 | 84 | Air | 526.51 |
| 177 | 17.44 | 18.76 | 11.90 | 0.12 | | 1.37 | 1.28 | 3.23 | 4.33 | 35 | Air | 579.53 |
| 178 | 6.07 | 15.58 | 10.90 | 19.19 | | 2.85 | 7.72 | 3.10 | 9.74 | 56 | Air | 681.26 |
| 179 | 16.21 | 1.98 | 17.51 | 12.73 | 13.91 | 10.33 | 0.24 | | | 77 | Air | 539.92 |
| 180 | 5.18 | 10.43 | 16.13 | 10.82 | 11.85 | 8.30 | 9.35 | | | 99 | Air | 624.17 |
| 181 | 6.51 | 4.35 | 9.36 | 10.18 | 10.19 | 2.24 | 9.94 | | | 26 | Air | 596.19 |
| 182 | 17.60 | 4.14 | 16.75 | 9.75 | 9.81 | 4.55 | | 5.83 | | 32 | Air | 574.80 |
| 183 | 4.66 | 12.40 | 3.83 | 18.19 | 12.65 | 14.57 | | 2.73 | | 18 | Air | 488.26 |
| 184 | 11.43 | 2.84 | 4.01 | 15.41 | 10.17 | 2.14 | | 5.84 | | 4 | Air | 510.94 |
| 185 | 9.11 | 16.74 | 15.68 | 12.37 | 12.99 | 1.17 | | | 6.59 | 85 | Air | 581.14 |
| 186 | 2.29 | 13.27 | 2.27 | 0.37 | 7.78 | 4.04 | | | 6.88 | 82 | Air | 516.41 |
| 187 | 5.34 | 18.75 | 3.78 | 2.67 | 1.48 | 8.68 | | | 1.29 | 75 | Air | 479.17 |
| 188 | 9.73 | 3.15 | 0.38 | 4.10 | 6.75 | 4.57 | 4.27 | 6.16 | | 54 | Air | 537.75 |
| 189 | 3.82 | 5.34 | 17.04 | 14.01 | 3.14 | 5.09 | 8.09 | 4.97 | | 8 | Air | 650.92 |
| 190 | 16.82 | 16.76 | 0.62 | 4.40 | 14.92 | 3.25 | 4.21 | 6.46 | | 59 | Air | 540.37 |
| 191 | 3.05 | 2.77 | 9.68 | 4.07 | 3.64 | 12.75 | | 5.03 | 5.45 | 71 | Air | 577.24 |
| 192 | 13.95 | 11.41 | 15.74 | 5.89 | 7.96 | 4.11 | | 3.26 | 9.35 | 26 | Air | 626.37 |
| 193 | 5.36 | 6.45 | 6.55 | 15.93 | 6.64 | 0.90 | | 2.98 | 0.76 | 30 | Air | 509.68 |
| 194 | 10.49 | 12.52 | 12.83 | 13.94 | 9.29 | 2.78 | 5.68 | | 9.35 | 95 | Air | 645.74 |
| 195 | 12.15 | 4.67 | 5.17 | 4.75 | 8.38 | 4.16 | 5.05 | | 6.03 | 88 | Air | 574.54 |
| 196 | 16.27 | 16.19 | 0.16 | 2.21 | 5.60 | 11.48 | 7.46 | | 1.06 | 56 | Air | 533.89 |
| 197 | 15.86 | 19.87 | 19.14 | 8.84 | 10.14 | 9.87 | 8.13 | 8.44 | 0.87 | 89 | Air | 693.00 |
| 198 | 7.16 | 4.17 | 12.15 | 19.44 | 5.27 | 3.82 | 8.60 | 7.45 | 5.11 | 44 | Air | 689.74 |
| 199 | 17.38 | 11.38 | 14.02 | 8.49 | 14.61 | 1.27 | 3.37 | 8.18 | 9.79 | 82 | Air | 689.42 |

TABLE 2

| | Chemical Composition of Alloy Foil (at %) | | | | | | | | Foil Thickness | Bonding | Fracture Strength |
|---|---|---|---|---|---|---|---|---|---|---|---|
| No. | P | Si | V | Cr | Ni | Co | W | Nb | Ti | (μm) | Atmosphere | (MPa) |
| 200 | 0.31 | 13.64 | 10.02 | | | | | | | 12.33 | Air | 0.05 |
| 201 | 24.97 | 6.80 | 14.24 | | | | | | | 21.30 | Air | 179.06 |
| 202 | 17.42 | 0.04 | 17.01 | | | | | | | 78.35 | Air | 0.31 |
| 203 | 12.53 | 28.16 | 4.62 | | | | | | | 5.16 | Air | 327.19 |
| 204 | 13.09 | 7.95 | 0.05 | | | | | | | 69.57 | Air | 0.02 |
| 205 | 14.09 | 17.55 | 22.95 | | | | | | | 24.15 | Air | 341.91 |
| 206 | 5.78 | 10.44 | 10.91 | 23.15 | | | | | | 64.65 | Air | 123.71 |
| 207 | 5.14 | 6.90 | 8.07 | | 19.93 | | | | | 40.54 | Air | 117.93 |
| 208 | 9.65 | 14.36 | 1.07 | | | 18.71 | | | | 42.86 | Air | 198.49 |
| 209 | 4.86 | 15.47 | 19.18 | | | | 14.52 | | | 90.92 | Air | 145.05 |
| 210 | 1.86 | 19.78 | 18.05 | | | | | 16.17 | | 11.11 | Air | 180.77 |
| 211 | 2.40 | 9.99 | 13.40 | 11.21 | 1.57 | 2.95 | | | 14.44 | 84.27 | Air | 214.24 |
| 212 | 15.51 | 6.32 | 13.93 | | 8.15 | | 6.16 | | | 133.74 | Air | 258.07 |

TABLE 3

Chemical composition (in at %) of 30 μm thick insert metal

|  | B | P | Si | V | Fe |
|---|---|---|---|---|---|
| B-type insert metal | 8.0 |  | 5.0 | 8.0 | Base |
| P-type insert metal |  | 8.0 | 5.0 | 8.0 | Base |

The chemical composition of base material conforms to STK400.

TABLE 4

Bonding temperature, Butting stress and Bonding time

|  | Temp. (° C.) | Stress (MPa) | Time (sec) |
|---|---|---|---|
| B-type insert metal | 1150 | 2.0 | 600 |
| P-type insert metal | 950 | 2.0 | 3600 |

According to the first invention, liquid phase diffusion bonding of various kinds of Fe-based materials (steel plates, steel pipes, steel stripes, steel bars, etc.) can be performed in oxidizing atmospheres at low temperatures to reduce thermal influence on the base material (the material to be bonded) and can provide a bonded joint having a high fracture strength, and thereby, the advantageous feature of liquid phase diffusion bonding can be utilized for bonding of Fe-base materials, the bonding time can be reduced in comparison with that required in the other bonding methods to significantly reduce the bonding work time.

EXAMPLE 2

Alloys for liquid phase diffusion bonding according to the second invention were used to carry out liquid phase diffusion bonding of an Fe-based material. The conditions of use and the obtained results will be described together with those of comparative samples with reference to the following Tables and the attached drawings.

About 100 g of alloys having a chemical composition of any one of the first to fourth aspects of the first invention were quenched by a single roll method (a 300 mm dia. copper cooling roll) to form 2 to 215 mm wide, 3.0 to 100 μm thick alloy foils having a substantially amorphous crystallographic structure.

The peripheral speed of the cooling roll was kept at 5.0 to 15.0 m/s.

As shown in Table 5 (Tables 5-1 to 5-8), all of the alloy foils of the present invention had Fe-based chemical compositions (atomic percentage), in which the difference between 100% and the total amounts of the listed components means the sum of the amounts of Fe and unavoidable impurities.

Table 6 shows the chemical compositions of comparative alloys (atomic percentage), which are also Fe-based and the difference between 100% and the total amounts of the listed components means the sum of the amounts of Fe and unavoidable impurities. The comparative alloy foils of Table 6 were produced in the same manner as the present inventive alloy foils of Table 5.

Liquid phase diffusion bonding was carried out by using the alloy foils No. 1 to 199 of Table 5 (hereinafter referred to as "inventive insert metal") satisfying any one of the first to fifth aspects of the first invention and the comparative alloy foils No. 200 to 212 of Table 6 (hereinafter referred to as "comparative insert metal" including the conventional insert metals).

The inventive insert metals were 3 to 100 μm thick and 20 mm in diameter, the comparative insert metals were 7.67 to 234.10 μm thick and 20 mm in diameter, the base material was an Fe-based material (JIS STK400), and the insert metals were inserted between two round steel bars (20 mm in dia.) of the base material as shown in FIG. 1.

FIG. 1 shows round steel bars 1, 1 of the material to be bonded and an insert metal 2 or an alloy for liquid phase diffusion bonding.

The liquid phase diffusion bonding was carried out in air with a bonding temperature of from immediately above the melting point of the alloy foil to the melting point plus 50° C. in a large scale heating furnace with a target temperature of effectively 1050 to 1300° C.

The base material 1 and the insert metal 2 were pressed together at a pressure of 2 megapascal (MPa) to ensure a good contact therebetween.

The bonding time was 10 min in all cases, the following heat treatments were conducted solely or combinedly to ensure the strength, corrosion resistance, and toughness of the bonded material, the heat treatments including tempering, tempering plus annealing, annealing plus tempering, quench-hardening plus annealing plus tempering.

During any of these heat treatments, mutual diffusion of elements between the materials to be bonded proceeded to homogenize the bonded joint but no substantial formation, increase, or growth of precipitates was observed in the inventive insert metal.

Then, a JIS No. 2 subsize round bar tensile test was conducted to determine the soundness of the bonded joint with the result that the non-bonded area percentage was 0% for all test pieces bonded with the present inventive insert metals.

In the manner as shown in FIG. 2, JIS No. A2 test pieces having a shape shown in FIG. 3 were machined from a round steel bar in the direction of the bar axis and then were subjected to a tensile test at room temperature to determine the bonded joint fracture strength.

The fracture strength of the bonded joint is determined by the base material, the thickness, the service environment, etc., and in this Example, a required minimum strength was provisionally set as 400 MPa from the practical limit and a bonded joint was judged to be sound when a fracture strength was more than that value. The experimental results are also shown in Tables 5 and 6.

It can be seen from Table 5 that the bonded joints obtained by the liquid phase diffusion bonding using the alloy foils according to the present invention all exhibited an extremely good bonded joint strength including a strength greater than the target level of 400 MPa.

In contrast, the bonded joints obtained by the liquid phase diffusion bonding using the comparative alloy foils not satisfying the present inventive scope all exhibited a bonded joint strength lower than the target level of 400 MPa, in which none was practically acceptable. Individual results will be described later.

FIGS. 9 to 13 show the relationship between the specified component elements or the thickness of the alloy foil for liquid phase diffusion bonding according to the present invention and the bonded joint fracture strength (expressed in MPa).

Figure 9:
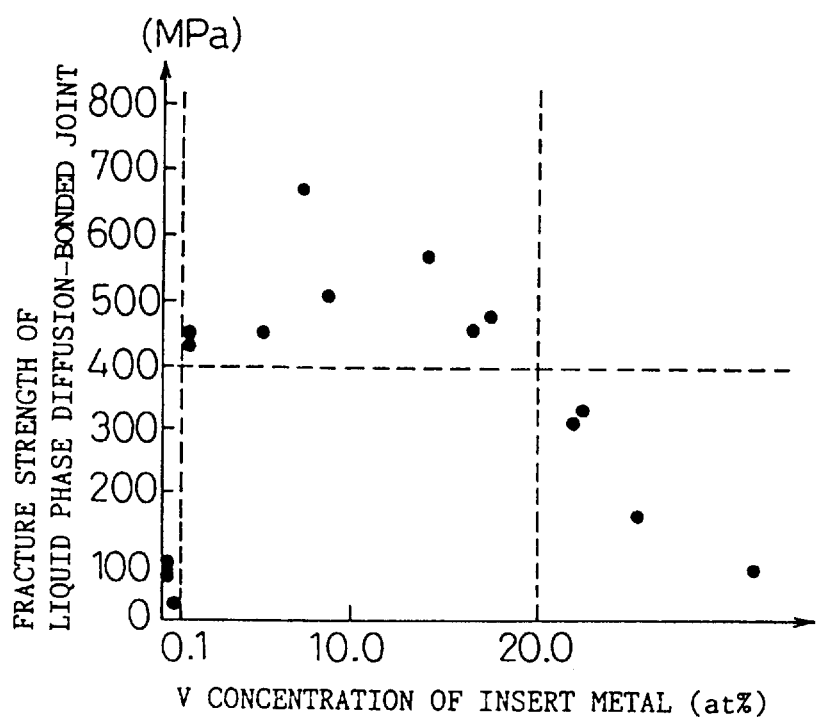
FIG. 9 is a graph relating to the second invention and showing the relationship between the V content of an Fe-insert metal and the fracture strength of the bonded joint of a liquid phase diffusion-bonded Fe-based material.

FIG. 9 shows the influence of the V concentration of the insert metal on the bonded joint fracture strength. When the V concentration is less than 0.1% in terms of atomic percentage, the oxide film on the base material cannot completely be rendered harmless and the bonded joint strength is low, whereas in the range of from 0.1 to 20.0% in terms of atomic percentage, the bonded joint fracture strength is comparable with, or greater than, that of the base material (the material to be bonded), which means that V effectively operates to render the oxide film harmless. However, when the V concentration is more than 20% in terms of atomic percentage, the insert metal has a higher melting point causing a problem with the bonding time and degradation of the bonded joint fracture strength.

Figure 10:
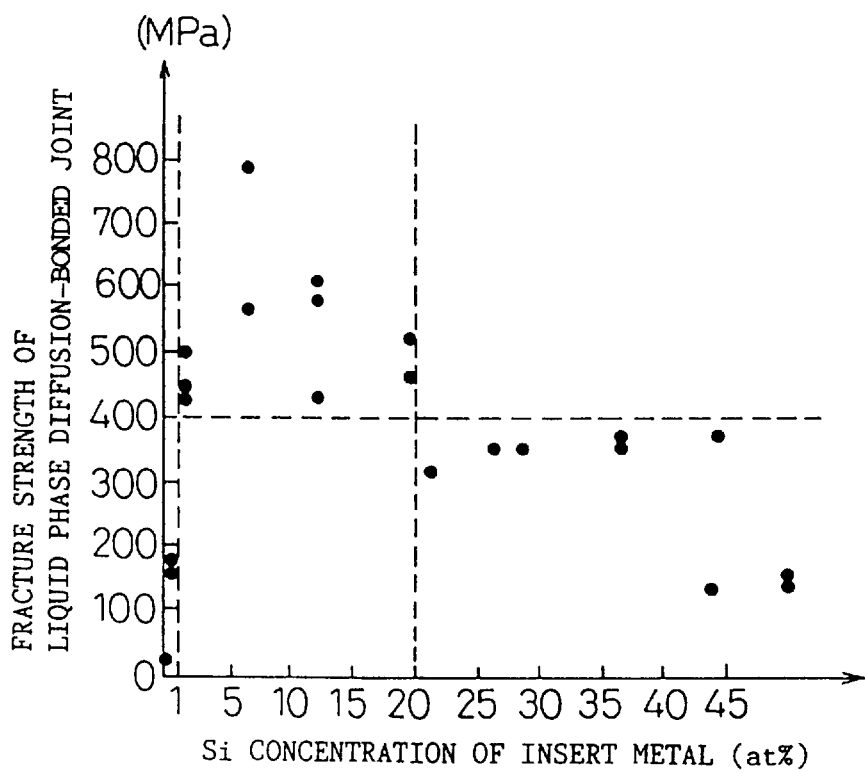
FIG. 10 is a graph relating to the second invention and showing the relationship between the Si content of an Fe-based insert metal and the fracture strength of the bonded joint of a liquid phase diffusion-bonded Fe-based material.

FIG. 10 likewise shows the relationship between the Si content and the bonded joint fracture strength. The bonded joint fracture strength is reduced either when the Si content is less than 1.0%, or when the Si content is more than 20.0%, whereas Si contents of from 1.0 to 20.0% ensure a high fracture strength of the bonded joint.

Figure 11:
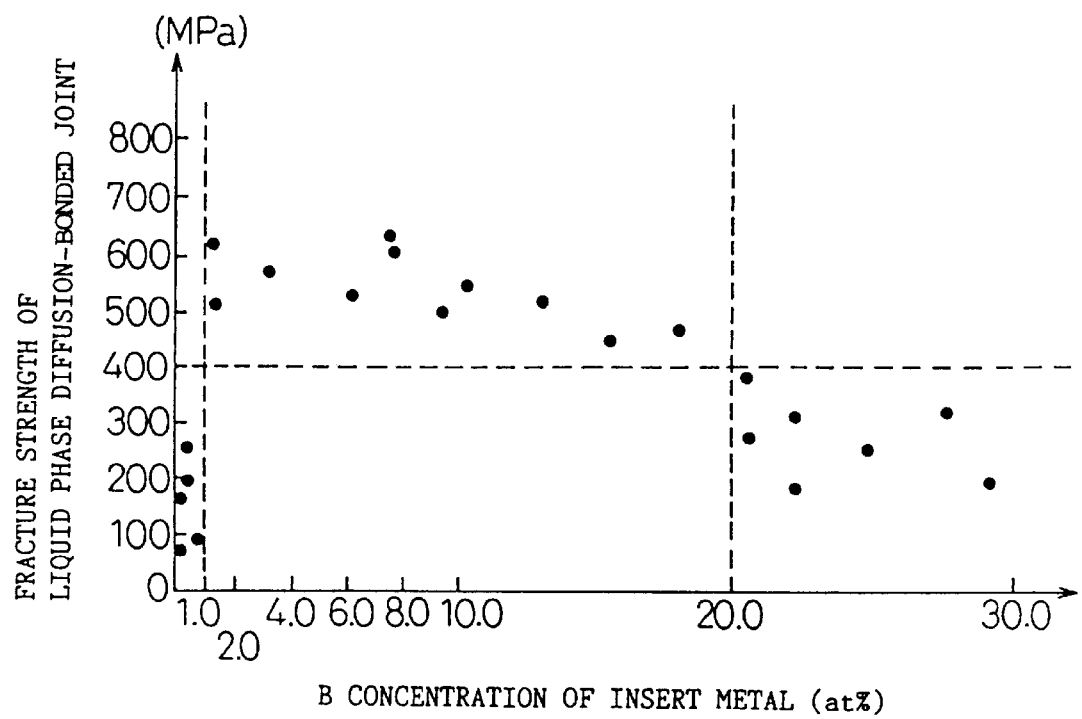
FIG. 11 is a graph relating to the second invention and showing the relationship between the B content of an Fe-based insert metal and the fracture strength of the bonded joint of a liquid phase diffusion-bonded Fe-based material.

FIG. 11 shows the relationship between the B content and the bonded joint fracture strength. The bonded joint fracture strength is reduced either when the B content is less than 1.0% whereby the insert metal has a high melting point, or when the B content is more than 20.0% whereby intermetallic compounds are formed near the bonded interface. B contents of from 1.0 to 20.0% ensure a high fracture strength of the bonded joint.

Figure 12:
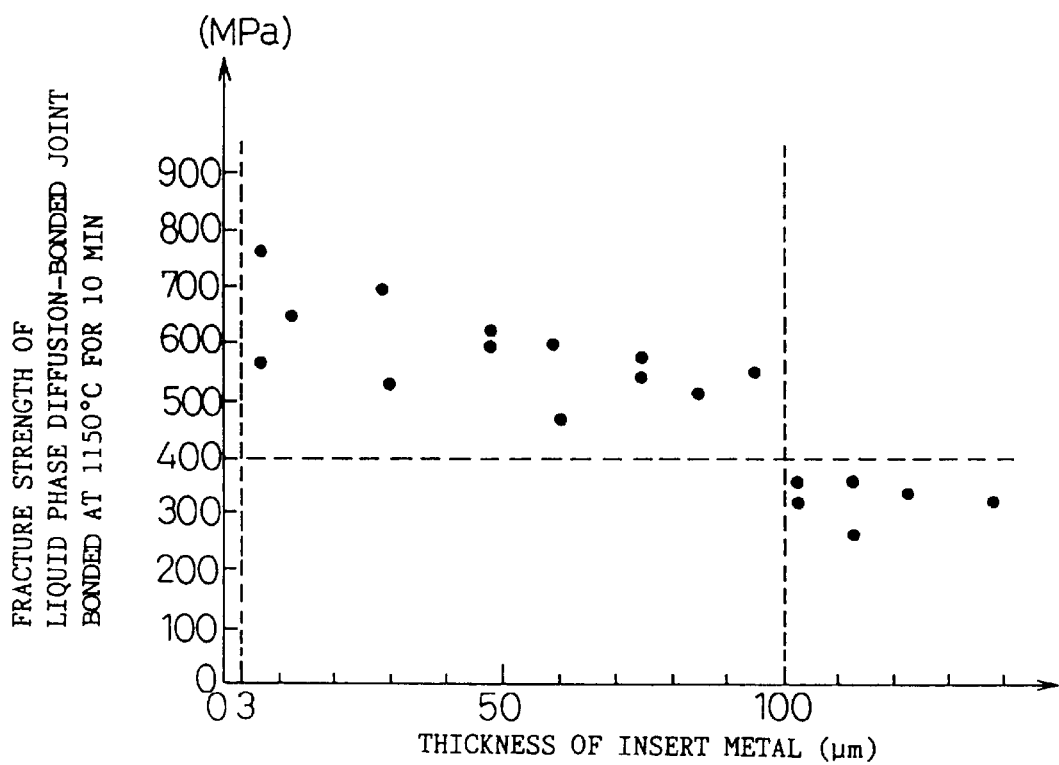
FIG. 12 is a graph relating to the second invention and showing the relationship between the thickness of an Fe-based insert metal and the fracture strength of the bonded joint of a liquid phase diffusion-bonded Fe-based material.

FIG. 12 shows the relationship between the insert metal thickness and the bonded joint fracture strength, in which it can be obviously seen that foils having a thickness more than 100 μm fail to provide good fracture strength of the bonded joint.

Figure 13:
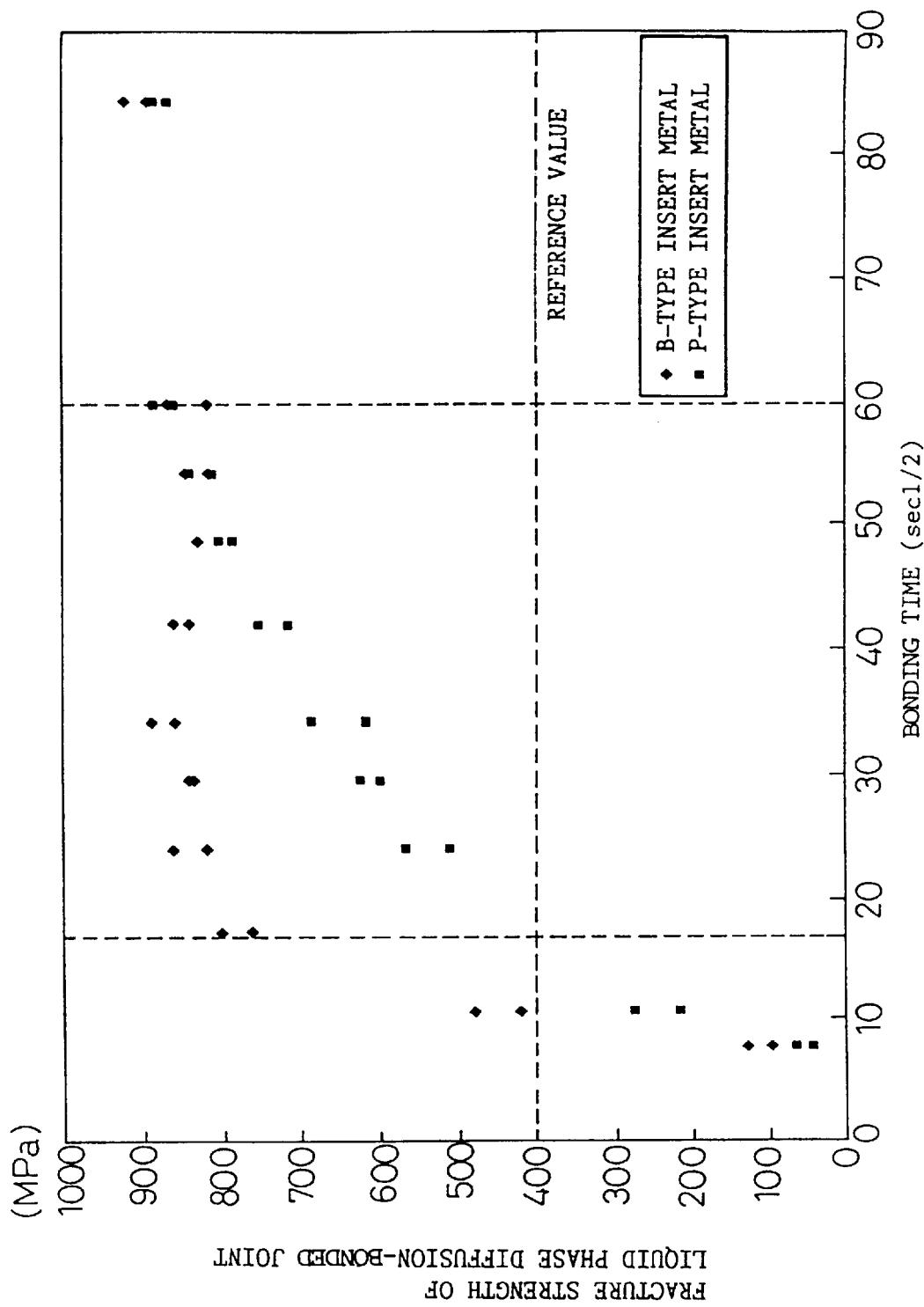
FIG. 13 is a graph relating to the first and second inventions and showing the relationship between the bonding time and the fracture strength of the bonded joint of a liquid phase diffusion-bonded Fe-based material, in which B-type and P-type insert metals are compared.

FIG. 13 shows the relationship between the bonded joint fracture strength (MPa) and the bonding time when B is used as a diffusion element in comparison with that when P is used as a diffusion element. The experimental conditions are summarized in Tables 7 and 8.

It can be seen from FIG. 13 and Tables 7 and 8 that, when B is used as a diffusion element, the bonding temperature is higher than that required when P is used as a diffusion element, but the target value 400 (MPa) of the bonded joint fracture strength is achieved in a reduced bonding time.

Table 6 shows the chemical compositions and the determined tensile fracture strength of the bonded joint for comparative examples to be compared with those of the present inventive alloy foils.

It can be seen from Table 6 that Comparative Sample No. 200 contains B in an insufficient amount whereby the melting point is higher than 1300° C. to result in a significantly small fracture strength and that Comparative Sample No. 201 contains B in an excessive amount whereby coarse borides are formed in the base material near the bonded joint to reduce the bonded joint fracture strength.

Comparative Sample No. 202 contains Si in an insufficient amount whereby the melting point is higher than 1300° C. with the result that the bonded joint fracture strength is significantly reduced, and Comparative Sample No. 203 contains Si in an excessive amount whereby coarse $SiO_2$-based oxides are formed in the insert metal during bonding to reduce the bonded point fracture strength.

Comparative Sample No. 204 contains V in an insufficient amount whereby an oxide film formed on the base material surface was not completely rendered harmless and the bonded joint fracture strength is small, and Comparative Sample No. 205 contains V in an excessive amount whereby the melting point of the insert metal is extremely high and liquid phase diffusion bonding is not completely effected to cause reduction in the bonded joint fracture strength.

Comparative Sample No. 206 contains a large amount of Cr whereby the melting point is extremely high and liquid phase diffusion bonding is not completely effected to cause significant reduction in the bonded joint fracture strength, and Comparative Sample No. 207 contains a large amount of Ni whereby a Ni phase forms inclusions in an Fe phase to cause the microstructure to be inhomogeneous, the toughness to be lowered, and the bonded joint fracture strength to be reduced.

Comparative Sample No. 208 contains an excessive amount of Co whereby coarse intermetallic compounds are formed to reduce the toughness and the bonded joint fracture strength is reduced, and Comparative Sample No. 209 contains an excessive amount of W whereby coarse intermetallic compounds are formed to reduce the toughness and the bonded joint fracture strength is thereby reduced, and Comparative Sample No. 210 contains an excessive amount of Nb whereby coarse Fe-Nb-based intermetallic compounds are precipitated to cause embrittlement and reduction in the bonded joint fracture strength.

Comparative Sample No. 211 contains an excessive amount of Ti whereby coarse intermetallic compounds are formed in a large amount to cause reduction in the toughness and the bonded joint fracture strength, and Comparative Sample No. 212 has too large a foil thickness to cause reduction in the bonded joint fracture strength.

As described above, the target fracture strength of the bonded joint of 400 MPa cannot be achieved by liquid phase diffusion bonding using the comparative insert metals, which partially satisfy, but do not completely satisfy, the specified requirement of the present invention.

TABLE 5

| No. | Chemical Composition of Alloy Foil (at %) | | | | | | | | | Foil Thickness (μm) | Bonding Atmosphere | Fracture Strength (MPa) |
|---|---|---|---|---|---|---|---|---|---|---|---|---|
| | B | Si | V | Cr | Ni | Co | W | Nb | Ti | | | |
| 1 | 7.80 | 4.57 | 1.50 | | | | | | | 12 | Air | 457.49 |
| 2 | 3.70 | 6.64 | 4.94 | | | | | | | 81 | Air | 474.72 |
| 3 | 4.64 | 17.44 | 3.69 | | | | | | | 50 | Air | 468.45 |
| 4 | 3.47 | 6.68 | 12.35 | | | | | | | 53 | Air | 511.77 |
| 5 | 8.59 | 8.89 | 14.32 | | | | | | | 7 | Air | 521.59 |
| 6 | 16.58 | 2.15 | 3.29 | | | | | | | 74 | Air | 466.45 |
| 7 | 9.91 | 12.68 | 10.29 | | | | | | | 15 | Air | 501.47 |
| 8 | 6.43 | 9.35 | 14.75 | | | | | | | 98 | Air | 523.76 |
| 9 | 11.31 | 7.57 | 10.49 | | | | | | | 42 | Air | 502.47 |
| 10 | 8.43 | 16.88 | 19.93 | | | | | | | 90 | Air | 549.66 |
| 11 | 19.16 | 15.76 | 9.15 | 4.76 | | | | | | 41 | Air | 495.73 |

TABLE 5-continued

| | Chemical Composition of Alloy Foil (at %) | | | | | | | | Foil Thickness (μm) | Bonding Atmosphere | Fracture Strength (MPa) |
|---|---|---|---|---|---|---|---|---|---|---|---|
| No. | B | Si | V | Cr | Ni | Co | W | Nb | Ti | | | |
| 12 | 6.24 | 8.90 | 3.53 | 2.94 | | | | | | 71 | Air | 467.65 |
| 13 | 10.65 | 9.19 | 5.97 | 0.45 | | | | | | 67 | Air | 479.87 |
| 14 | 3.26 | 3.74 | 10.89 | | 8.67 | | | | | 93 | Air | 504.47 |
| 15 | 2.47 | 12.28 | 17.04 | | 4.80 | | | | | 82 | Air | 535.20 |
| 16 | 9.00 | 13.56 | 19.17 | | 14.93 | | | | | 44 | Air | 545.85 |
| 17 | 1.97 | 18.63 | 14.53 | | | 7.25 | | | | 6 | Air | 522.63 |
| 18 | 5.84 | 18.25 | 5.06 | | | 3.03 | | | | 92 | Air | 475.28 |
| 19 | 17.05 | 13.00 | 16.18 | | | 13.25 | | | | 75 | Air | 530.90 |
| 20 | 18.35 | 8.52 | 19.01 | 1.21 | 6.65 | | | | | 17 | Air | 545.07 |
| 21 | 3.60 | 9.23 | 4.96 | 17.87 | 1.98 | | | | | 96 | Air | 474.79 |
| 22 | 5.45 | 12.08 | 0.79 | 7.26 | 11.89 | | | | | 3 | Air | 453.93 |
| 23 | 14.28 | 7.36 | 8.93 | | 11.65 | 6.80 | | | | 3 | Air | 494.64 |
| 24 | 12.74 | 10.87 | 1.68 | | 0.33 | 6.64 | | | | 88 | Air | 458.39 |
| 25 | 15.47 | 12.67 | 19.48 | | 5.99 | 11.85 | | | | 7 | Air | 547.41 |
| 26 | 5.24 | 18.49 | 2.78 | 0.93 | | 8.69 | | | | 70 | Air | 463.88 |
| 27 | 19.59 | 19.89 | 1.27 | 19.87 | | 2.82 | | | | 80 | Air | 456.33 |
| 28 | 11.36 | 7.26 | 13.60 | 19.20 | | 1.53 | | | | 92 | Air | 518.02 |
| 29 | 12.13 | 3.49 | 1.03 | 1.23 | 13.15 | 5.50 | | | | 95 | Air | 455.14 |
| 30 | 4.96 | 2.10 | 19.69 | 1.15 | 9.17 | 6.97 | | | | 55 | Air | 548.45 |
| 31 | 11.21 | 17.06 | 6.77 | 7.71 | 7.83 | 13.75 | | | | 38 | Air | 483.84 |
| 32 | 6.31 | 9.38 | 17.83 | | | | 6.36 | | | 64 | Air | 602.81 |
| 33 | 13.42 | 17.54 | 11.15 | | | | 8.46 | | | 23 | Air | 590.34 |
| 34 | 11.18 | 8.98 | 10.99 | | | | 1.03 | | | 44 | Air | 515.23 |
| 35 | 14.92 | 11.93 | 6.97 | | | | | 5.95 | | 52 | Air | 526.45 |
| 36 | 3.43 | 15.50 | 12.95 | | | | | 0.37 | | 41 | Air | 517.34 |
| 37 | 15.02 | 18.02 | 10.17 | | | | | 8.90 | | 32 | Air | 563.11 |
| 38 | 17.05 | 6.46 | 14.26 | | | | | | 0.58 | 80 | Air | 525.93 |
| 39 | 11.19 | 9.57 | 5.65 | | | | | | 0.75 | 59 | Air | 484.21 |
| 40 | 1.78 | 5.26 | 5.93 | | | | | | 8.29 | 63 | Air | 545.94 |
| 41 | 11.76 | 16.79 | 1.54 | | | | 8.04 | 5.29 | | 66 | Air | 575.11 |
| 42 | 10.38 | 9.67 | 9.86 | | | | 5.01 | 8.32 | | 21 | Air | 607.63 |
| 43 | 2.84 | 15.63 | 12.51 | | | | 9.15 | 2.26 | | 9 | Air | 619.82 |
| 44 | 17.85 | 3.89 | 3.08 | | | | 6.20 | | 1.19 | 36 | Air | 518.31 |
| 45 | 5.66 | 6.83 | 1.61 | | | | 6.43 | | 4.42 | 65 | Air | 538.42 |
| 46 | 3.69 | 1.92 | 11.74 | | | | 9.95 | | 9.61 | 20 | Air | 655.20 |
| 47 | 17.28 | 5.97 | 17.59 | | | | 2.39 | | 7.90 | 64 | Air | 625.05 |
| 48 | 10.94 | 5.92 | 9.22 | | | | 9.60 | | 0.67 | 18 | Air | 597.45 |
| 49 | 5.81 | 9.39 | 0.65 | | | | 1.04 | | 0.92 | 21 | Air | 471.03 |
| 50 | 9.33 | 3.48 | 13.18 | | | | 7.13 | 4.83 | 3.47 | 37 | Air | 648.85 |
| 51 | 15.93 | 2.28 | 12.39 | | | | 3.43 | 7.17 | 0.29 | 96 | Air | 598.81 |
| 52 | 7.51 | 8.83 | 10.60 | | | | 4.46 | 6.16 | 3.91 | 57 | Air | 621.99 |
| 53 | 14.72 | 17.82 | 10.31 | 15.79 | | | 0.82 | | | 59 | Air | 509.76 |
| 54 | 14.97 | 12.22 | 19.57 | 15.93 | | | 3.15 | | | 54 | Air | 579.35 |
| 55 | 8.69 | 10.73 | 7.37 | 11.50 | | | 4.40 | | | 39 | Air | 530.90 |
| 56 | 16.80 | 9.73 | 11.72 | 0.63 | | | | 6.61 | | 84 | Air | 554.86 |
| 57 | 1.83 | 5.30 | 18.39 | 4.32 | | | | 4.48 | | 26 | Air | 573.34 |
| 58 | 10.61 | 1.89 | 2.60 | 1.55 | | | | 2.26 | | 21 | Air | 478.85 |
| 59 | 3.16 | 1.28 | 17.83 | 18.27 | | | | | 4.30 | 72 | Air | 573.53 |
| 60 | 7.45 | 9.56 | 16.08 | 9.82 | | | | | 0.35 | 41 | Air | 533.21 |
| 61 | 3.63 | 17.60 | 9.86 | 12.16 | | | | | 0.81 | 96 | Air | 505.77 |
| 62 | 9.61 | 7.82 | 0.80 | 4.88 | | | 2.64 | 5.69 | | 11 | Air | 520.26 |
| 63 | 10.41 | 2.99 | 1.56 | 10.74 | | | 4.48 | 10.00 | | 73 | Air | 572.61 |
| 64 | 19.33 | 3.83 | 7.71 | 7.51 | | | 0.62 | 8.59 | | 44 | Air | 554.83 |
| 65 | 7.69 | 3.04 | 19.82 | 11.78 | | | | 6.39 | 9.91 | 88 | Air | 673.15 |
| 66 | 4.46 | 19.07 | 5.43 | 3.14 | | | | 5.61 | 1.56 | 63 | Air | 528.88 |
| 67 | 8.32 | 5.54 | 20.00 | 11.75 | | | | 9.47 | | 83 | Air | 684.59 |
| 68 | 15.14 | 9.55 | 11.21 | 16.22 | | | 5.67 | | 2.94 | 71 | Air | 586.21 |
| 69 | 14.57 | 10.64 | 3.65 | 11.88 | | | 8.89 | | 4.70 | 71 | Air | 594.79 |
| 70 | 19.09 | 18.75 | 16.02 | 0.52 | | | 4.43 | | 5.87 | 52 | Air | 621.37 |
| 71 | 17.98 | 14.51 | 5.98 | 8.07 | | | 7.12 | 4.06 | 4.96 | 87 | Air | 619.09 |
| 72 | 11.67 | 13.43 | 0.80 | 17.29 | | | 5.88 | 2.13 | 9.67 | 17 | Air | 605.05 |
| 73 | 10.48 | 11.21 | 3.71 | 1.27 | | | 3.63 | 7.98 | 5.23 | 51 | Air | 602.56 |
| 74 | 19.85 | 8.59 | 17.87 | | 10.93 | | 2.44 | | | 65 | Air | 563.73 |
| 75 | 8.89 | 7.30 | 1.85 | | 12.91 | | 1.52 | | | 13 | Air | 474.50 |
| 76 | 16.63 | 2.79 | 8.27 | | 2.64 | | 9.96 | | | 99 | Air | 590.98 |
| 77 | 15.83 | 18.29 | 15.20 | | 0.33 | | | 5.59 | | 38 | Air | 565.12 |
| 78 | 7.40 | 3.19 | 2.35 | | 14.33 | | | 6.59 | | 54 | Air | 507.87 |
| 79 | 8.47 | 13.82 | 0.50 | | 10.21 | | | 4.88 | | 56 | Air | 486.67 |
| 80 | 11.96 | 12.18 | 17.01 | | 7.15 | | | | 8.89 | 19 | Air | 604.58 |
| 81 | 1.99 | 4.89 | 8.73 | | 6.95 | | | | 2.31 | 79 | Air | 512.13 |
| 82 | 17.28 | 17.67 | 15.59 | | 9.03 | | | | 6.06 | 7 | Air | 576.43 |
| 83 | 7.56 | 5.83 | 17.29 | | 14.65 | | 0.71 | 6.90 | | 33 | Air | 591.84 |
| 84 | 19.61 | 15.77 | 1.19 | | 1.11 | | 7.08 | 8.99 | | 26 | Air | 589.64 |
| 85 | 11.86 | 11.53 | 12.29 | | 11.75 | | 6.14 | 2.47 | | 46 | Air | 590.17 |

TABLE 5-continued

| | Chemical Composition of Alloy Foil (at %) | | | | | | | | Foil Thickness | Bonding | Fracture Strength |
|---|---|---|---|---|---|---|---|---|---|---|---|
| No. | B | Si | V | Cr | Ni | Co | W | Nb | Ti | ($\mu$m) | Atmosphere | (MPa) |
| 86 | 4.22 | 8.94 | 12.65 | | 13.93 | | | 5.76 | 3.64 | 79 | Air | 582.70 |
| 87 | 14.72 | 4.01 | 10.46 | | 13.94 | | | 7.91 | 6.04 | 82 | Air | 605.99 |
| 88 | 17.91 | 8.53 | 8.01 | | 1.57 | | | 2.75 | 0.20 | 36 | Air | 510.90 |
| 89 | 7.23 | 6.22 | 15.45 | | 2.91 | | 4.64 | 8.01 | | 61 | Air | 637.76 |
| 90 | 13.73 | 4.56 | 9.09 | | 0.46 | | 7.30 | | 0.26 | 53 | Air | 570.53 |
| 91 | 8.12 | 16.81 | 1.88 | | 1.35 | | 3.90 | | 3.18 | 39 | Air | 523.86 |
| 92 | 6.63 | 3.32 | 5.40 | | 2.02 | | 7.32 | 5.68 | 7.32 | 20 | Air | 648.49 |
| 93 | 5.42 | 11.99 | 2.59 | | 9.32 | | 6.64 | 8.54 | 6.06 | 44 | Air | 637.64 |
| 94 | 2.86 | 2.36 | 8.69 | | 12.39 | | 3.82 | 9.94 | 7.14 | 74 | Air | 658.41 |
| 95 | 8.41 | 2.16 | 19.74 | | | 13.89 | 0.19 | | | 97 | Air | 550.63 |
| 96 | 6.87 | 10.12 | 9.03 | | | 9.04 | 5.36 | | | 91 | Air | 548.76 |
| 97 | 5.20 | 2.08 | 7.89 | | | 5.86 | 6.25 | | | 99 | Air | 551.91 |
| 98 | 4.24 | 17.83 | 13.40 | | | 8.35 | | 8.31 | | 36 | Air | 575.15 |
| 99 | 19.21 | 10.65 | 18.17 | | | 6.68 | | 3.11 | | 60 | Air | 562.62 |
| 100 | 14.01 | 11.89 | 2.32 | | | 9.06 | | 2.59 | | 42 | Air | 479.75 |
| 101 | 16.96 | 14.69 | 10.45 | | | 8.05 | | | 7.49 | 14 | Air | 562.17 |
| 102 | 3.41 | 14.55 | 1.35 | | | 13.69 | | | 7.06 | 6 | Air | 513.23 |
| 103 | 18.47 | 15.40 | 0.68 | | | 11.53 | | | 7.09 | 43 | Air | 510.13 |
| 104 | 19.43 | 15.35 | 1.02 | | | 9.70 | 5.31 | 0.81 | | 50 | Air | 513.89 |
| 105 | 11.78 | 2.14 | 19.97 | | | 2.60 | 5.50 | 0.81 | | 87 | Air | 610.46 |
| 106 | 6.82 | 10.55 | 3.20 | | | 1.05 | 3.13 | 5.62 | | 84 | Air | 536.62 |
| 107 | 19.91 | 13.77 | 7.05 | | | 4.65 | | 9.48 | 9.25 | 76 | Air | 625.60 |
| 108 | 19.95 | 5.77 | 11.40 | | | 11.48 | | 9.04 | 4.08 | 33 | Air | 602.84 |
| 109 | 10.71 | 19.87 | 6.71 | | | 12.38 | | 1.43 | 4.17 | 39 | Air | 526.88 |
| 110 | 4.61 | 8.98 | 2.71 | | | 11.55 | 4.92 | | 5.68 | 80 | Air | 558.24 |
| 111 | 5.67 | 16.14 | 4.56 | | | 4.33 | 1.02 | | 0.49 | 4 | Air | 486.87 |
| 112 | 6.69 | 1.28 | 5.46 | | | 14.68 | 1.78 | | 0.53 | 40 | Air | 499.35 |
| 113 | 4.49 | 9.96 | 7.57 | | | 9.69 | 5.72 | 2.64 | 0.43 | 23 | Air | 566.97 |
| 114 | 19.33 | 12.70 | 10.44 | | | 0.24 | 5.21 | 9.44 | 8.99 | 65 | Air | 692.31 |
| 115 | 16.58 | 18.97 | 3.70 | | | 0.13 | 0.42 | 5.18 | 6.58 | 71 | Air | 561.63 |
| 116 | 12.82 | 13.01 | 12.78 | 18.91 | 1.29 | | 4.27 | | | 88 | Air | 556.64 |
| 117 | 2.30 | 8.20 | 3.42 | 3.63 | 4.97 | | 3.30 | | | 40 | Air | 500.14 |
| 118 | 12.23 | 8.87 | 19.13 | 15.25 | 1.49 | | 8.27 | | | 65 | Air | 628.31 |
| 119 | 16.93 | 1.41 | 14.34 | 13.58 | 11.28 | | | 6.04 | | 82 | Air | 563.98 |
| 120 | 4.86 | 8.42 | 18.86 | 13.43 | 11.49 | | | 4.63 | | 95 | Air | 576.71 |
| 121 | 19.60 | 5.28 | 5.17 | 14.91 | 1.61 | | | 9.45 | | 69 | Air | 542.00 |
| 122 | 5.77 | 4.40 | 4.07 | 2.29 | 1.37 | | | | 5.26 | 42 | Air | 512.40 |
| 123 | 6.68 | 18.42 | 0.52 | 15.94 | 6.73 | | | | 4.54 | 71 | Air | 488.95 |
| 124 | 9.95 | 8.89 | 2.10 | 1.32 | 9.32 | | | | 4.41 | 90 | Air | 495.75 |
| 125 | 5.19 | 3.42 | 14.26 | 5.77 | 1.45 | | 8.97 | 6.63 | | 66 | Air | 657.41 |
| 126 | 18.48 | 11.83 | 1.77 | 19.52 | 10.28 | | 3.94 | 1.74 | | 73 | Air | 510.43 |
| 127 | 1.02 | 10.77 | 7.08 | 15.79 | 2.70 | | 9.59 | 7.05 | | 86 | Air | 630.66 |
| 128 | 6.58 | 6.08 | 11.42 | 8.47 | 11.84 | | | 5.26 | 5.41 | 52 | Air | 587.24 |
| 129 | 4.69 | 4.22 | 9.12 | 5.68 | 10.12 | | | 9.13 | 3.43 | 77 | Air | 587.00 |
| 130 | 7.26 | 11.76 | 0.43 | 18.62 | 13.90 | | | 6.98 | 4.11 | 35 | Air | 533.86 |
| 131 | 11.26 | 17.62 | 3.71 | 4.39 | 1.96 | | 7.31 | | 3.61 | 93 | Air | 570.55 |
| 132 | 11.81 | 3.26 | 5.15 | 10.04 | 11.53 | | 8.21 | | 9.14 | 49 | Air | 630.92 |
| 133 | 13.62 | 1.74 | 3.70 | 14.32 | 5.61 | | 1.86 | | 0.31 | 18 | Air | 489.63 |
| 134 | 1.46 | 1.29 | 13.39 | 6.92 | 12.70 | | 0.77 | 5.85 | 1.04 | 68 | Air | 573.91 |
| 135 | 5.49 | 2.62 | 14.16 | 18.12 | 12.92 | | 8.65 | 6.98 | 6.05 | 57 | Air | 704.55 |
| 136 | 12.54 | 4.83 | 2.67 | 1.79 | 0.95 | | 5.46 | 6.90 | 0.69 | 92 | Air | 571.78 |
| 137 | 9.04 | 1.95 | 11.42 | | 2.11 | 2.58 | 2.30 | | | 54 | Air | 530.12 |
| 138 | 2.24 | 6.25 | 3.74 | | 14.65 | 14.52 | 2.17 | | | 19 | Air | 490.43 |
| 139 | 8.17 | 2.72 | 0.80 | | 6.26 | 9.54 | 8.20 | | | 53 | Air | 535.98 |
| 140 | 2.21 | 1.34 | 19.08 | | 5.51 | 5.26 | | 5.81 | | 37 | Air | 586.08 |
| 141 | 3.95 | 4.82 | 9.22 | | 7.82 | 13.18 | | 9.04 | | 36 | Air | 559.37 |
| 142 | 8.73 | 7.41 | 1.37 | | 7.94 | 6.61 | | 3.31 | | 63 | Air | 480.03 |
| 143 | 2.96 | 16.44 | 3.71 | | 9.10 | 2.93 | | | 3.67 | 47 | Air | 497.92 |
| 144 | 19.83 | 6.35 | 16.98 | | 8.77 | 2.69 | | | 5.01 | 98 | Air | 575.02 |
| 145 | 10.65 | 7.92 | 7.77 | | 0.62 | 13.83 | | | 7.24 | 64 | Air | 546.74 |
| 146 | 8.29 | 11.86 | 18.68 | | 4.40 | 2.03 | 7.27 | 8.57 | | 57 | Air | 676.14 |
| 147 | 12.48 | 9.18 | 4.45 | | 13.70 | 5.66 | 2.62 | 2.97 | | 67 | Air | 519.23 |
| 148 | 1.13 | 3.25 | 16.50 | | 11.15 | 13.27 | 7.44 | 9.87 | | 61 | Air | 676.00 |
| 149 | 7.55 | 2.07 | 1.01 | | 14.67 | 4.39 | | 3.04 | 4.59 | 59 | Air | 513.06 |
| 150 | 7.01 | 15.99 | 19.06 | | 13.96 | 7.19 | | 6.00 | 0.67 | 17 | Air | 592.67 |
| 151 | 10.74 | 11.24 | 12.02 | | 4.16 | 12.67 | | 7.40 | 7.24 | 10 | Air | 619.85 |
| 152 | 7.87 | 3.01 | 12.23 | | 2.17 | 3.48 | 2.41 | | 4.53 | 76 | Air | 571.47 |
| 153 | 15.19 | 15.78 | 5.53 | | 14.24 | 5.95 | 2.78 | | 8.65 | 70 | Air | 574.67 |
| 154 | 9.86 | 2.21 | 0.81 | | 3.72 | 2.89 | 1.58 | | 2.24 | 88 | Air | 487.86 |
| 155 | 16.33 | 10.22 | 3.63 | | 11.65 | 9.92 | 6.00 | 3.65 | 6.84 | 68 | Air | 606.81 |
| 156 | 14.65 | 4.92 | 12.43 | | 9.16 | 6.86 | 6.26 | 6.64 | 6.55 | 92 | Air | 673.63 |
| 157 | 14.80 | 15.17 | 4.64 | | 1.14 | 9.84 | 8.23 | 6.08 | 2.49 | 98 | Air | 617.96 |
| 158 | 12.08 | 9.34 | 9.42 | 0.61 | | 10.36 | 7.11 | | | 23 | Air | 568.18 |
| 159 | 5.88 | 14.39 | 16.38 | 15.09 | | 11.60 | 2.48 | | | 59 | Air | 556.75 |

TABLE 5-continued

| | Chemical Composition of Alloy Foil (at %) | | | | | | | | Foil Thickness | Bonding | Fracture Strength |
|---|---|---|---|---|---|---|---|---|---|---|---|
| No. | B | Si | V | Cr | Ni | Co | W | Nb | Ti | (μm) | Atmosphere | (MPa) |
| 160 | 7.91 | 14.37 | 7.19 | 19.11 | | 14.79 | 4.42 | | | 93 | Air | 530.13 |
| 161 | 19.77 | 15.75 | 8.13 | 7.39 | | 7.89 | | 4.30 | | 47 | Air | 520.75 |
| 162 | 16.61 | 14.57 | 12.56 | 7.24 | | 7.01 | | 8.86 | | 79 | Air | 574.85 |
| 163 | 19.01 | 1.91 | 11.09 | 3.15 | | 2.77 | | 5.25 | | 32 | Air | 542.22 |
| 164 | 14.06 | 16.47 | 11.17 | 17.00 | | 8.49 | | | 5.43 | 94 | Air | 549.32 |
| 165 | 10.41 | 8.85 | 2.51 | 15.29 | | 10.85 | | | 8.18 | 25 | Air | 527.95 |
| 166 | 4.63 | 7.65 | 2.80 | 18.84 | | 6.97 | | | 8.38 | 6 | Air | 531.01 |
| 167 | 5.11 | 19.97 | 17.17 | 17.39 | | 13.25 | 7.89 | 0.65 | | 80 | Air | 619.35 |
| 168 | 1.83 | 4.75 | 2.25 | 4.13 | | 0.55 | 4.35 | 0.61 | | 52 | Air | 509.03 |
| 169 | 16.52 | 5.86 | 1.58 | 2.94 | | 13.04 | 0.31 | 0.91 | | 5 | Air | 467.38 |
| 170 | 1.01 | 8.12 | 10.48 | 14.35 | | 9.22 | | 3.62 | 0.65 | 55 | Air | 532.88 |
| 171 | 4.88 | 9.32 | 6.28 | 19.41 | | 11.52 | | 3.51 | 1.42 | 84 | Air | 517.29 |
| 172 | 3.08 | 13.42 | 11.96 | 14.30 | | 4.73 | | 3.77 | 8.13 | 46 | Air | 601.23 |
| 173 | 1.87 | 12.91 | 15.79 | 17.48 | | 9.31 | 5.03 | | 2.06 | 89 | Air | 595.73 |
| 174 | 7.74 | 5.88 | 13.35 | 8.73 | | 14.47 | 6.24 | | 4.82 | 87 | Air | 617.69 |
| 175 | 4.04 | 17.10 | 14.91 | 17.20 | | 2.45 | 5.41 | | 3.18 | 97 | Air | 604.12 |
| 176 | 1.66 | 19.61 | 0.93 | 17.55 | | 13.52 | 5.53 | 3.59 | 2.71 | 62 | Air | 556.75 |
| 177 | 6.24 | 19.25 | 13.92 | 15.02 | | 1.46 | 1.60 | 7.74 | 9.12 | 20 | Air | 662.71 |
| 178 | 15.43 | 19.72 | 17.58 | 7.50 | | 11.02 | 6.95 | 8.43 | 2.72 | 10 | Air | 688.17 |
| 179 | 17.82 | 15.25 | 5.18 | 1.04 | 6.34 | 14.40 | 2.83 | | | 90 | Air | 504.20 |
| 180 | 12.28 | 19.54 | 8.39 | 13.04 | 12.39 | 3.05 | 6.35 | | | 28 | Air | 555.47 |
| 181 | 8.74 | 5.22 | 7.05 | 7.49 | 11.87 | 7.41 | 0.61 | | | 59 | Air | 491.39 |
| 182 | 10.94 | 11.22 | 18.37 | 6.86 | 8.04 | 9.68 | | 7.41 | | 22 | Air | 593.73 |
| 183 | 19.84 | 7.90 | 3.46 | 14.04 | 3.88 | 10.60 | | 3.74 | | 41 | Air | 493.49 |
| 184 | 15.17 | 7.07 | 0.99 | 0.60 | 8.41 | 10.89 | | 5.46 | | 17 | Air | 493.20 |
| 185 | 16.97 | 16.87 | 4.56 | 12.90 | 1.64 | 11.17 | | | 6.31 | 86 | Air | 523.26 |
| 186 | 6.76 | 6.99 | 10.54 | 19.46 | 12.18 | 1.62 | | | 8.65 | 83 | Air | 571.92 |
| 187 | 13.40 | 16.75 | 15.27 | 7.52 | 1.03 | 6.61 | | | 8.90 | 50 | Air | 581.53 |
| 188 | 13.93 | 15.26 | 10.43 | 6.79 | 14.23 | 14.86 | 1.73 | 3.68 | | 15 | Air | 545.18 |
| 189 | 12.11 | 10.60 | 16.53 | 8.77 | 2.88 | 7.19 | 2.13 | 5.86 | | 69 | Air | 594.92 |
| 190 | 19.58 | 4.64 | 4.56 | 5.09 | 9.38 | 5.55 | 3.68 | 7.41 | | 7 | Air | 561.48 |
| 191 | 18.85 | 16.10 | 18.68 | 0.93 | 1.64 | 11.88 | | 4.55 | 7.41 | 28 | Air | 634.56 |
| 192 | 10.51 | 4.89 | 4.35 | 16.88 | 1.45 | 13.26 | | 7.07 | 4.10 | 68 | Air | 554.05 |
| 193 | 17.18 | 12.23 | 4.02 | 16.47 | 12.78 | 8.57 | | 4.84 | 0.96 | 39 | Air | 511.62 |
| 194 | 19.49 | 1.69 | 6.35 | 2.44 | 4.71 | 4.90 | 9.72 | | 9.92 | 84 | Air | 658.33 |
| 195 | 17.82 | 18.84 | 13.60 | 0.66 | 10.93 | 10.19 | 1.08 | | 0.70 | 82 | Air | 534.37 |
| 196 | 6.87 | 14.37 | 3.18 | 14.83 | 0.31 | 10.37 | 5.48 | | 7.36 | 30 | Air | 579.59 |
| 197 | 18.80 | 18.48 | 18.86 | 8.93 | 2.21 | 13.78 | 0.65 | 7.85 | 2.43 | 43 | Air | 625.18 |
| 198 | 4.34 | 10.19 | 7.71 | 18.13 | 0.83 | 2.78 | 3.08 | 2.40 | 9.61 | 70 | Air | 612.98 |
| 199 | 3.39 | 10.88 | 3.21 | 10.40 | 10.98 | 5.32 | 5.34 | 8.54 | 0.15 | 12 | Air | 580.47 |

TABLE 6

| | Chemical Composition of Alloy Foil (at %) | | | | | | | | Foil Thickness | Bonding | Fracture Strength |
|---|---|---|---|---|---|---|---|---|---|---|---|
| No. | B | Si | V | Cr | Ni | Co | W | Nb | Ti | (μm) | Atmosphere | (MPa) |
| 200 | 0.25 | 10.87 | 15.60 | | | | | | | 47.41 | Air | 0.12 |
| 201 | 25.41 | 10.90 | 0.15 | | | | | | | 30.27 | Air | 253.16 |
| 202 | 15.62 | 0.06 | 11.11 | | | | | | | 64.69 | Air | 0.22 |
| 203 | 12.16 | 23.11 | 10.15 | | | | | | | 72.30 | Air | 328.13 |
| 204 | 3.20 | 4.04 | 0.02 | | | | | | | 52.33 | Air | 0.01 |
| 205 | 11.25 | 19.59 | 31.44 | | | | | | | 59.03 | Air | 323.50 |
| 206 | 5.85 | 6.05 | 12.51 | 25.38 | | | | | | 59.38 | Air | 176.66 |
| 207 | 4.54 | 16.83 | 17.09 | | 18.16 | | | | | 48.16 | Air | 289.02 |
| 208 | 12.07 | 18.75 | 10.27 | | | 19.95 | | | | 7.73 | Air | 302.65 |
| 209 | 17.62 | 19.50 | 9.13 | 13.15 | | | 11.48 | | | 93.12 | Air | 132.07 |
| 210 | 18.83 | 7.37 | 6.83 | | | | | 12.66 | | 63.58 | Air | 145.51 |
| 211 | 6.57 | 1.04 | 8.63 | | | 3.14 | | | 14.37 | 83.45 | Air | 132.82 |
| 212 | 16.79 | 2.38 | 2.78 | | 4.45 | | | | | 150.32 | Air | 198.86 |

TABLE 7

Chemical composition (in at %) of 30 μm thick insert metal

|  | B | P | Si | V | Fe |
|---|---|---|---|---|---|
| B-type insert metal | 8.0 |  | 5.0 | 8.0 | Base |
| P-type insert metal |  | 8.0 | 5.0 | 8.0 | Base |

The chemical composition of base material conforms to STK400.

TABLE 8

Bonding temperature and Butting stress

|  | Temp. (° C.) | Stress (MPa) |
|---|---|---|
| B-type insert metal | 1150 | 2.0 |
| P-type insert metal | 950 | 2.0 |

According to the second invention, liquid phase diffusion bonding of various kinds of Fe-based materials (steel plates, steel pipes, steel strips, steel bars, etc.) can be performed in oxidizing atmospheres in a reduced time to provide a bonded joint having a high fracture strength, and thereby, the advantageous feature of liquid phase diffusion bonding can be utilized for bonding of Fe-base materials, and the bonding time can be reduced in comparison with that required in the other bonding methods to significantly reduce the bonding work time.

EXAMPLE 3

Alloys for liquid phase diffusion bonding according to the third invention were used to carry out liquid phase diffusion bonding of an Fe-based material. The conditions of use and the obtained results will be described together with those of comparative samples with reference to the following Tables and the attached drawings.

About 100 g of alloys having a chemical composition of any one of the first to fourth aspects of the first invention were quenched by a single roll method (a 300 mm dia. copper cooling roll) to form 2 to 215 mm wide, 3.0 to 100 μm thick alloy foils having a substantially amorphous crystallographic structure.

The peripheral speed of the cooling roll was kept at 5.0 to 15.0 m/s.

As shown in Table 9 (Tables 9-1 to 9-8), all of the alloy foils of the present invention had Fe-based chemical compositions (atomic percentage), in which the difference between 100% and the total amounts of the listed components means the sum of the amounts of Fe and unavoidable impurities.

Table 10 shows the chemical compositions of comparative alloys (atomic percentage), which are also Fe-based and the difference between 100% and the total amounts of the listed components means the sum of the amounts of Fe and unavoidable impurities. The comparative alloy foils of Table 10 were produced in quite the same manner as the present inventive alloy foils of Table 9.

Liquid phase diffusion bonding was carried out by using the alloy foils No. 1 to 199 of Table 9 (hereinafter referred to as "inventive insert metal") satisfying any one of the first to fifth aspects of the first invention and the comparative alloy foils No. 200 to 212 of Table 2 (hereinafter referred to as "comparative insert metal" including the conventional insert metals).

The inventive insert metals were 3 to 100 μm thick and 0 mm in diameter, the comparative insert metals were 7.67 to 234.10 μm thick and 20 mm in diameter, the base material was an Fe-based material (JIS STK400), and the insert metals were inserted between two round steel bars (20 mm in dia.) of the base material as shown in FIG. 1.

FIG. 1 shows round steel bars 1, 1 of the material to be bonded and an insert metal 2 or an alloy for liquid phase diffusion bonding.

The liquid phase diffusion bonding was carried out in air with a bonding temperature of from immediately above the melting point of the alloy foil to the melting point plus 50° C. in a large scale heating furnace with a target temperature of effectively 900 to 1300° C.

The base material 1 and the insert metal 2 were pressed together at a pressure of 2 megapascal (MPa) to ensure a good contact therebetween.

The bonding time was 10 min in all cases, the following heat treatments were conducted solely or combinedly to ensure the strength, corrosion resistance, and toughness of the bonded material, the heat treatments including tempering, tempering plus annealing, annealing plus tempering, quench-hardening plus annealing plus tempering.

During any of these heat treatments, mutual diffusion of elements between the materials to be bonded proceeded to homogenize the bonded joint but no substantial formation, increase, or growth of precipitates was observed in the inventive insert metal.

Then, a JIS No. 2 subsize round bar tensile test was conducted to determine the soundness of the bonded joint with the result that the non-bonded area percentage was 0% for all test pieces bonded with the present inventive insert metals.

In the manner as shown in FIG. 2, JIS No. A2 test pieces having a shape shown in FIG. 3 were machined from a round steel bar in the direction of the bar axis and then were subjected to a tensile test at room temperature to determine the bonded joint fracture strength.

The tensile fracture strength of the bonded joint is determined by the base material, the thickness, the service environment, etc., and in this Example, a required minimum strength was provisionally set as 400 MPa from the practical limit and a bonded joint was judged to be sound when a fracture strength was more than that value. The experimental results are also stated in Tables 9 and 10.

It can be seen from Table 9 that the bonded joints obtained by the liquid phase diffusion bonding using the alloy foils according to the present invention all exhibited an extremely good bonded joint strength including a strength greater than the target level of 400 MPa.

In contrast, the bonded joints obtained by the liquid phase diffusion bonding using the comparative alloy foils not satisfying the present inventive scope all exhibited a bonded joint strength lower than the target level of 400 MPa, in which none was practically acceptable. Individual results will be described later.

Figure 20:
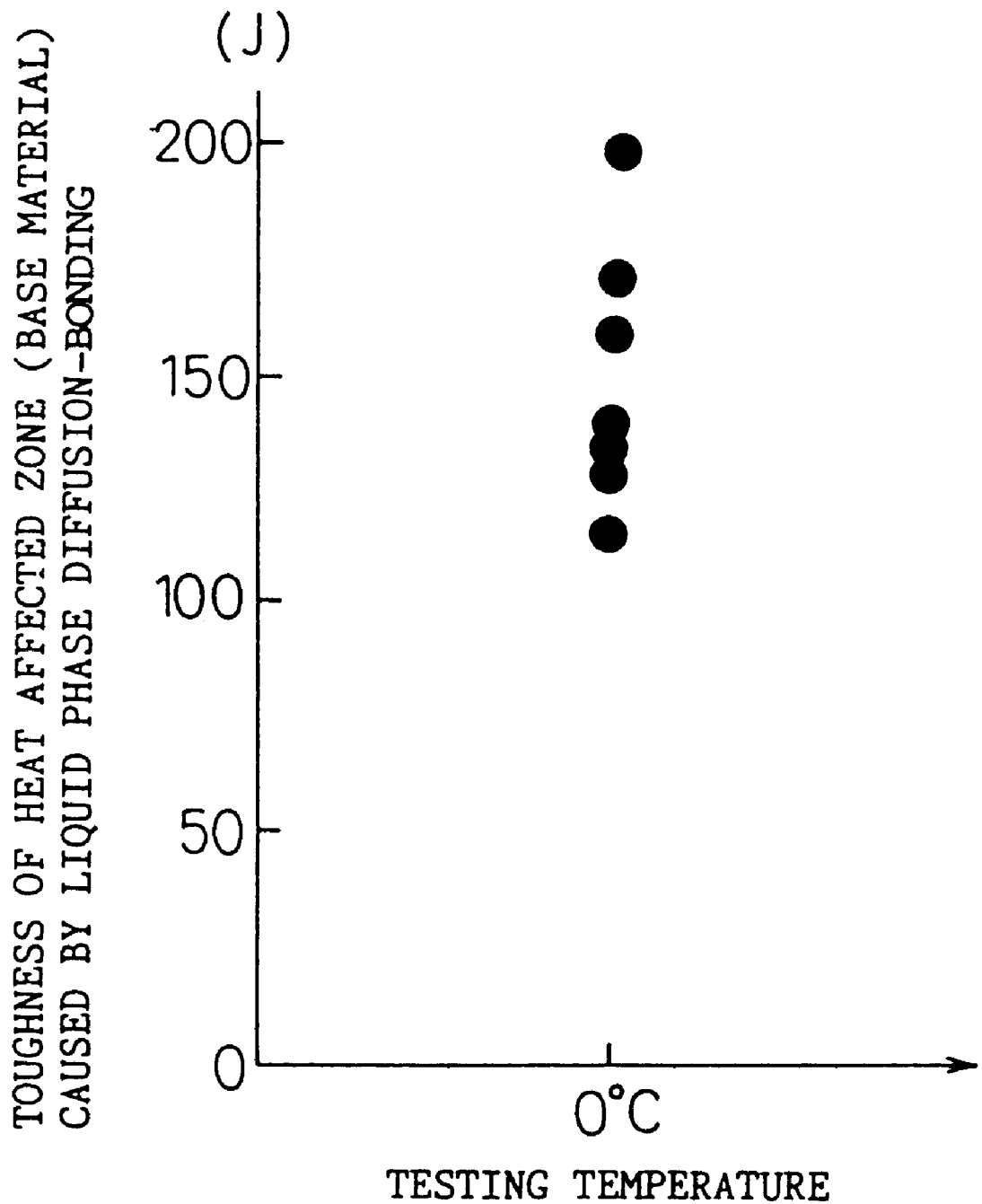
FIG. 20 is a graph relating to the third invention and showing the toughness at 0° C. of the heat-affected zone (base material) of a liquid phase diffusion-bonded Fe-based material using an Fe-based insert metal.

FIGS. 14 to 19 show the relationship between the specified component elements or the thickness of the alloy foil for liquid phase diffusion bonding or the bonding time according to the present invention and the bonded joint fracture strength (expressed in MPa) and FIG. 20 shows the toughness of the heat affected zone (base material).

Figure 14:
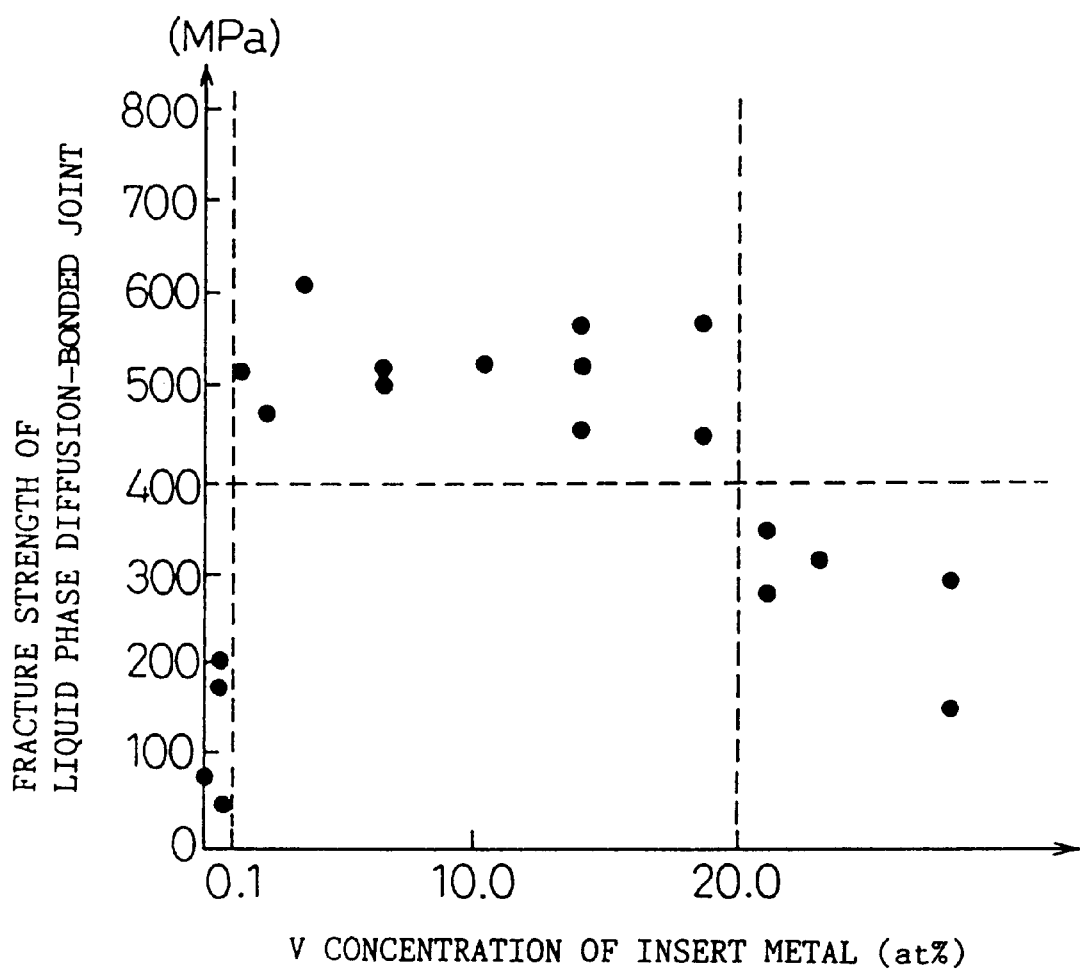
FIG. 14 is a graph relating to the third invention and showing the relationship between the V content of an Fe-insert metal and the fracture strength of the bonded joint of a liquid phase diffusion-bonded Fe-based material.

FIG. 14 shows the influence of the V concentration of the insert metal on the bonded joint fracture strength. When the V concentration is less than 0.1% in terms of atomic percentage, the oxide film on the base material cannot completely be rendered harmless and the bonded joint strength is low, whereas in the range of from 0.1 to 20.0% in terms of atomic percentage, the bonded joint fracture strength is comparable with, or greater than, that of the base material (the material to be bonded), which means that V effectively operates to render the oxide film harmless. However, when the V concentration is more than 20% in terms of atomic percentage, the insert metal has a higher melting point causing shortage of the bonding time and degradation of the bonded joint fracture strength.

Figure 15:
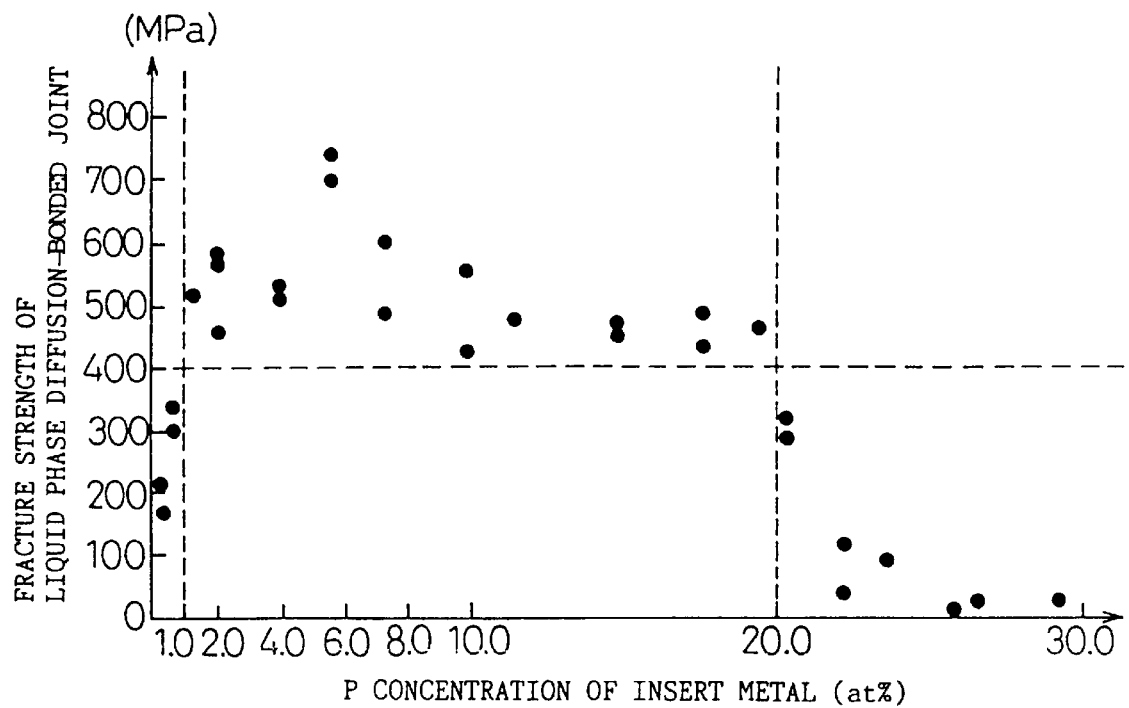
FIG. 15 is a graph relating to the third invention and showing the relationship between the P content of an Fe-based insert metal and the fracture strength of the bonded joint of a liquid phase diffusion-bonded Fe-based material.

FIG. 15 likewise shows the relationship between the P content and the bonded joint fracture strength. The bonded joint fracture strength is reduced when the P content is either less than 1.0% or more than 20.0%, and the target value of the bonded joint fracture strength is achieved when the P content is from 1.0 to 20.0%.

Figure 16:
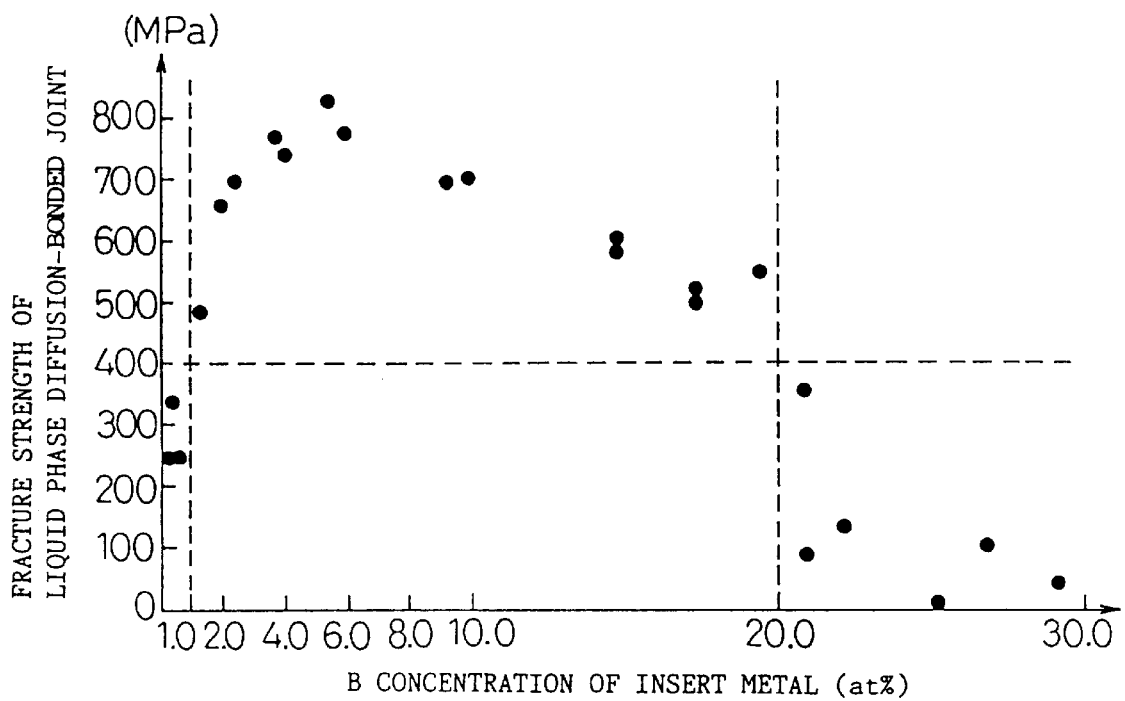
FIG. 16 is a graph relating to the third invention and showing the relationship between the B content of an Fe-based insert metal and the fracture strength of the bonded joint of a liquid phase diffusion-bonded Fe-based material.

FIG. 16 shows the relationship between the B content and the bonded joint fracture strength. The bonded joint fracture strength is reduced either when the B content is less than 1.0% whereby the insert metal has a high melting point, or when the B content is more than 20.0% whereby intermetallic compounds are formed near the bonded interface. B contents of from 1.0 to 20.0% ensures a high fracture strength of the bonded joint.

Figure 17:
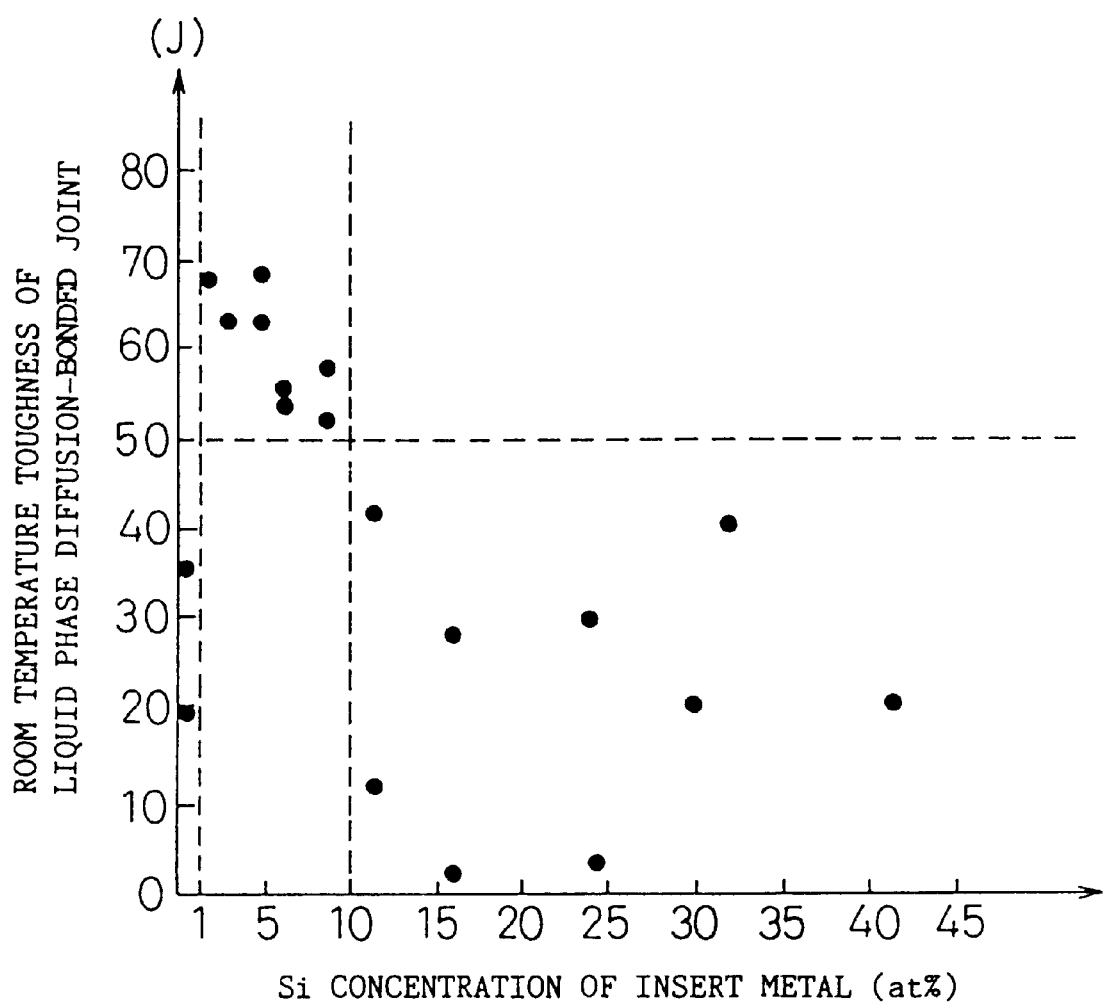
FIG. 17 is a graph relating to the third invention and showing the relationship between the Si content of an Fe-based insert metal and the fracture strength of the bonded joint of a liquid phase diffusion-bonded Fe-based material.

FIG. 17 likewise shows the relationship between the Si content and the bonded joint fracture strength. The bonded joint fracture strength is reduce either when the Si content is less than 1.0%, or when the Si content is more than 20.0%, whereas Si contents of from 1.0 to 20.0% ensure a high fracture strength of the bonded joint.

Figure 18:
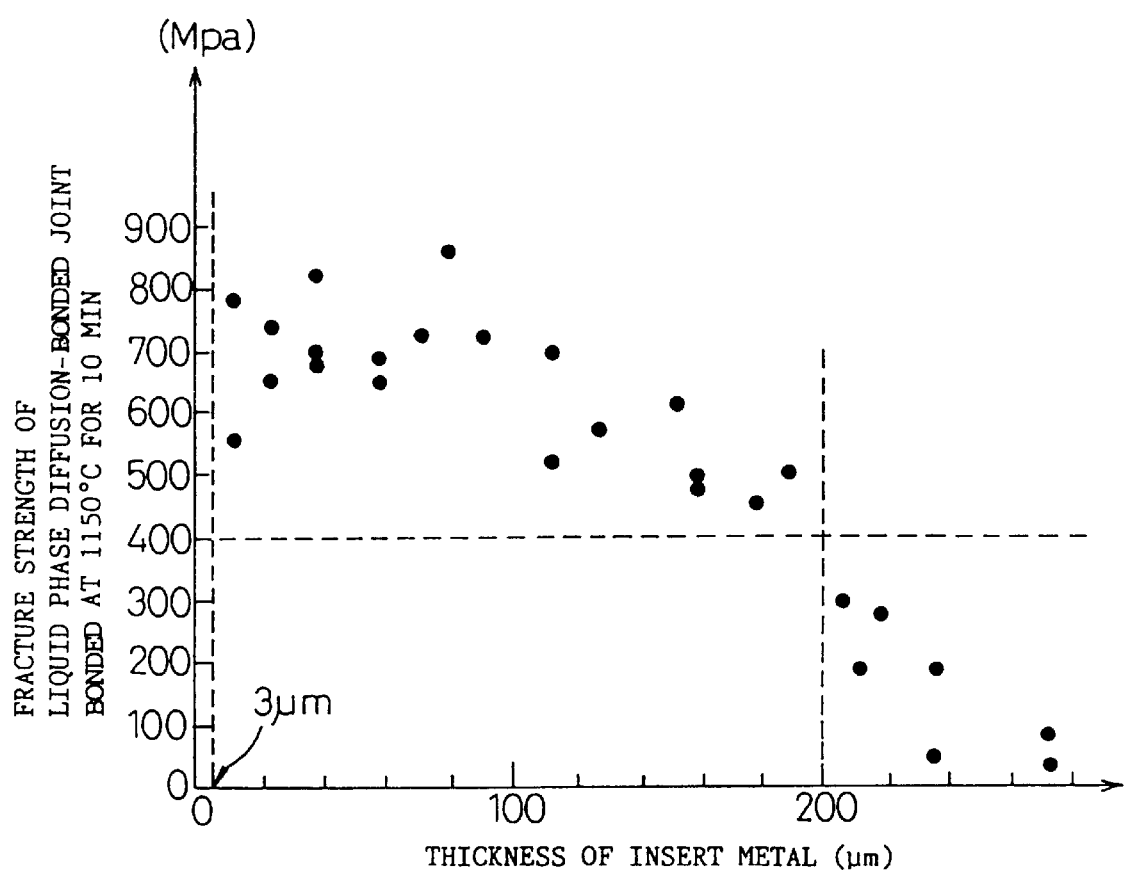
FIG. 18 is a graph relating to the third invention and showing the relationship between the thickness of an Fe-based insert metal and the fracture strength of the bonded joint of a liquid phase diffusion-bonded Fe-based material.

FIG. 18 shows the relationship between the insert metal thickness and the bonded joint fracture strength, in which it can be obviously seen that foils having a thickness more than 200 μm fail to provide good fracture strength of the bonded joint.

FIG. 19 shows the relationship between the bonded join fracture strength (MPa) and the bonding time when P and B are combinedly used as diffusion elements.

The bonding time is as short as required when B alone is used as a diffusion element and is significantly shorter than that required when P alone is used as a diffusion element.

FIG. 20 shows the bonded joint toughness obtained under the thermal influence when P and B are combinedly used as diffusion elements.

As the bonding temperature is lowered by the presence of P to 1050° C. or lower, the thermal influence on the base material (the material to be bonded) can be minimized to improve the toughness of the base material with the result that the bonded joint fracture strength is also improved.

The toughness herein referred to was determined by a impact test using a JIS No. 4 Charpy impact test piece machined from a bonded round steel bar sample as an estimate of coarsening of the crystal grains in the heat affected zone of the base material (STK400), in which a threshold toughness was determined as 50J, which is frequently used as an estimation reference for general structural materials.

Table 10 shows the chemical compositions and the determined tensile fracture strength of the bonded joint for comparative examples to be compared with those of the present inventive alloy foils.

It can be seen from Table 10 that Comparative Sample No. 200 contains P in an insufficient amount whereby the melting point is higher than 1300° C. to result in a significantly small fracture strength and that Comparative Sample No. 201 contains P in an excessive amount whereby coarse intermetallic compounds are formed near the bonded joint to reduce the bonded joint fracture strength.

Comparative Sample No. 202 contains B in an insufficient amount whereby the melting point is higher than 1300° C. to result in a significantly small fracture strength and Comparative Sample No. 203 contains B in an excessive amount whereby coarse borides are formed in the base material near the bonded joint to reduce the bonded joint fracture strength.

Comparative Sample No. 204 contains Si in an insufficient amount whereby the melting point is higher than 1300° C. with the result that the bonded joint fracture strength is significantly reduced, and Comparative Sample No. 205 contains Si in an excessive amount whereby coarse SiO-based oxides are formed in the insert metal during bonding to reduce the bonded point fracture strength.

Comparative Sample No. 206 contains V in an insufficient amount whereby an oxide film formed on the base material surface was not completely rendered harmless and the bonded joint fracture strength is small, and Comparative Sample No. 207 contains V in an excessive amount whereby the melting point of the insert metal is extremely high and liquid phase diffusion bonding is not completely effected to cause reduction in the bonded joint fracture strength.

Comparative Sample No. 208 contains a large amount of Cr whereby the melting point is extremely high and liquid phase diffusion bonding is not completely effected to cause significant reduction in the bonded joint fracture strength, and Comparative Sample No. 209 contains a large amount of Ni whereby a Ni phase forms inclusions in an Fe phase to cause the microstructure to be inhomogeneous, the toughness to be lowered, and the bonded joint fracture strength to be reduced.

Comparative Sample No. 210 contains an excessive amount of Co whereby coarse intermetallic compounds are formed to reduce the toughness and the bonded joint fracture strength is reduced, and Comparative Sample No. 211 contains an excessive amount of W whereby coarse intermetallic compounds are formed to reduce the toughness and the bonded joint fracture strength is thereby reduced, and Comparative Sample No. 212 contains an excessive amount of Nb whereby coarse Fe-Nb-based intermetallic compounds are precipitated to cause embrittlement and reduction in the bonded joint fracture strength.

Comparative Sample No. 213 contains an excessive amount of Ti whereby coarse intermetallic compounds are formed in a large amount to cause reduction in the toughness and the bonded joint fracture strength, and Comparative Sample No. 214 has too large a foil thickness to cause reduction in the bonded joint fracture strength.

As described above, the target fracture strength of the bonded joint of 400 MPa cannot be achieved by liquid phase diffusion bonding using the comparative insert metals, which partially satisfy, but do not completely satisfy, the specified requirement of the present invention.

TABLE 9

| | Chemical Composition of Alloy Foil (at %) | | | | | | | | | Foil Thickness | Bonding | Fracture Strength |
|---|---|---|---|---|---|---|---|---|---|---|---|---|
| No. | B | P | Si | V | Cr | Ni | Co | W | Nb | Ti | (μm) | Atmosphere | (MPa) |
| 1 | 5.01 | 19.68 | 5.51 | 19.55 | | | | | | | 20 | Air | 547.77 |
| 2 | 2.95 | 3.53 | 4.32 | 19.46 | | | | | | | 93 | Air | 547.29 |
| 3 | 13.94 | 15.78 | 5.68 | 7.53 | | | | | | | 72 | Air | 487.64 |
| 4 | 1.23 | 14.33 | 6.75 | 6.14 | | | | | | | 81 | Air | 480.68 |
| 5 | 18.32 | 5.64 | 9.48 | 10.34 | | | | | | | 48 | Air | 501.68 |
| 6 | 12.68 | 18.61 | 3.15 | 13.17 | | | | | | | 42 | Air | 515.85 |
| 7 | 12.46 | 10.05 | 9.06 | 1.94 | | | | | | | 39 | Air | 459.69 |
| 8 | 8.57 | 4.05 | 5.95 | 18.50 | | | | | | | 15 | Air | 542.50 |
| 9 | 5.35 | 7.82 | 8.64 | 19.00 | | | | | | | 40 | Air | 544.99 |
| 10 | 14.68 | 8.84 | 1.03 | 2.83 | | | | | | | 53 | Air | 464.14 |
| 11 | 18.16 | 15.77 | 7.83 | 12.03 | 11.05 | | | | | | 39 | Air | 510.13 |
| 12 | 17.53 | 9.44 | 4.50 | 9.97 | 17.25 | | | | | | 5 | Air | 499.83 |
| 13 | 17.18 | 5.12 | 5.32 | 16.73 | 12.69 | | | | | | 21 | Air | 533.66 |
| 14 | 12.26 | 19.63 | 6.68 | 8.42 | | 3.56 | | | | | 21 | Air | 492.09 |
| 15 | 14.17 | 8.56 | 5.37 | 16.24 | | 8.47 | | | | | 8 | Air | 531.18 |
| 16 | 14.11 | 17.92 | 6.77 | 0.40 | | 14.86 | | | | | 93 | Air | 452.00 |
| 17 | 15.48 | 14.91 | 3.86 | 4.35 | | | 10.42 | | | | 94 | Air | 471.76 |
| 18 | 14.88 | 15.76 | 5.31 | 14.20 | | | 3.02 | | | | 13 | Air | 521.02 |
| 19 | 18.68 | 5.94 | 4.90 | 12.98 | | | 4.03 | | | | 63 | Air | 514.92 |
| 20 | 6.67 | 7.91 | 7.39 | 2.43 | 15.13 | 10.97 | | | | | 64 | Air | 462.15 |
| 21 | 4.67 | 2.76 | 8.03 | 17.61 | 19.45 | 14.84 | | | | | 65 | Air | 538.04 |
| 22 | 12.58 | 12.34 | 4.13 | 2.36 | 19.86 | 13.84 | | | | | 95 | Air | 461.80 |
| 23 | 15.89 | 4.85 | 7.19 | 8.78 | | 4.97 | 8.81 | | | | 19 | Air | 493.89 |
| 24 | 1.30 | 4.11 | 9.47 | 0.97 | | 8.65 | 5.27 | | | | 83 | Air | 454.84 |
| 25 | 14.70 | 8.88 | 8.40 | 6.55 | | 11.15 | 10.87 | | | | 92 | Air | 482.75 |
| 26 | 4.89 | 3.41 | 8.48 | 19.58 | 14.34 | | 10.87 | | | | 30 | Air | 547.90 |
| 27 | 14.90 | 9.26 | 5.23 | 10.55 | 1.54 | | 10.76 | | | | 38 | Air | 502.75 |
| 28 | 18.70 | 17.49 | 2.92 | 11.43 | 18.27 | | 9.57 | | | | 64 | Air | 507.13 |
| 29 | 10.08 | 18.62 | 5.20 | 2.25 | 1.53 | 4.16 | 3.07 | | | | 72 | Air | 461.24 |
| 30 | 14.60 | 5.34 | 6.82 | 2.68 | 14.83 | 8.67 | 7.56 | | | | 70 | Air | 463.39 |
| 31 | 8.49 | 4.51 | 1.41 | 13.08 | 3.92 | 5.75 | 11.05 | | | | 89 | Air | 515.39 |
| 32 | 4.33 | 10.08 | 7.62 | 16.47 | | | | 4.91 | | | 29 | Air | 581.51 |
| 33 | 2.93 | 10.92 | 2.35 | 3.36 | | | | 0.76 | | | 71 | Air | 474.39 |
| 34 | 7.89 | 1.36 | 3.49 | 11.92 | | | | 3.93 | | | 100 | Air | 548.84 |
| 35 | 2.37 | 12.96 | 7.25 | 7.16 | | | | | 7.26 | | 50 | Air | 536.58 |
| 36 | 15.85 | 14.94 | 2.64 | 6.70 | | | | | 5.47 | | 94 | Air | 521.80 |
| 37 | 5.70 | 4.29 | 1.11 | 15.80 | | | | | 9.98 | | 51 | Air | 597.91 |
| 38 | 15.50 | 14.49 | 6.72 | 1.63 | | | | | | 0.73 | 86 | Air | 463.99 |
| 39 | 13.28 | 6.28 | 6.65 | 14.04 | | | | | | 2.22 | 12 | Air | 537.98 |
| 40 | 1.80 | 18.90 | 2.26 | 19.24 | | | | | | 2.76 | 20 | Air | 568.27 |
| 41 | 18.98 | 3.49 | 7.13 | 6.13 | | | | 0.70 | 7.76 | | 37 | Air | 541.94 |
| 42 | 16.18 | 9.32 | 3.24 | 3.23 | | | | 3.52 | 3.99 | | 85 | Air | 529.38 |
| 43 | 6.47 | 15.44 | 2.36 | 12.63 | | | | 4.59 | 2.22 | | 100 | Air | 574.64 |
| 44 | 13.95 | 9.41 | 9.19 | 18.27 | | | | 1.92 | | 8.42 | 13 | Air | 622.16 |
| 45 | 2.38 | 15.21 | 7.20 | 17.78 | | | | 0.73 | | 4.69 | 35 | Air | 581.56 |
| 46 | 11.25 | 13.78 | 3.57 | 9.30 | | | | 2.06 | | 1.85 | 54 | Air | 525.71 |
| 47 | 2.45 | 16.38 | 3.63 | 12.28 | | | | 8.94 | | 3.96 | 41 | Air | 632.41 |
| 48 | 14.77 | 7.52 | 9.81 | 12.84 | | | | 6.50 | | 2.41 | 59 | Air | 598.49 |
| 49 | 8.00 | 1.17 | 1.57 | 14.12 | | | | 8.75 | | 7.67 | 45 | Air | 669.50 |
| 50 | 4.57 | 2.38 | 7.36 | 13.82 | | | | 4.77 | 1.73 | 6.45 | 60 | Air | 630.50 |
| 51 | 14.93 | 19.11 | 2.84 | 8.76 | | | | 6.44 | 4.66 | 2.89 | 50 | Air | 613.96 |
| 52 | 9.04 | 13.61 | 6.64 | 1.01 | | | | 7.66 | 9.51 | 7.71 | 53 | Air | 659.96 |
| 53 | 14.38 | 8.83 | 1.16 | 13.93 | 18.56 | | | 4.51 | | | 45 | Air | 564.72 |
| 54 | 16.10 | 9.95 | 6.46 | 6.00 | 8.30 | | | 4.44 | | | 77 | Air | 524.38 |
| 55 | 9.66 | 3.55 | 4.74 | 13.09 | 19.65 | | | 9.97 | | | 50 | Air | 615.16 |
| 56 | 15.69 | 3.80 | 6.78 | 10.17 | 15.59 | | | | 3.99 | | 23 | Air | 528.77 |
| 57 | 4.60 | 4.14 | 8.09 | 4.43 | 18.78 | | | | 0.54 | | 13 | Air | 475.95 |
| 58 | 9.45 | 13.12 | 9.52 | 1.49 | 10.55 | | | | 8.59 | | 94 | Air | 517.54 |
| 59 | 3.80 | 12.75 | 6.28 | 14.93 | 1.16 | | | | | 3.97 | 43 | Air | 556.37 |
| 60 | 7.01 | 4.43 | 3.42 | 3.67 | 8.78 | | | | | 9.84 | 36 | Air | 547.08 |
| 61 | 9.55 | 14.53 | 7.19 | 7.23 | 14.73 | | | | | 4.10 | 80 | Air | 518.94 |
| 62 | 3.42 | 10.90 | 6.91 | 17.00 | 8.90 | | | 4.27 | 5.61 | | 23 | Air | 616.93 |
| 63 | 19.04 | 4.25 | 4.55 | 16.16 | 14.48 | | | 2.47 | 8.53 | | 38 | Air | 615.14 |
| 64 | 16.98 | 5.00 | 8.49 | 19.53 | 7.21 | | | 2.91 | 3.91 | | 31 | Air | 604.18 |
| 65 | 15.21 | 4.64 | 6.81 | 8.32 | 0.59 | | | 5.46 | | 4.02 | 70 | Air | 561.95 |
| 66 | 9.65 | 4.57 | 9.08 | 8.58 | 3.13 | | | | 3.73 | 3.35 | 6 | Air | 545.81 |
| 67 | 15.86 | 10.93 | 5.52 | 18.13 | 19.15 | | | | 5.91 | 4.78 | 35 | Air | 620.27 |
| 68 | 12.64 | 3.41 | 9.61 | 9.11 | 9.58 | | | 6.80 | | 9.52 | 9 | Air | 639.65 |
| 69 | 1.15 | 7.04 | 7.23 | 3.24 | 12.77 | | | 7.98 | | 4.84 | 5 | Air | 584.72 |
| 70 | 9.85 | 17.91 | 8.88 | 18.58 | 4.23 | | | 5.96 | | 7.39 | 74 | Air | 661.61 |
| 71 | 18.34 | 16.61 | 9.46 | 14.52 | 11.39 | | | 8.81 | 0.38 | 6.37 | 71 | Air | 664.37 |
| 72 | 10.36 | 2.71 | 9.01 | 2.59 | 16.13 | | | 5.91 | 2.36 | 6.68 | 24 | Air | 592.03 |
| 73 | 5.10 | 6.81 | 1.68 | 3.84 | 11.74 | | | 6.70 | 8.98 | 5.46 | 29 | Air | 642.78 |
| 74 | 10.19 | 4.01 | 8.80 | 13.95 | | 12.53 | | 0.70 | | | 47 | Air | 526.79 |

TABLE 9-continued

| | Chemical Composition of Alloy Foil (at %) | | | | | | | | | | Foil Thickness | Bonding | Fracture Strength |
|---|---|---|---|---|---|---|---|---|---|---|---|---|---|
| No. | B | P | Si | V | Cr | Ni | Co | W | Nb | Ti | (μm) | Atmosphere | (MPa) |
| 75 | 18.79 | 17.73 | 4.09 | 12.36 | | 2.53 | | 4.03 | | | 32 | Air | 552.09 |
| 76 | 5.58 | 4.34 | 7.63 | 17.79 | | 14.91 | | 6.53 | | | 8 | Air | 604.22 |
| 77 | 1.78 | 11.18 | 4.88 | 7.68 | | 9.97 | | | 1.23 | | 51 | Air | 496.97 |
| 78 | 8.22 | 8.21 | 3.33 | 8.00 | | 4.87 | | | 7.04 | | 92 | Air | 539.30 |
| 79 | 19.56 | 14.02 | 2.28 | 18.51 | | 6.54 | | | 9.70 | | 78 | Air | 610.47 |
| 80 | 5.17 | 10.29 | 8.34 | 9.69 | | 9.48 | | | | 3.05 | 98 | Air | 522.81 |
| 81 | 19.47 | 5.59 | 7.42 | 8.88 | | 12.16 | | | | 0.26 | 3 | Air | 496.49 |
| 82 | 16.79 | 14.72 | 8.67 | 14.76 | | 4.23 | | | | 2.37 | 51 | Air | 542.76 |
| 83 | 2.64 | 5.71 | 8.22 | 19.67 | | 9.17 | | 7.63 | 2.15 | | 78 | Air | 639.71 |
| 84 | 10.47 | 12.91 | 4.66 | 16.07 | | 10.88 | | 8.29 | 1.99 | | 58 | Air | 627.18 |
| 85 | 4.41 | 15.13 | 5.13 | 9.74 | | 1.29 | | 7.86 | 1.78 | | 72 | Air | 589.80 |
| 86 | 13.60 | 3.35 | 5.00 | 14.91 | | 11.94 | | | 1.20 | 3.59 | 7 | Air | 561.69 |
| 87 | 6.44 | 5.62 | 3.90 | 19.95 | | 7.90 | | | 8.73 | 9.73 | 44 | Air | 688.64 |
| 88 | 8.56 | 5.86 | 4.87 | 13.54 | | 5.39 | | | 2.65 | 4.93 | 38 | Air | 575.78 |
| 89 | 5.53 | 10.21 | 4.53 | 16.57 | | 5.48 | | 6.19 | | 6.22 | 76 | Air | 644.52 |
| 90 | 8.11 | 9.29 | 8.03 | 6.08 | | 9.01 | | 3.18 | | 6.37 | 71 | Air | 563.11 |
| 91 | 15.25 | 16.19 | 5.96 | 6.84 | | 2.48 | | 3.38 | | 7.32 | 94 | Air | 576.51 |
| 92 | 18.98 | 1.31 | 3.83 | 1.34 | | 4.26 | | 2.17 | 1.03 | 1.71 | 79 | Air | 499.21 |
| 93 | 10.86 | 8.13 | 5.87 | 14.18 | | 13.83 | | 9.50 | 3.78 | 5.68 | 51 | Air | 687.84 |
| 94 | 15.27 | 14.30 | 1.81 | 4.51 | | 4.30 | | 2.35 | 4.18 | 8.70 | 27 | Air | 594.92 |
| 95 | 9.03 | 18.51 | 4.80 | 7.16 | | | 6.10 | 8.64 | | | 20 | Air | 572.20 |
| 96 | 6.02 | 7.55 | 5.40 | 17.40 | | | 8.95 | 5.63 | | | 98 | Air | 593.32 |
| 97 | 3.29 | 18.30 | 8.99 | 17.89 | | | 14.38 | 6.76 | | | 73 | Air | 607.02 |
| 98 | 17.15 | 6.36 | 5.46 | 18.65 | | | 5.12 | | 1.71 | | 89 | Air | 555.26 |
| 99 | 11.31 | 8.61 | 2.74 | 17.76 | | | 4.52 | | 3.87 | | 29 | Air | 565.88 |
| 100 | 14.76 | 6.04 | 4.25 | 4.60 | | | 3.08 | | 3.03 | | 11 | Air | 494.23 |
| 101 | 8.19 | 18.33 | 3.44 | 17.70 | | | 2.91 | | | 7.55 | 46 | Air | 598.91 |
| 102 | 4.24 | 7.40 | 9.30 | 8.63 | | | 11.84 | | | 1.16 | 27 | Air | 502.42 |
| 103 | 6.05 | 19.50 | 8.61 | 11.19 | | | 3.77 | | | 1.27 | 20 | Air | 516.06 |
| 104 | 5.82 | 5.43 | 8.15 | 17.20 | | | 14.34 | 0.90 | 1.20 | | 28 | Air | 553.38 |
| 105 | 9.51 | 10.75 | 8.12 | 16.29 | | | 5.48 | 7.32 | 7.23 | | 98 | Air | 655.23 |
| 106 | 5.51 | 3.46 | 3.38 | 0.54 | | | 1.55 | 2.60 | 1.58 | | 97 | Air | 489.75 |
| 107 | 3.56 | 18.94 | 7.36 | 7.79 | | | 9.23 | | 3.92 | 3.13 | 9 | Air | 541.47 |
| 108 | 1.99 | 7.04 | 1.16 | 8.50 | | | 3.66 | | 5.58 | 6.52 | 50 | Air | 583.70 |
| 109 | 13.61 | 10.30 | 5.36 | 14.79 | | | 14.00 | | 0.17 | 6.22 | 22 | Air | 574.89 |
| 110 | 14.17 | 3.25 | 6.64 | 1.26 | | | 13.14 | 2.89 | | 6.12 | 77 | Air | 534.20 |
| 111 | 3.89 | 17.05 | 3.78 | 14.44 | | | 2.33 | 2.85 | | 7.04 | 70 | Air | 607.07 |
| 112 | 8.81 | 15.86 | 3.91 | 7.25 | | | 13.67 | 8.60 | | 2.11 | 37 | Air | 589.17 |
| 113 | 11.98 | 19.74 | 8.77 | 16.64 | | | 11.81 | 8.29 | 4.29 | 2.97 | 76 | Air | 669.87 |
| 114 | 16.58 | 4.86 | 6.33 | 8.42 | | | 5.48 | 4.97 | 4.16 | 8.73 | 6 | Air | 640.84 |
| 115 | 16.35 | 6.33 | 8.48 | 12.05 | | | 14.32 | 7.63 | 3.56 | 5.40 | 18 | Air | 654.61 |
| 116 | 11.37 | 18.25 | 9.96 | 12.19 | 15.26 | 2.77 | | 8.50 | | | 90 | Air | 595.96 |
| 117 | 7.74 | 16.56 | 9.42 | 17.57 | 8.26 | 12.67 | | 0.70 | | | 72 | Air | 544.81 |
| 118 | 7.88 | 6.90 | 8.36 | 7.95 | 8.85 | 2.98 | | 1.07 | | | 61 | Air | 500.48 |
| 119 | 18.44 | 8.14 | 7.64 | 1.90 | 12.29 | 10.39 | | | 3.20 | | 36 | Air | 481.89 |
| 120 | 11.50 | 14.35 | 4.22 | 17.15 | 0.23 | 10.38 | | | 3.59 | | 33 | Air | 560.88 |
| 121 | 16.57 | 10.01 | 6.09 | 16.73 | 19.62 | 1.91 | | | 2.41 | | 49 | Air | 550.50 |
| 122 | 3.77 | 2.94 | 4.88 | 2.91 | 9.65 | 4.50 | | | | 2.62 | 21 | Air | 485.51 |
| 123 | 2.63 | 2.13 | 3.54 | 9.94 | 11.66 | 13.50 | | | | 6.63 | 17 | Air | 552.68 |
| 124 | 1.28 | 16.54 | 7.60 | 0.86 | 6.15 | 0.39 | | | | 8.59 | 95 | Air | 523.04 |
| 125 | 15.32 | 19.11 | 1.58 | 13.20 | 4.49 | 10.21 | | 3.10 | 4.46 | | 10 | Air | 578.31 |
| 126 | 9.35 | 8.24 | 6.02 | 18.15 | 4.41 | 14.50 | | 7.87 | 1.98 | | 67 | Air | 633.29 |
| 127 | 6.46 | 12.32 | 4.51 | 5.31 | 14.48 | 10.44 | | 8.15 | 7.36 | | 15 | Air | 609.63 |
| 128 | 19.64 | 8.83 | 6.33 | 9.29 | 17.28 | 10.95 | | | 9.71 | 2.31 | 88 | Air | 582.96 |
| 129 | 18.08 | 12.17 | 2.97 | 16.60 | 4.78 | 2.07 | | | 1.65 | 9.33 | 96 | Air | 619.21 |
| 130 | 14.10 | 4.51 | 6.25 | 17.52 | 1.57 | 3.75 | | | 8.04 | 9.11 | 33 | Air | 666.79 |
| 131 | 16.84 | 10.78 | 6.80 | 7.45 | 12.15 | 3.25 | | 2.86 | | 3.60 | 62 | Air | 544.58 |
| 132 | 19.56 | 15.93 | 9.85 | 16.55 | 0.11 | 0.35 | | 2.05 | | 4.60 | 66 | Air | 590.14 |
| 133 | 9.26 | 5.96 | 8.49 | 2.62 | 5.59 | 5.30 | | 8.47 | | 1.86 | 93 | Air | 562.63 |
| 134 | 4.22 | 9.44 | 1.96 | 12.51 | 5.42 | 0.47 | | 7.30 | 1.20 | 2.70 | 21 | Air | 615.51 |
| 135 | 17.90 | 13.38 | 1.45 | 16.62 | 13.69 | 1.61 | | 8.65 | 1.05 | 0.66 | 82 | Air | 632.22 |
| 136 | 7.10 | 12.37 | 7.63 | 2.76 | 6.92 | 12.69 | | 0.11 | 8.47 | 3.34 | 19 | Air | 550.87 |
| 137 | 15.52 | 8.00 | 5.96 | 3.77 | | 4.73 | 13.94 | 1.84 | | | 94 | Air | 487.19 |
| 138 | 7.35 | 14.83 | 4.88 | 10.07 | | 2.17 | 10.42 | 1.30 | | | 53 | Air | 513.31 |
| 139 | 13.45 | 4.71 | 8.73 | 6.13 | | 4.20 | 10.40 | 8.57 | | | 19 | Air | 566.37 |
| 140 | 8.68 | 10.72 | 6.53 | 9.36 | | 10.89 | 9.32 | | 5.06 | | 39 | Air | 532.17 |
| 141 | 17.79 | 9.93 | 6.53 | 6.23 | | 7.16 | 12.83 | | 8.14 | | 4 | Air | 538.15 |
| 142 | 14.87 | 7.53 | 9.87 | 9.65 | | 0.21 | 11.46 | | 2.13 | | 39 | Air | 513.14 |
| 143 | 8.04 | 18.03 | 3.01 | 6.49 | | 1.52 | 9.94 | | | 5.28 | 98 | Air | 524.71 |
| 144 | 18.92 | 9.21 | 7.10 | 6.10 | | 1.59 | 0.68 | | | 2.93 | 84 | Air | 503.93 |
| 145 | 2.80 | 7.87 | 1.35 | 17.43 | | 2.16 | 4.84 | | | 5.46 | 49 | Air | 580.84 |
| 146 | 8.69 | 2.74 | 9.89 | 14.00 | | 6.56 | 4.02 | 0.81 | 3.08 | | 8 | Air | 549.63 |
| 147 | 15.02 | 2.99 | 7.51 | 7.89 | | 14.29 | 9.38 | 1.42 | 4.06 | | 76 | Air | 532.08 |
| 148 | 4.66 | 18.91 | 8.11 | 13.01 | | 12.13 | 9.28 | 9.97 | 6.73 | | 16 | Air | 661.90 |

TABLE 9-continued

| No. | B | P | Si | V | Cr | Ni | Co | W | Nb | Ti | Foil Thickness (μm) | Bonding Atmosphere | Fracture Strength (MPa) |
|---|---|---|---|---|---|---|---|---|---|---|---|---|---|
| 149 | 8.19 | 19.62 | 4.84 | 0.15 | | 3.88 | 0.24 | | 4.46 | 7.96 | 42 | Air | 545.64 |
| 150 | 8.63 | 1.22 | 3.58 | 13.89 | | 7.78 | 10.47 | | 5.16 | 4.71 | 24 | Air | 593.26 |
| 151 | 15.27 | 11.75 | 1.70 | 11.64 | | 12.59 | 11.30 | | 2.16 | 4.17 | 34 | Air | 556.66 |
| 152 | 16.27 | 19.37 | 2.24 | 19.48 | | 7.36 | 7.29 | 2.81 | | 5.11 | 38 | Air | 616.42 |
| 153 | 11.28 | 5.42 | 3.33 | 15.11 | | 1.43 | 5.49 | 1.38 | | 5.36 | 41 | Air | 582.24 |
| 154 | 6.14 | 17.74 | 9.79 | 9.40 | | 2.79 | 14.16 | 2.56 | | 4.94 | 16 | Air | 562.19 |
| 155 | 19.97 | 16.06 | 8.30 | 16.33 | | 12.54 | 0.24 | 6.62 | 2.65 | 1.90 | 23 | Air | 631.54 |
| 156 | 6.18 | 16.70 | 8.17 | 11.91 | | 2.94 | 3.99 | 8.16 | 9.99 | 1.38 | 42 | Air | 672.10 |
| 157 | 2.32 | 7.15 | 9.33 | 12.31 | | 9.61 | 7.61 | 2.74 | 0.64 | 2.79 | 62 | Air | 565.70 |
| 158 | 4.75 | 19.41 | 2.30 | 3.29 | 1.00 | | 12.44 | 2.07 | | | 52 | Air | 487.18 |
| 159 | 19.22 | 8.75 | 8.26 | 12.57 | 6.13 | | 2.99 | 4.66 | | | 92 | Air | 559.45 |
| 160 | 11.21 | 17.07 | 1.92 | 4.23 | 11.83 | | 0.77 | 9.10 | | | 18 | Air | 562.16 |
| 161 | 3.50 | 11.62 | 5.77 | 16.84 | 8.68 | | 1.81 | | | 0.10 | 66 | Air | 534.91 |
| 162 | 18.82 | 4.60 | 9.62 | 11.18 | 15.03 | | 1.58 | | | 1.37 | 52 | Air | 515.50 |
| 163 | 14.31 | 13.28 | 5.26 | 5.64 | 5.45 | | 10.98 | | | 2.72 | 11 | Air | 497.26 |
| 164 | 17.19 | 8.66 | 2.81 | 13.17 | 19.25 | | 7.57 | | | 9.84 | 86 | Air | 594.57 |
| 165 | 18.17 | 7.77 | 5.63 | 10.33 | 7.02 | | 9.92 | | | 2.42 | 84 | Air | 521.02 |
| 166 | 14.36 | 2.01 | 8.75 | 8.79 | 16.69 | | 2.29 | | | 1.44 | 74 | Air | 495.45 |
| 167 | 7.75 | 7.06 | 1.03 | 12.42 | 9.85 | | 10.65 | 8.09 | 2.83 | | 59 | Air | 612.81 |
| 168 | 6.77 | 12.98 | 1.66 | 11.18 | 3.08 | | 5.32 | 5.44 | 4.35 | | 41 | Air | 590.72 |
| 169 | 18.80 | 3.71 | 5.62 | 3.40 | 7.11 | | 0.80 | 2.37 | 2.35 | | 27 | Air | 507.22 |
| 170 | 9.44 | 7.76 | 9.71 | 5.26 | 0.44 | | 14.95 | | 9.83 | 7.64 | 35 | Air | 606.21 |
| 171 | 18.79 | 4.53 | 9.71 | 2.40 | 18.21 | | 0.77 | | 4.40 | 7.06 | 97 | Air | 549.28 |
| 172 | 4.99 | 15.81 | 1.00 | 11.48 | 0.99 | | 12.99 | | 6.21 | 8.57 | 98 | Air | 619.38 |
| 173 | 8.09 | 2.04 | 5.56 | 6.50 | 18.75 | | 2.36 | 0.19 | | 7.46 | 14 | Air | 544.05 |
| 174 | 16.07 | 7.61 | 2.28 | 19.20 | 15.71 | | 12.72 | 1.85 | | 4.41 | 46 | Air | 599.73 |
| 175 | 10.91 | 17.52 | 5.45 | 8.90 | 3.98 | | 13.89 | 9.27 | | 3.66 | 68 | Air | 616.54 |
| 176 | 7.83 | 3.03 | 6.95 | 7.29 | 4.62 | | 11.74 | 2.14 | 6.80 | 6.36 | 98 | Air | 606.33 |
| 177 | 1.46 | 5.58 | 2.71 | 9.07 | 0.40 | | 5.91 | 8.71 | 0.63 | 6.82 | 37 | Air | 641.44 |
| 178 | 5.38 | 3.76 | 5.54 | 4.16 | 2.27 | | 9.88 | 2.75 | 9.93 | 4.61 | 21 | Air | 604.66 |
| 179 | 5.48 | 9.47 | 7.85 | 16.46 | 15.91 | 1.63 | 10.62 | 6.59 | | | 34 | Air | 598.17 |
| 180 | 12.10 | 19.72 | 3.23 | 13.97 | 13.59 | 2.96 | 13.28 | 1.74 | | | 84 | Air | 537.22 |
| 181 | 11.32 | 1.12 | 9.64 | 12.53 | 6.92 | 5.38 | 12.61 | 8.26 | | | 7 | Air | 595.31 |
| 182 | 3.68 | 8.70 | 3.12 | 12.42 | 16.06 | 4.28 | 9.24 | | 6.00 | | 62 | Air | 554.07 |
| 183 | 8.06 | 18.23 | 1.06 | 13.50 | 5.12 | 0.39 | 7.17 | | 1.02 | | 49 | Air | 524.63 |
| 184 | 5.26 | 8.81 | 6.25 | 12.73 | 17.25 | 0.55 | 9.06 | | 4.28 | | 85 | Air | 543.62 |
| 185 | 1.66 | 12.87 | 6.65 | 2.27 | 1.13 | 3.52 | 10.68 | | | 7.60 | 24 | Air | 522.16 |
| 186 | 4.84 | 15.90 | 5.24 | 3.10 | 12.80 | 14.17 | 6.41 | | | 8.37 | 61 | Air | 532.45 |
| 187 | 6.44 | 17.03 | 2.76 | 4.67 | 16.34 | 1.09 | 0.72 | | | 4.50 | 55 | Air | 509.38 |
| 188 | 17.90 | 14.05 | 7.69 | 18.92 | 18.34 | 7.15 | 10.19 | 7.23 | 3.59 | | 57 | Air | 642.04 |
| 189 | 17.16 | 7.12 | 4.19 | 11.25 | 8.18 | 14.24 | 1.66 | 6.33 | 3.14 | | 80 | Air | 591.48 |
| 190 | 16.14 | 5.72 | 7.89 | 12.54 | 8.68 | 5.44 | 10.73 | 2.78 | 1.92 | | 58 | Air | 553.88 |
| 191 | 2.80 | 6.38 | 3.90 | 6.55 | 15.87 | 12.51 | 9.85 | | 4.41 | 5.02 | 24 | Air | 553.75 |
| 192 | 17.31 | 4.06 | 9.95 | 11.74 | 4.97 | 5.33 | 0.19 | | 3.79 | 3.27 | 14 | Air | 561.37 |
| 193 | 16.90 | 6.77 | 8.70 | 5.29 | 7.29 | 13.18 | 5.59 | | 5.74 | 1.47 | 62 | Air | 528.42 |
| 194 | 5.68 | 3.43 | 4.43 | 5.29 | 17.74 | 5.71 | 7.23 | 0.68 | | 6.80 | 58 | Air | 537.71 |
| 195 | 13.96 | 18.30 | 9.45 | 19.13 | 15.99 | 14.36 | 12.92 | 2.20 | | 8.61 | 91 | Air | 636.50 |
| 196 | 17.19 | 19.35 | 2.40 | 12.90 | 4.32 | 9.03 | 1.06 | 2.89 | | 1.33 | 33 | Air | 553.99 |
| 197 | 2.54 | 10.01 | 1.10 | 4.56 | 5.14 | 7.25 | 6.32 | 3.04 | 1.08 | 9.56 | 56 | Air | 587.21 |
| 198 | 10.25 | 2.91 | 2.54 | 9.49 | 16.81 | 3.31 | 8.11 | 9.52 | 4.13 | 6.65 | 3 | Air | 674.72 |
| 199 | 2.60 | 6.87 | 1.82 | 2.61 | 11.75 | 8.77 | 7.18 | 9.34 | 2.79 | 2.48 | 64 | Air | 595.80 |

TABLE 10

| No. | P | B | Si | V | Cr | Ni | Co | W | Nb | Ti | Foil Thickness (μm) | Bonding Atmosphere | Fracture Strength (MPa) |
|---|---|---|---|---|---|---|---|---|---|---|---|---|---|
| 200 | 0.62 | 3.56 | 8.29 | 4.72 | | | | | | | 7.67 | Air | 0.05 |
| 201 | 21.38 | 15.57 | 3.00 | 0.61 | | | | | | | 10.86 | Air | 218.67 |
| 202 | 19.73 | 0.77 | 4.29 | 6.04 | | | | | | | 56.15 | Air | 0.10 |
| 203 | 7.75 | 26.22 | 6.40 | 9.43 | | | | | | | 95.10 | Air | 108.69 |
| 204 | 4.88 | 7.23 | 0.26 | 1.61 | | | | | | | 84.56 | Air | 0.31 |
| 205 | 6.32 | 6.08 | 12.53 | 4.76 | | | | | | | 83.62 | Air | 284.57 |
| 206 | 2.24 | 7.54 | 7.51 | 0.03 | | | | | | | 84.97 | Air | 0.02 |
| 207 | 7.17 | 19.38 | 5.20 | 24.18 | | | | | | | 61.58 | Air | 123.02 |
| 208 | 12.26 | 8.28 | 2.25 | 16.24 | 22.55 | | | | | | 27.67 | Air | 141.54 |
| 209 | 10.75 | 18.80 | 4.27 | 9.60 | | 16.74 | | | | | 46.58 | Air | 175.10 |
| 210 | 4.29 | 2.78 | 5.36 | 13.76 | | | 15.99 | | | | 72.66 | Air | 179.64 |
| 211 | 1.13 | 11.30 | 2.18 | 10.83 | 12.24 | | | 13.35 | | | 10.94 | Air | 160.48 |

TABLE 10-continued

| | Chemical Composition of Alloy Foil (at %) | | | | | | | | | | Foil Thickness | Bonding | Fracture Strength |
|---|---|---|---|---|---|---|---|---|---|---|---|---|---|
| No. | P | B | Si | V | Cr | Ni | Co | W | Nb | Ti | ($\mu$m) | Atmosphere | (MPa) |
| 212 | 7.08 | 18.81 | 4.02 | 17.82 | | 9.28 | | | 12.79 | | 94.44 | Air | 321.58 |
| 213 | 9.28 | 16.77 | 9.94 | 14.13 | | 2.45 | 3.66 | 9.12 | | 16.85 | 37.45 | Air | 264.32 |
| 214 | 8.67 | 5.68 | 4.48 | 19.22 | 2.54 | 2.25 | | | | | 234.10 | Air | 313.69 |

According to the third invention, P and B are combinedly used as diffusion elements and liquid phase diffusion bonding of various kinds of Fe-based materials (steel plates, steel pipes, steel strips, steel bars, etc.) can be performed in oxidizing atmospheres to reduce thermal influence on the base material (the material to be bonded) even when using elevated bonding temperatures and can provide a bonded joint having a high fracture strength, and thereby, the advantageous feature of liquid phase diffusion bonding can be utilized for bonding of Fe-base materials, and the bonding time can be reduced in comparison with that required in the other bonding methods to significantly reduce the bonding work time.

INDUSTRIAL APPLICABILITY

The present invention combinedly uses P and B as diffusion elements and enables liquid phase diffusion bonding of various kinds of Fe-based materials (steel plates, steel pipes, steel strips, steel bars, etc.) to be performed in oxidizing atmospheres to reduce thermal influence on the base material (the material to be bonded) even when using elevated bonding temperatures and enables production of a bonded joint having a high fracture strength in a reduced time, so that the advantageous feature of liquid phase diffusion bonding can be utilized for bonding of Fe-base materials, and the bonding time can be reduced in comparison with that required in the other bonding methods to significantly reduce the bonding work time.

We claim:

1. An Fe-based alloy foil, for liquid phase diffusion bonding of Fe-based materials and for enabling bonding in oxidizing atmospheres, characterized by having:

a chemical composition including, in atomic percentage, 1.0 to 20.0% P, 1.0 to 20% Si and 0.1 to 20.0% V and the balance composed of substantially Fe and unavoidable impurities; and a foil thickness of 3.0 to 100 $\mu$m.

2. An Fe-based alloy foil for liquid phase diffusion bonding of Fe-based materials and for enabling bonding in oxidizing atmospheres, characterized by having:

a chemical composition including, in atomic percentage, 1.0 to 20.0% P, 1.0 to 20.0% Si and 0.1 to 20.0% V and also, one or more 0.1 to 20.0% Cr, 0.1 to 15.0% Ni, and 0.1 to 15.0% Co, the balance composed of Fe and unavoidable impurities, and a foil thickness of 3.0 to 100 $\mu$m.

3. An Fe-based alloy foil for liquid phase diffusion bonding of Fe-based materials and for enabling bonding in oxidizing atmospheres, characterized by having:

a chemical composition including, in atomic percentage, 1.0 to 20.0% P, 1.0 to 20.0% Si and 0.1 to 20.0% V, and also, one or more of 0.1 to 10.0% W, 0.1 to 10.0% Nb and 0.1 to 10.0% Ti, the balance composed of Fe and unavoidable impurities; and a foil thickness of 3.0 to 100 $\mu$m.

4. An Fe-based alloy foil for liquid phase diffusion bonding of Fe-based materials and for enabling bonding in oxidizing atmospheres, characterized by having:

chemical composition including, in atomic percentage, 1.0 to 20.0% P, 1.0 to 20.0% Si and 0.1 to 20.0% V, and also, one or more of 0.1 to 20.0% Cr, 0.1 to 15.0% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 $\mu$m.

5. An Fe-based alloy foil for liquid phase diffusion bonding of Fe-based materials and for enabling bonding in oxidizing atmospheres according to according to claim 1, characterized by having a substantially amorphous structure.

6. An Fe-based alloy foil for liquid phase diffusion bonding of Fe-based materials and for enabling bonding in oxidizing atmospheres, characterized by having:

a chemical composition including, in atomic percentage, 1.0 to 20.0% B, 1.0 to 20.0% Si and 0.1 to 20.0% V and the balance composed of substantially Fe and unavoidable impurities; and a foil thickness of 3.0 to 100 $\mu$m.

7. An Fe-based alloy foil for liquid phase diffusion bonding of Fe-based materials and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 20.0% Cr, 0.1 to 15.0% Ni and 0.1 to 15.0% Co, the balance composed of Fe and unavoidable impurities; and a foil thickness of 3.0 to 100 $\mu$m.

8. An Fe-based alloy foil for liquid phase diffusion bonding of Fe-based materials and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 10.0% W, 0.1 to 10.0% Nb and 0.1 to 10.0% Ti, the balance composed of Fe and unavoidable impurities; and a foil thickness of 3.0 to 100 $\mu$m.

9. An Fe-based alloy foil for liquid phase diffusion bonding of Fe-based materials and for enabling bonding in oxidizing atmospheres, characterized by having:

a chemical composition including, in atomic percentage, 1.0 to 20.0% B, 1.0 to 20.0% Si and 0.1 to 20.0% V, and also, one or more of 0.1 to 20.0% Cr, 0.1 to 15% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 $\mu$m.

10. An Fe-based alloy foil for liquid phase diffusion bonding of Fe-based materials and for enabling bonding in oxidizing atmospheres according to claim 6, characterized by having a substantially amorphous structure.

11. An Fe-based alloy foil for liquid phase diffusion bonding of Fe-based materials and for enabling bonding in oxidizing atmospheres, characterized by having:

a chemical composition including, in atomic percentage, 1.0 to 20.0% P, 1.0 to 10.0% Si, 0.1 to 20.0% V and 1.0 to 20.0% B and the balance composed of substantially Fe and unavoidable impurities; and a foil thickness of 3.0 to 100 μm.

12. An Fe-based alloy foil for liquid phase diffusion bonding of Fe-based materials and for enabling bonding in oxidizing atmospheres, characterized by having:

a chemical composition including, in atomic percentage, 1.0 to 20.0% P, 1.0 to 10.0% Si, 0.1 to 20.0% V and 1.0 to 20.0% B, and also, one or more of 0.1 to 20.0% Cr, 0.1 to 15.0% Ni and 0.1 to 15.0% Co, the balance composed of Fe and unavoidable impurities; and a foil thickness of 3.0 to 100 μm.

13. An Fe-based alloy foil for liquid phase diffusion bonding of Fe-based materials and for enabling bonding in oxidizing atmospheres, characterized by having:

a chemical composition including, in atomic percentage, 1.0 to 20.0% Pt 1.0 to 10.0% Si, 0.1 to 20.0% V and 1.0 to 20.0% B, and also, one or more of 0.1 to 10.0% W, 0.1 to 10.0% Nb and 0.1 to 10.0% Ti, the balance composed of Fe and unavoidable impurities; and a foil thickness of 3.0 to 100 μm.

14. An Fe-based alloy foil for liquid phase diffusion bonding of Fe-based materials and for enabling bonding in oxidizing atmospheres, characterized by having:

a chemical composition including, in atomic percentage, 1.0 to 20.0% P, 1.0 to 10.0% Si, 0.1 to 20.0% V and 1.0 to 20.0% B, and also, one or more of 0.1 to 10.0% W, 0.1 to 15.0% Ni and 0.1 to 15.0% Co, and further, one or more of 0.1 to 10.0% W, 0.1 to 10.0% Nb and 0.1 to 10.0% Ti, the balance composed of Fe and unavoidable impurities; and a foil thickness of 3.0 to 100 μm.

15. An Fe-based alloy foil for liquid phase diffusion bonding of Fe-based materials and for enabling bonding in oxidizing atmospheres according to claim 11, characterized by having a substantially amorphous structure.

16. An Fe-based alloy foil for liquid phase diffusion bonding of Fe-based materials and for enabling bonding in oxidizing atmospheres according to claim 2, characterized by having a substantially amorphous structure.

17. An Fe-based alloy foil for liquid phase diffusion bonding of Fe-based materials and for enabling bonding in oxidizing atmospheres according to claim 3, characterized by having a substantially amorphous structure.

18. An Fe-based alloy foil for liquid phase diffusion bonding of Fe-based materials and for enabling bonding in oxidizing atmospheres according to claim 4, characterized by having a substantially amorphous structure.

19. An Fe-based alloy foil for liquid phase diffusion bonding of Fe-based materials and for enabling bonding in oxidizing atmospheres according to claim 7, characterized by having a substantially amorphous structure.

20. An Fe-based alloy foil for liquid phase diffusion bonding of Fe-based materials and for enabling bonding in oxidizing atmospheres according to claim 8, characterized by having a substantially amorphous structure.

21. An Fe-based alloy foil for liquid phase diffusion bonding of Fe-based materials and for enabling bonding in oxidizing atmospheres according to claim 9, characterized by having a substantially amorphous structure.

22. An Fe-based alloy foil for liquid phase diffusion bonding of Fe-based materials and for enabling bonding in oxidizing atmospheres according to claim 12, characterized by having a substantially amorphous structure.

23. An Fe-based alloy foil for liquid phase diffusion bonding of Fe-based materials and for enabling bonding in oxidizing atmospheres according to claim 13, characterized by having a substantially amorphous structure.

24. An Fe-based alloy foil for liquid phase diffusion bonding of Fe-based materials and for enabling bonding in oxidizing atmospheres according to claim 14, characterized by having a substantially amorphous structure.

\* \* \* \* \*